United States Patent
Suwa et al.

(10) Patent No.: US 10,851,957 B2
(45) Date of Patent: Dec. 1, 2020

(54) HEADLIGHT MODULE AND HEADLIGHT DEVICE

(71) Applicant: MITSUBISHI ELECTRIC CORPORATION, Tokyo (JP)

(72) Inventors: Masashige Suwa, Tokyo (JP); Ritsuya Oshima, Tokyo (JP); Keiji Nakamura, Tokyo (JP); Kuniko Kojima, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 198 days.

(21) Appl. No.: 15/569,717

(22) PCT Filed: May 17, 2016

(86) PCT No.: PCT/JP2016/064582
§ 371 (c)(1),
(2) Date: Oct. 26, 2017

(87) PCT Pub. No.: WO2016/190165
PCT Pub. Date: Dec. 1, 2016

(65) Prior Publication Data
US 2018/0128442 A1 May 10, 2018

(30) Foreign Application Priority Data
May 22, 2015 (JP) ................. 2015-104130

(51) Int. Cl.
*F21S 41/143* (2018.01)
*F21S 41/32* (2018.01)
(Continued)

(52) U.S. Cl.
CPC .......... *F21S 41/143* (2018.01); *B60Q 1/1423* (2013.01); *B60Q 1/18* (2013.01);
(Continued)

(58) Field of Classification Search
CPC .... F21V 23/003; F21V 23/0464; F21V 21/30; F21V 21/22; F21S 9/03; F21S 41/143;
(Continued)

(56) References Cited

U.S. PATENT DOCUMENTS 5,735,595 A * 4/1998 Nederpel ............... B60Q 1/302
362/223
6,724,543 B1 * 4/2004 Chinniah ................ F21V 5/008
359/718
(Continued)

FOREIGN PATENT DOCUMENTS

JP 10-111472 A 4/1998
JP 2007-140111 A 6/2007
(Continued)

OTHER PUBLICATIONS

Office Action issued in corresponding Chinese Application No. 201680027360.8 dated Oct. 9, 2019.
(Continued)

*Primary Examiner* — Isiaka O Akanbi
*Assistant Examiner* — Glenn D Zimmerman
(74) *Attorney, Agent, or Firm* — Birch, Stewart, Kolasch & Birch, LLP

(57) ABSTRACT

A headlight module includes a light source, a light distribution control element and a projection optical element. The light source emits light. The light distribution control element forms a light distribution pattern by changing a divergence angle of the light incident therein. The projection optical element projects the light distribution pattern. The light distribution control element includes a first light distribution formation part configured to form a high luminosity region in the light distribution pattern and a second light distribution formation part configured to form a low luminosity region in the light distribution pattern. The low
(Continued)

luminosity region is lower in luminosity than the high luminosity region.

20 Claims, 21 Drawing Sheets

(51) Int. Cl.
| | |
|---|---|
| *F21S 41/255* | (2018.01) |
| *F21S 41/20* | (2018.01) |
| *F21S 41/24* | (2018.01) |
| *F21S 41/147* | (2018.01) |
| *F21S 41/27* | (2018.01) |
| *F21S 41/43* | (2018.01) |
| *F21S 41/16* | (2018.01) |
| *F21S 41/00* | (2018.01) |
| *B60Q 1/14* | (2006.01) |
| *B60Q 1/18* | (2006.01) |

(52) U.S. Cl.
CPC ............ *F21S 41/00* (2018.01); *F21S 41/147* (2018.01); *F21S 41/16* (2018.01); *F21S 41/24* (2018.01); *F21S 41/255* (2018.01); *F21S 41/27* (2018.01); *F21S 41/285* (2018.01); *F21S 41/322* (2018.01); *F21S 41/43* (2018.01)

(58) Field of Classification Search
CPC ...... F21S 41/322; F21S 41/255; F21S 41/285; F21S 41/24; F21S 41/147; F21S 41/27; F21S 41/43; F21S 41/32; F21S 43/00; F21S 41/00; F21S 41/26; F21S 41/40; F21S 41/16; F21Y 2115/10; B60Q 1/1423; B60Q 1/18
See application file for complete search history.

(56) References Cited

U.S. PATENT DOCUMENTS

| | | | | |
|---|---|---|---|---|
| 6,742,543 | B2* | 6/2004 | Schacher | F16K 11/105 |
| | | | | 137/879 |
| 7,410,279 | B2* | 8/2008 | Kawashima | F21S 43/40 |
| | | | | 362/507 |
| 7,473,013 | B2* | 1/2009 | Shimada | F21V 5/04 |
| | | | | 257/98 |
| 9,022,625 | B2* | 5/2015 | Okubo | F21S 41/27 |
| | | | | 362/545 |
| 9,482,401 | B2* | 11/2016 | Yagi | F21S 41/255 |
| 2007/0127253 | A1* | 6/2007 | Kawashima | F21S 41/155 |
| | | | | 362/509 |
| 2008/0285297 | A1 | 11/2008 | Ishida | |
| 2016/0102831 | A1 | 4/2016 | Okubo et al. | |
| 2016/0146417 | A1* | 5/2016 | Ohsawa | F21S 41/143 |
| | | | | 362/521 |

FOREIGN PATENT DOCUMENTS

| | | |
|---|---|---|
| JP | 2008-288010 A | 11/2008 |
| JP | 2014-229354 A | 12/2014 |

OTHER PUBLICATIONS

Chinese Office Action issued in corresponding Chinese Application No. 201680027360.8 dated Jul. 7, 2020.

* cited by examiner

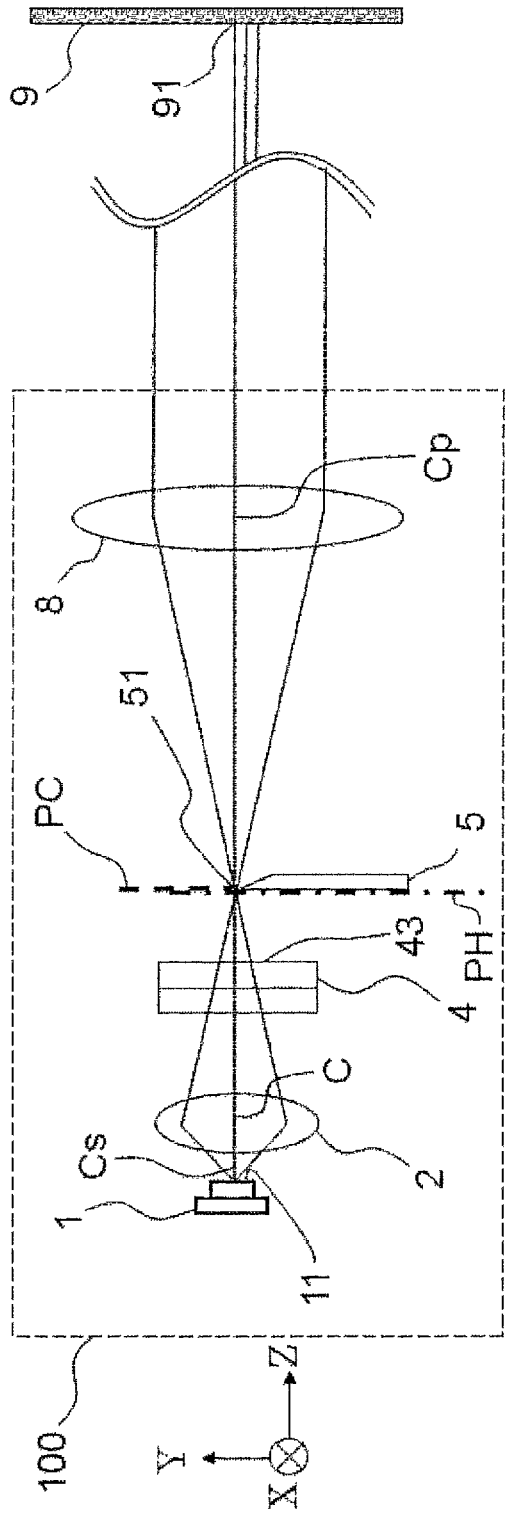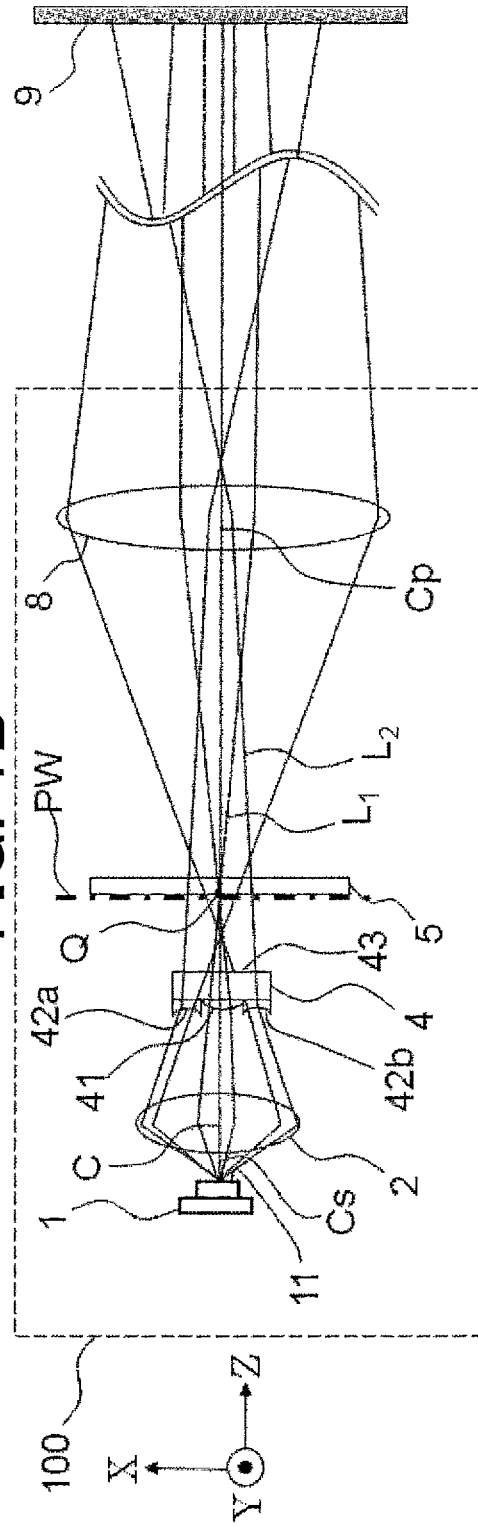

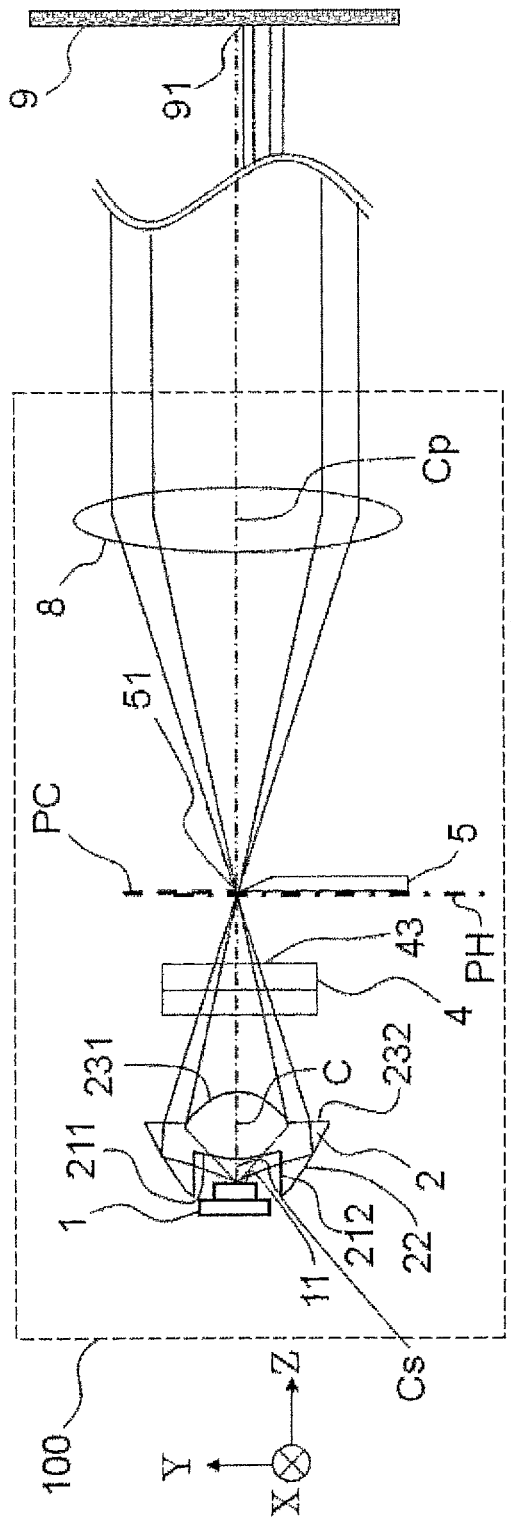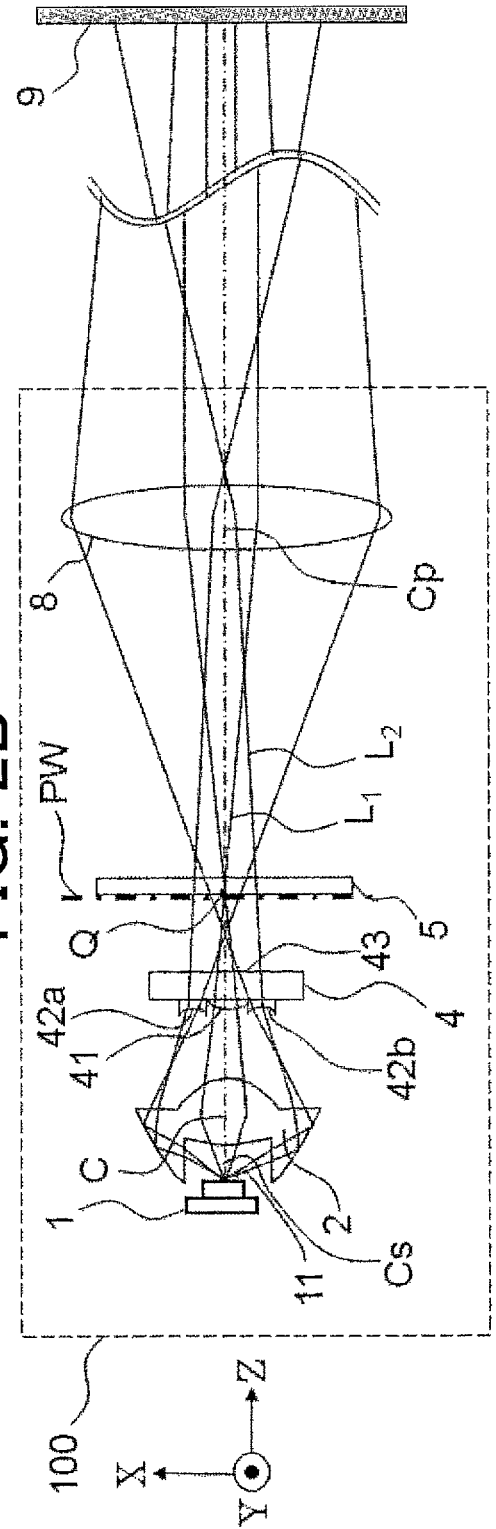

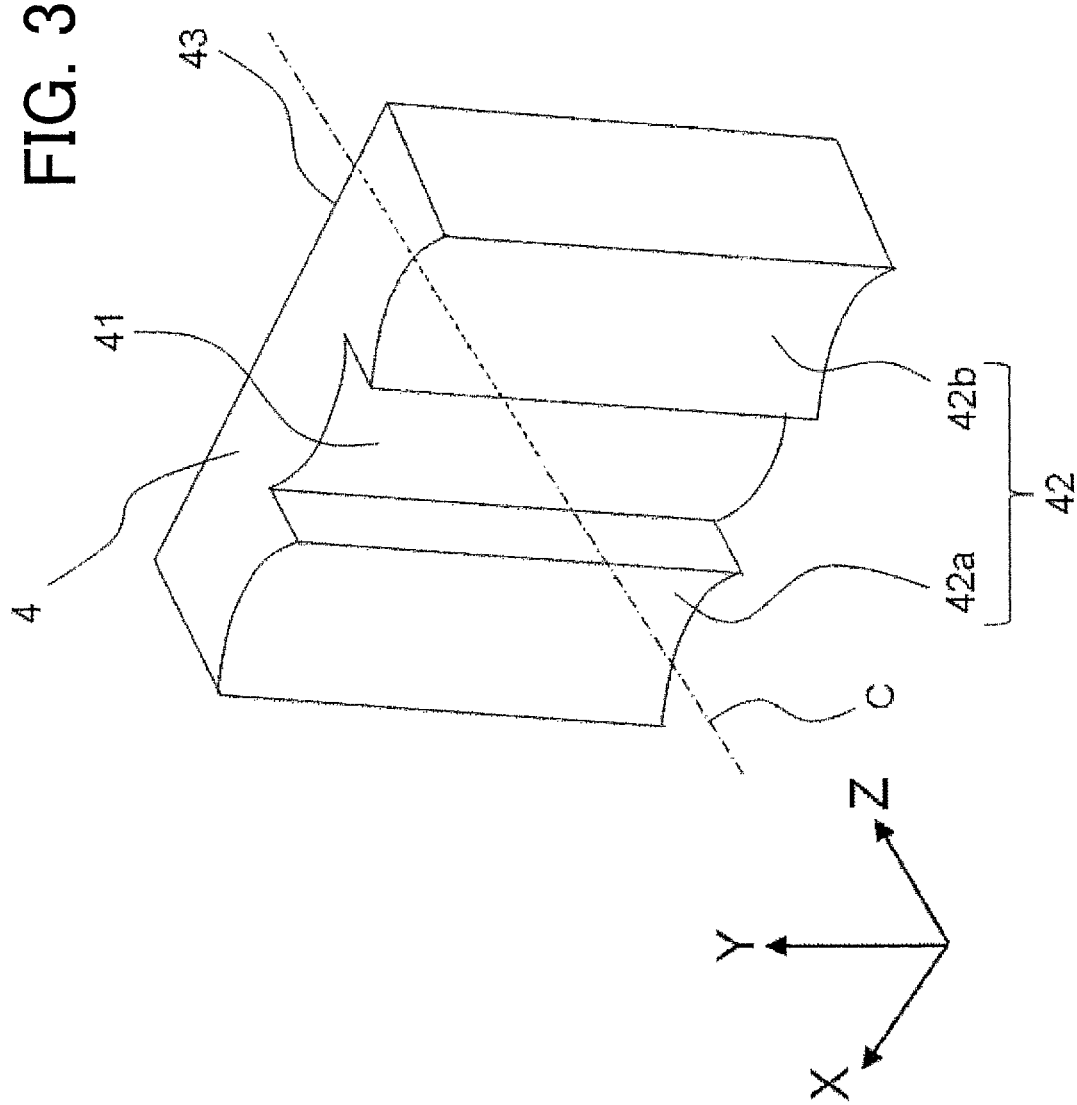

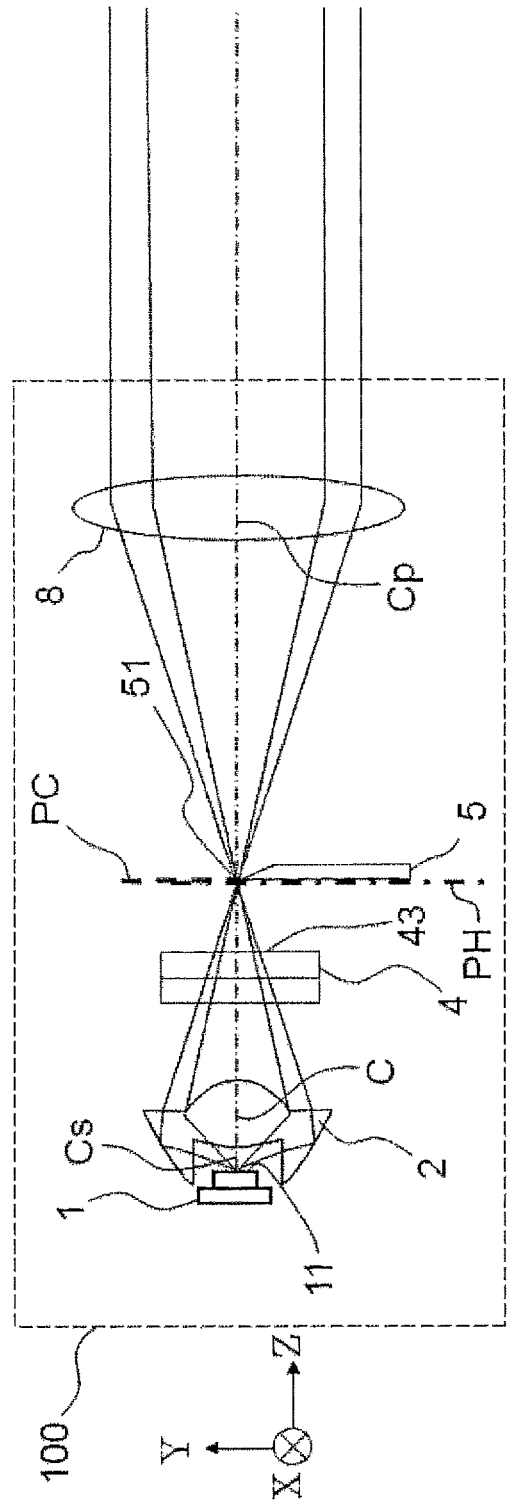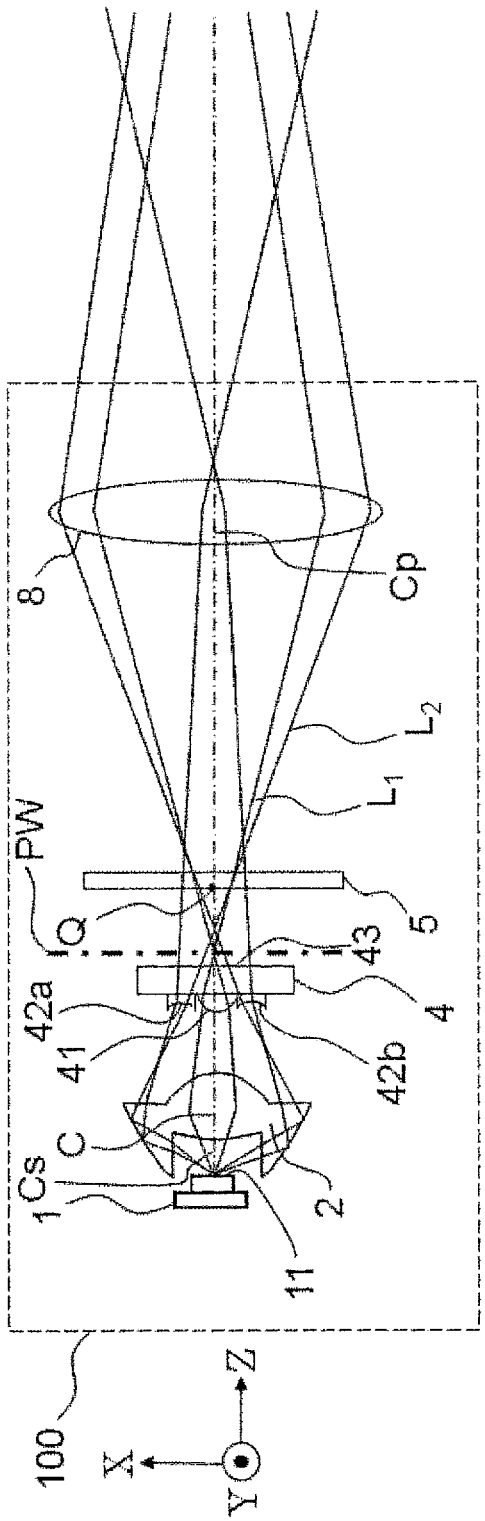

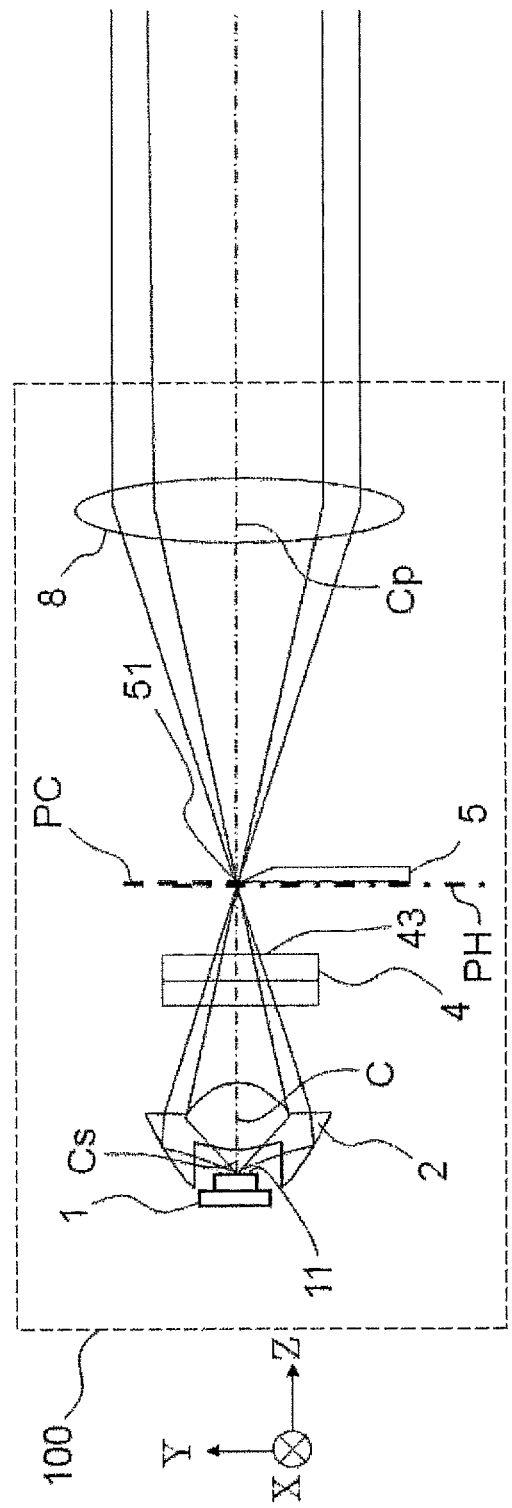
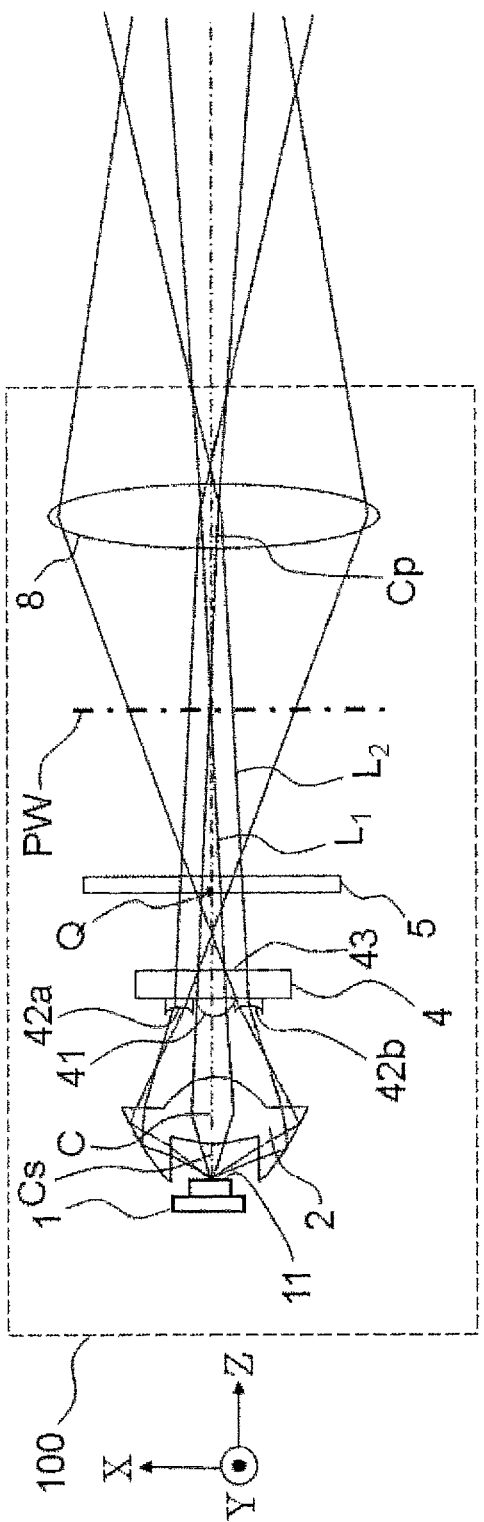

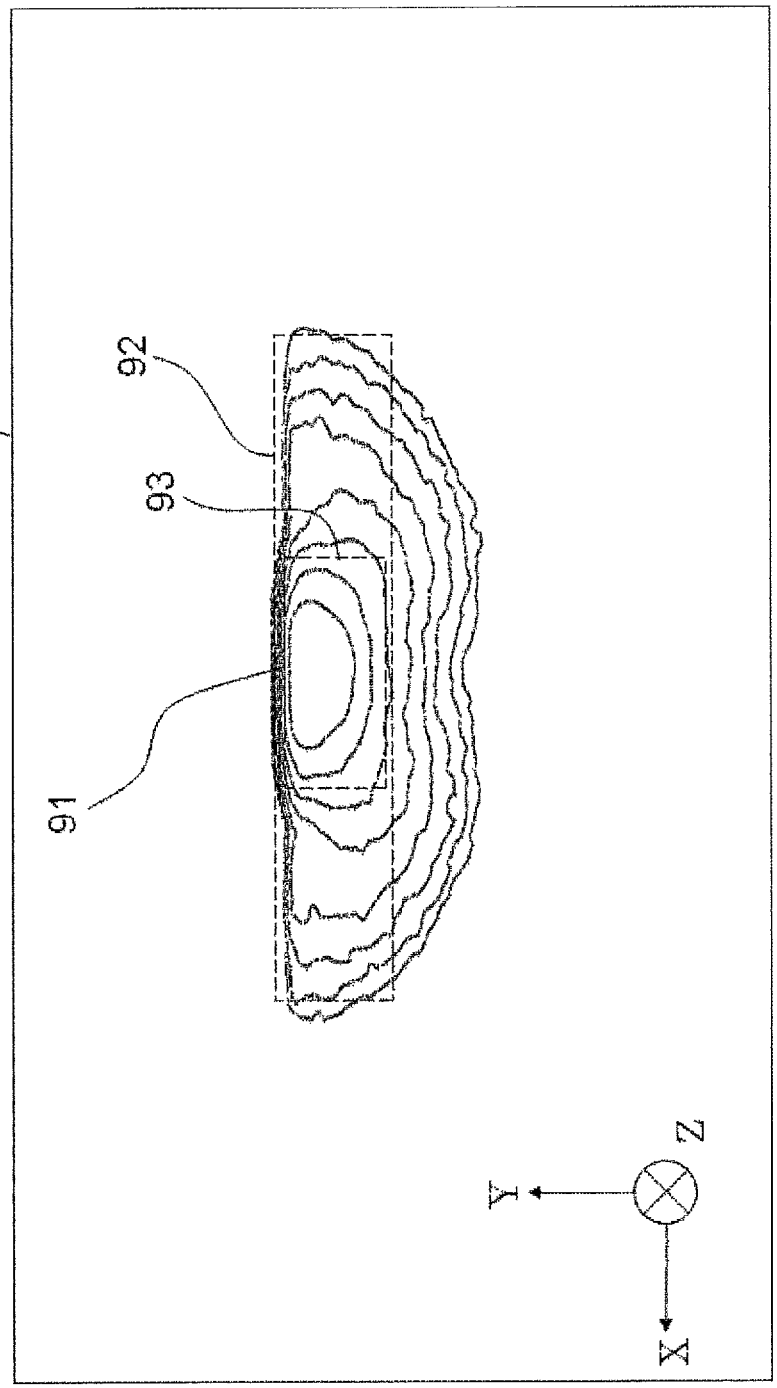

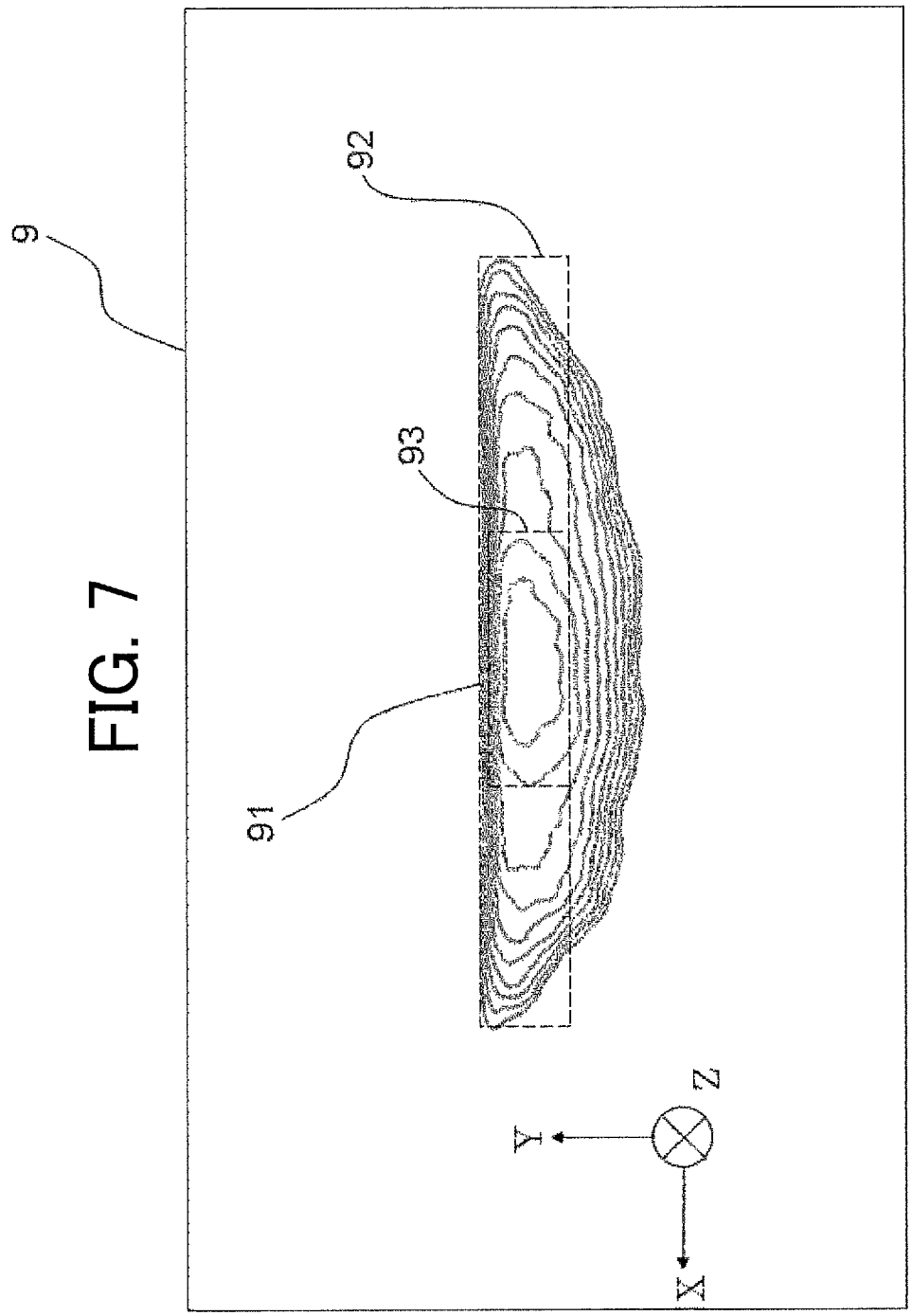

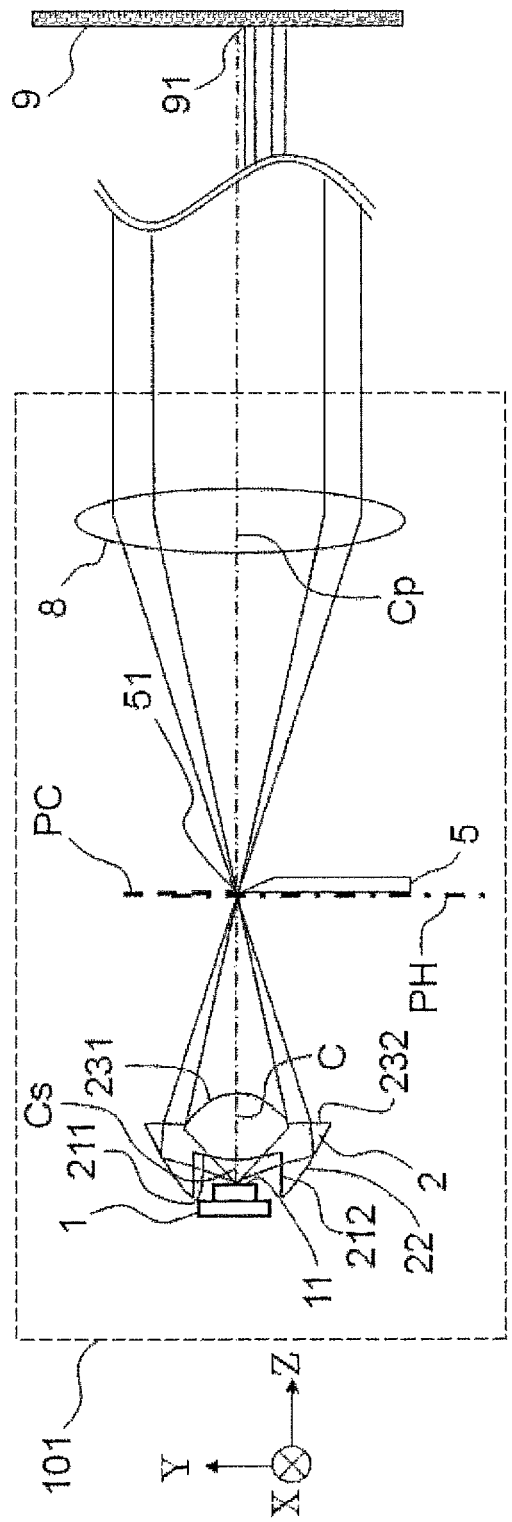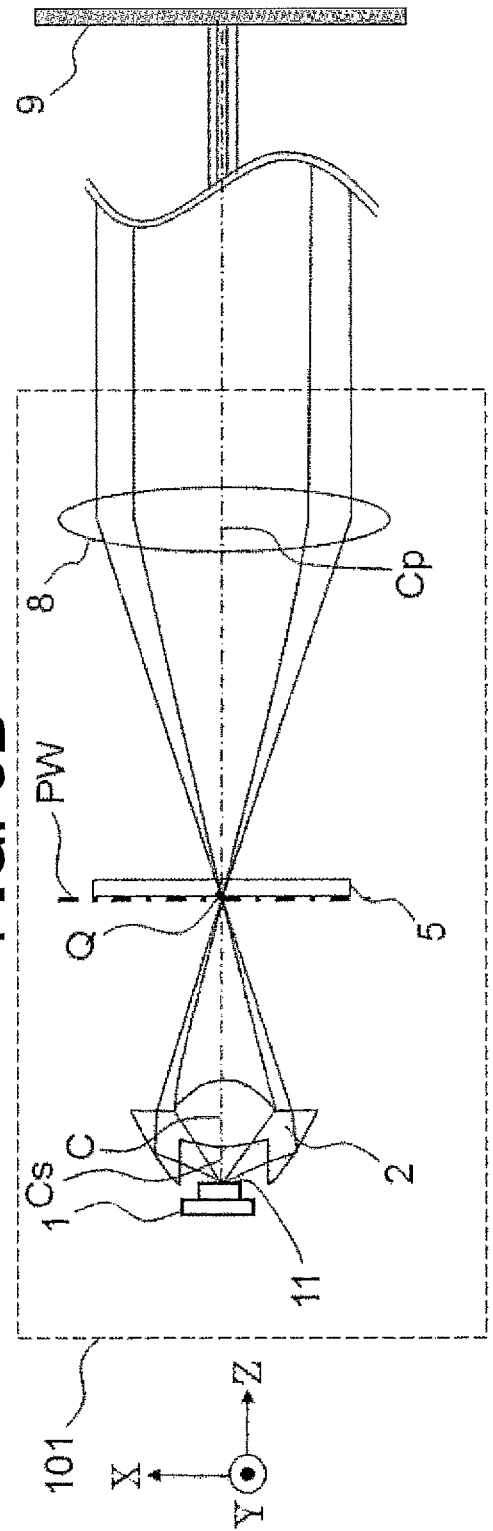

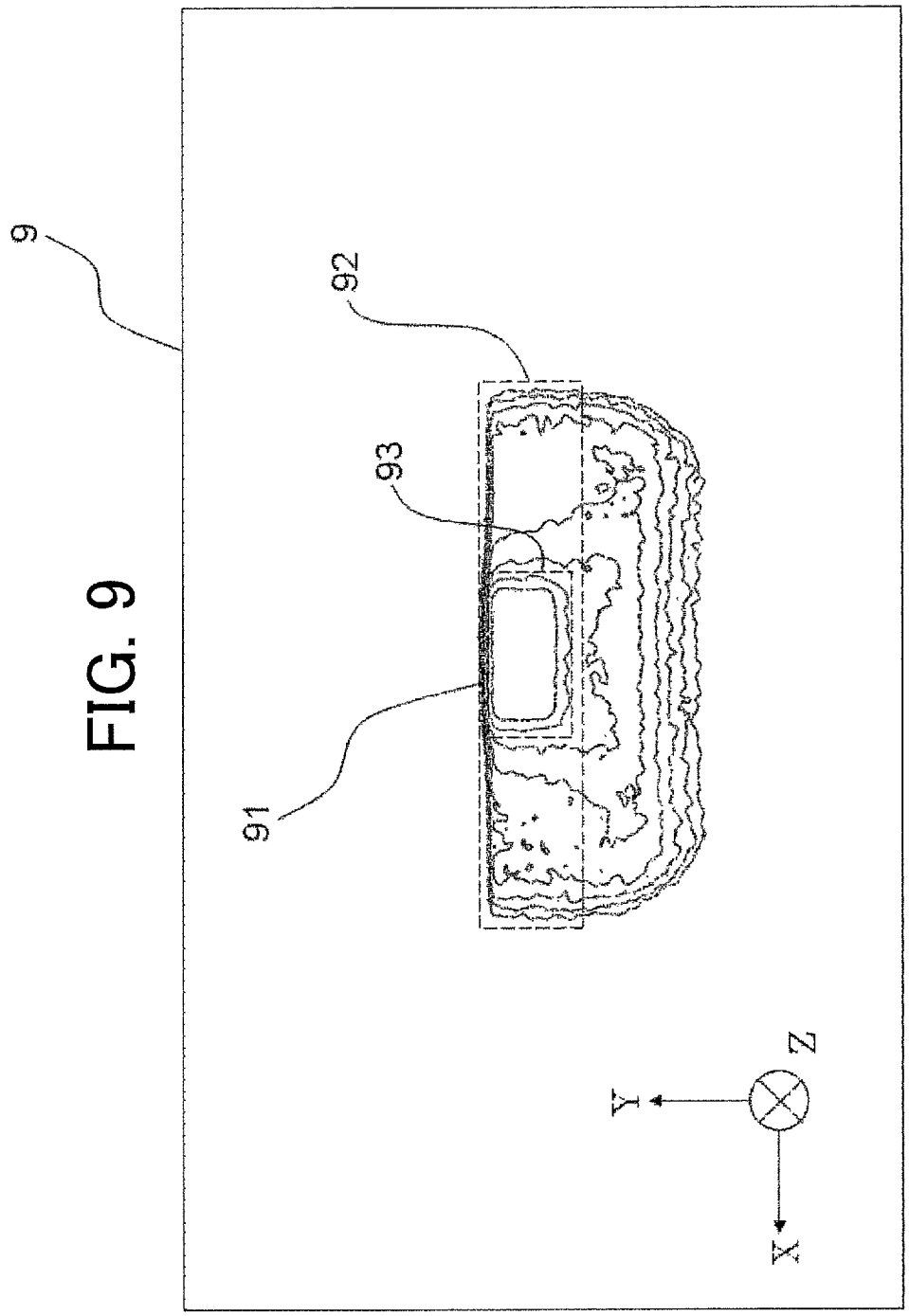

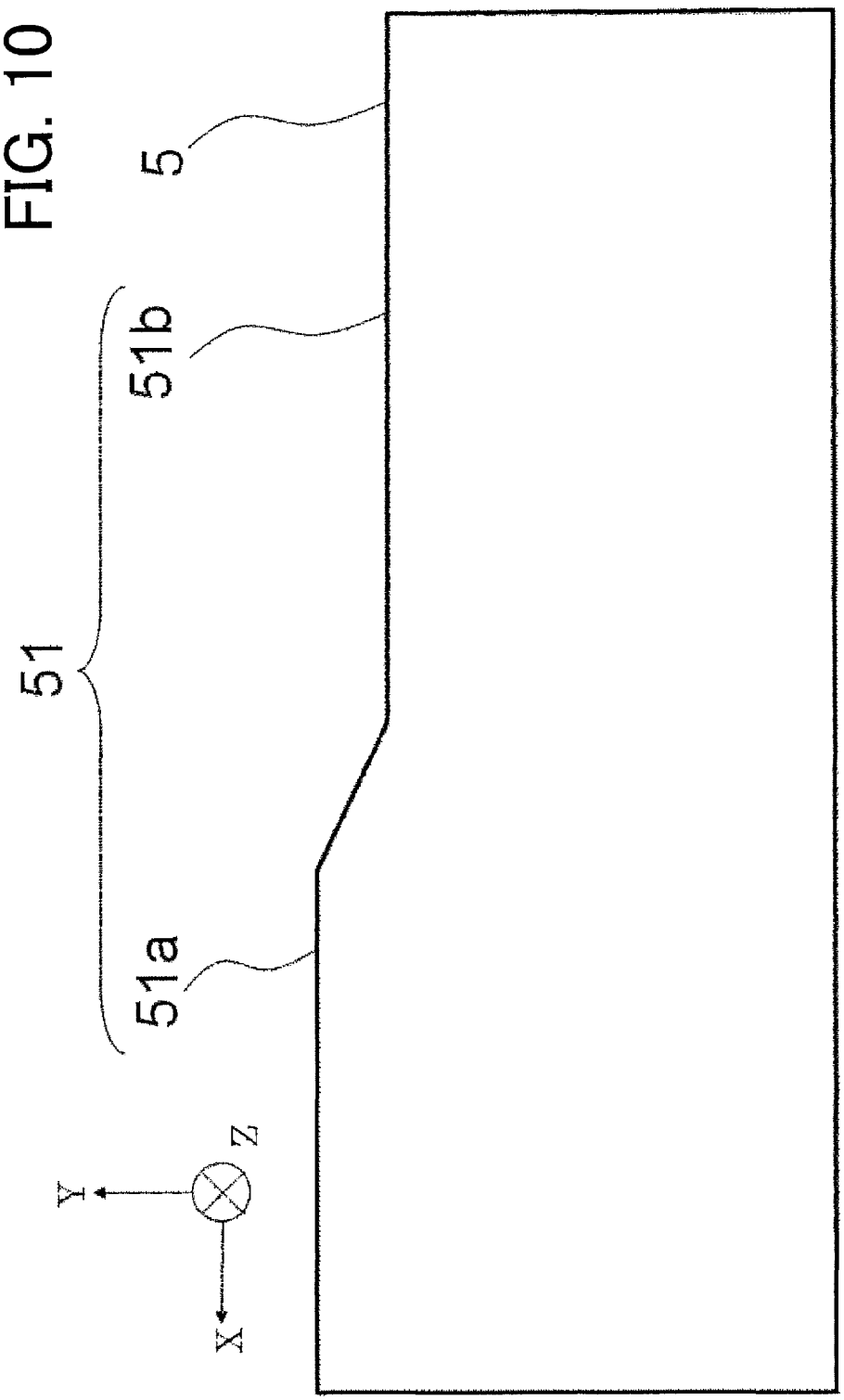

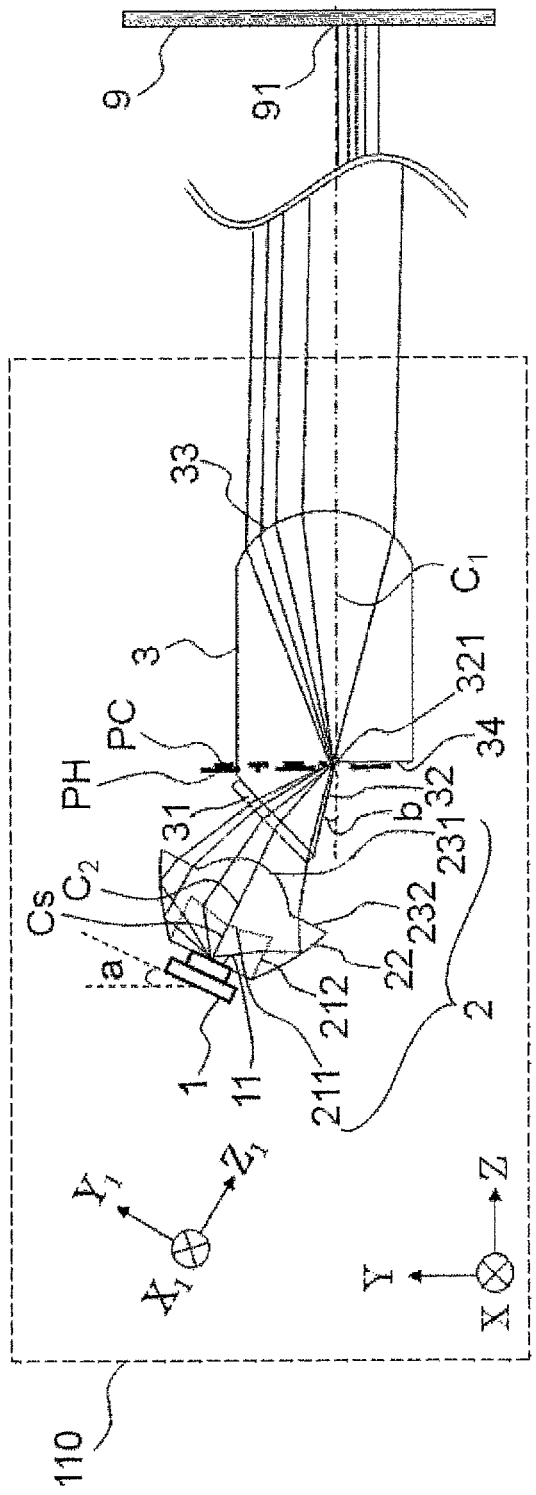
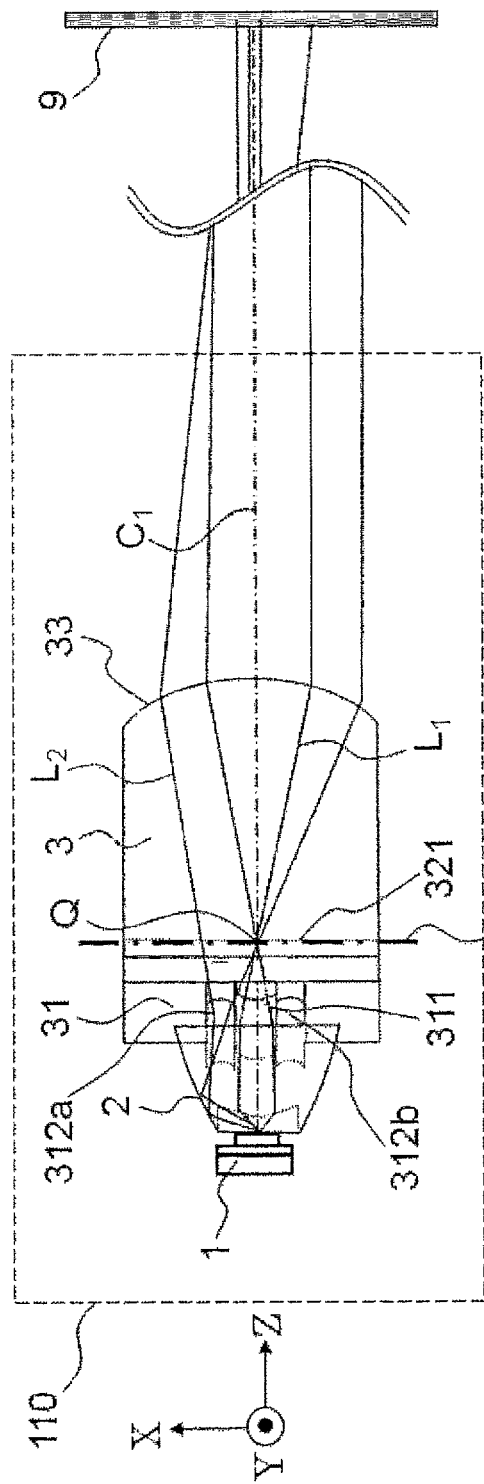
FIG. 11A
FIG. 11B

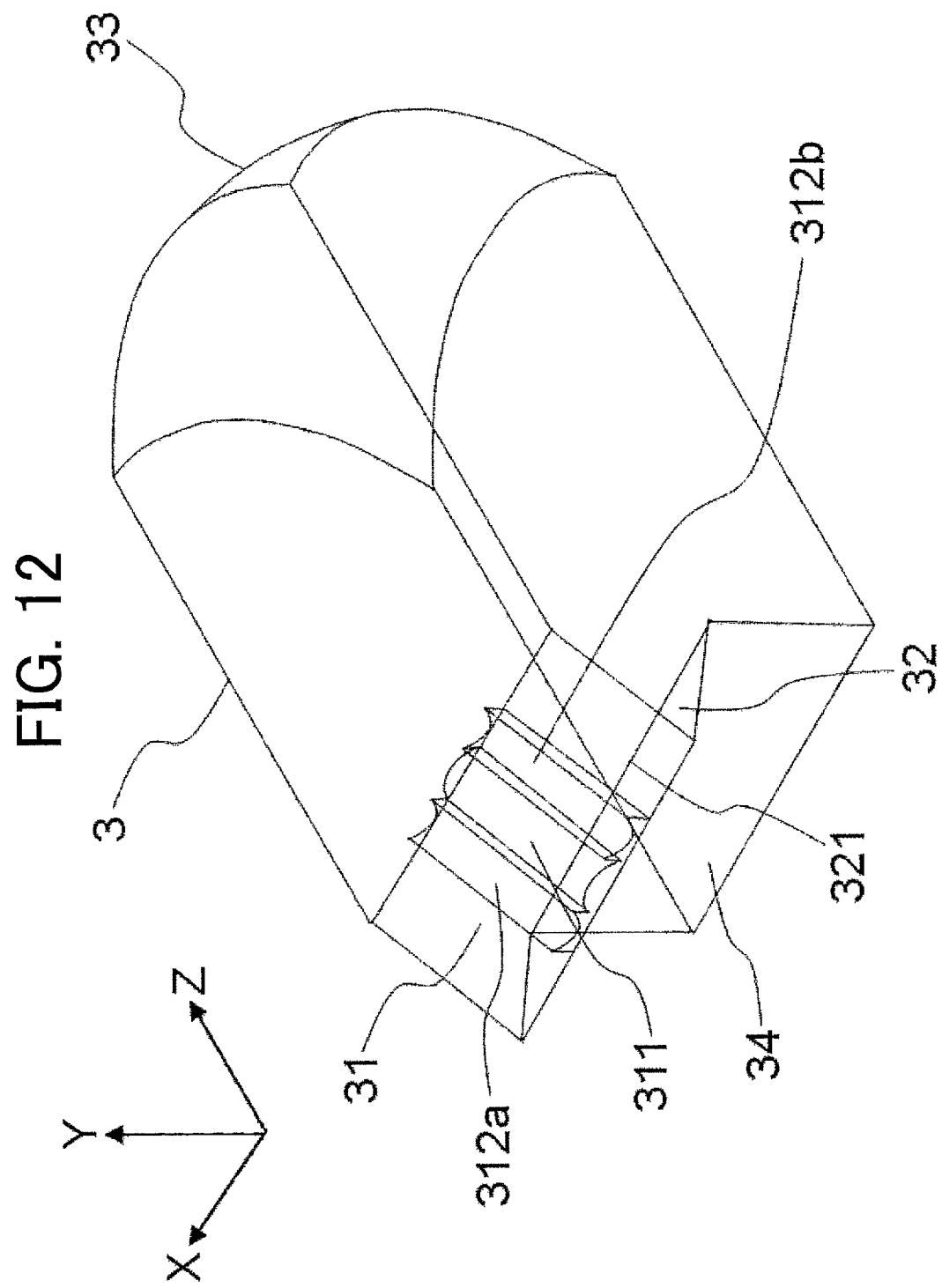

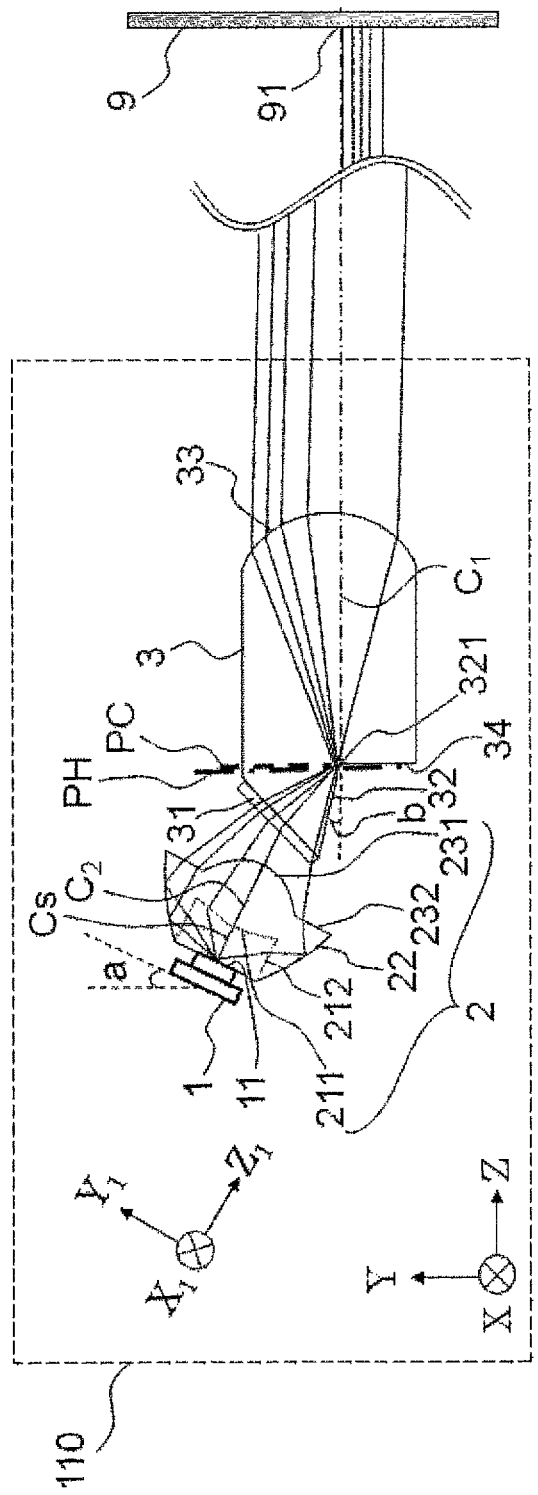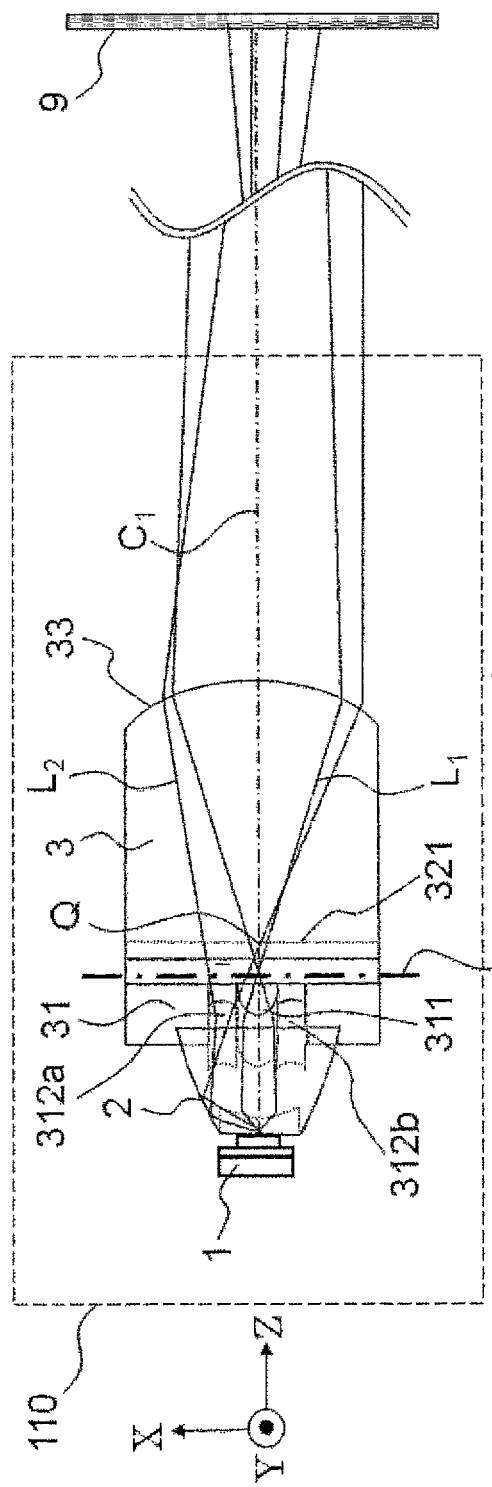

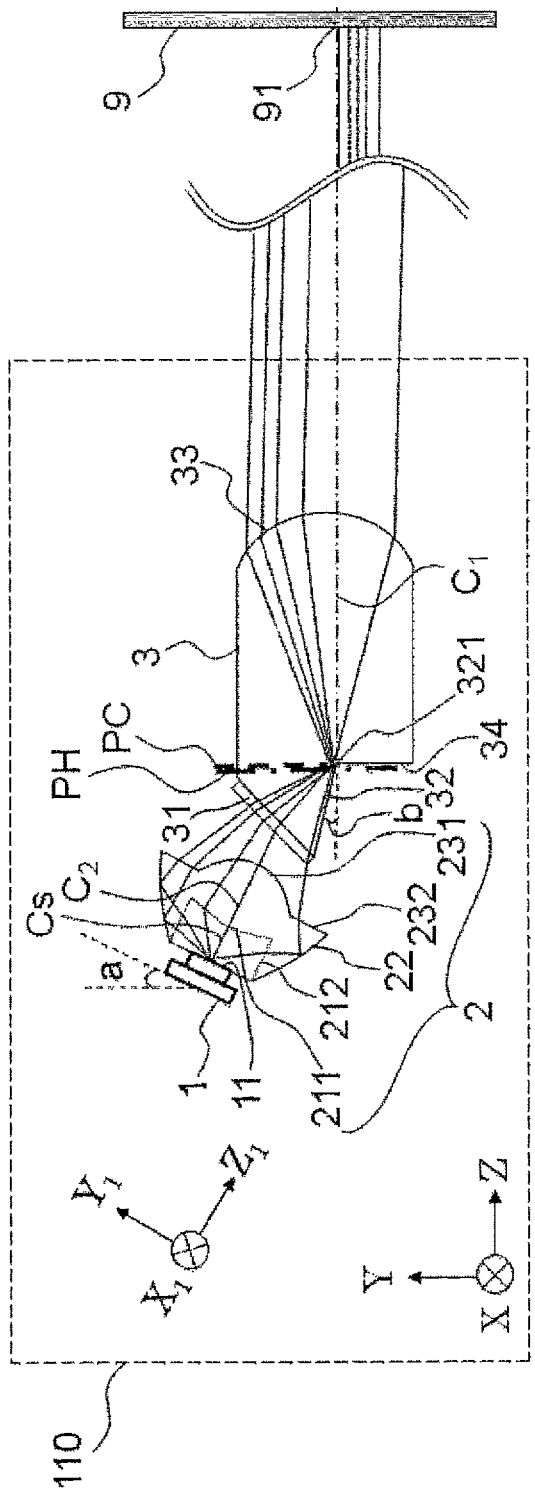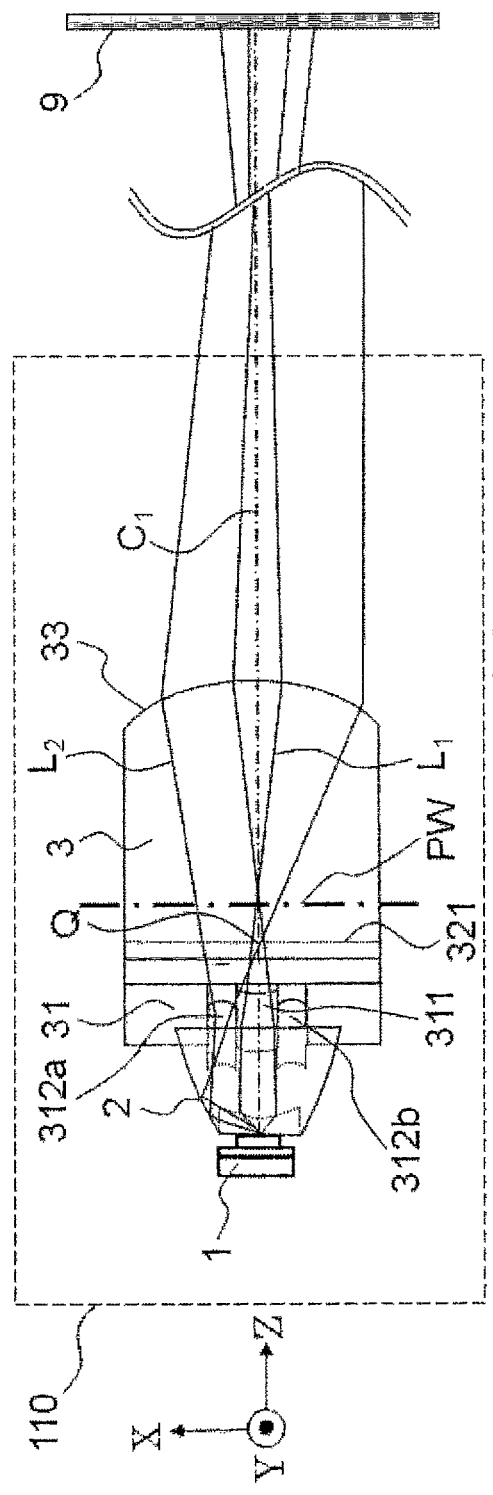
FIG. 14A
FIG. 14B

HEADLIGHT MODULE AND HEADLIGHT DEVICE

TECHNICAL FIELD

The present invention relates to a headlight module and a headlight device for illuminating a region in front of a vehicle or the like.

BACKGROUND ART

A headlight device for a vehicle is required to satisfy conditions of a prescribed light distribution pattern prescribed by road traffic rules or the like.

As one of the road traffic rules, the predetermined light distribution pattern regarding an automobile low beam is in a laterally long shape that is narrow in the vertical direction, for example.

Further, a region on the lower side of a cutoff line (on the inside of the light distribution pattern) is required to have the maximum illuminance. The region having the maximum illuminance will be referred to as a "high illuminance region". Here, the "region on the lower side of the cutoff line" means an upper part of the light distribution pattern, which corresponds to a part illuminating a far region in the case of a headlight device.

Furthermore, light distribution irregularity required to be suppressed in the light distribution pattern. The light distribution irregularity appears as a dark line or a bright line when the headlight device illuminates the road surface. The light distribution irregularity could deteriorate the driver's sense of distance. Therefore, the headlight device is required to provide light distribution with less light distribution irregularity.

Patent Reference 1 discloses a technology for generating a high luminosity region by using a convex lens. A bright light source image is formed in the vicinity of an upper edge of a shade by using the convex lens, and the light source image is projected by a projection lens. Accordingly, the high luminosity region is formed in the vicinity of the cutoff line.

PRIOR ART REFERENCE

Patent Reference

Patent Reference 1: Japanese Patent Application Publication No. 2008-288010

SUMMARY OF THE INVENTION

Problem to be Solved by the Invention

However, in the configuration described in the Patent Reference 1, the light source image formed by the convex lens is projected forward by the image projection lens as an inverted image. The light source causes luminance irregularity depending on the light source's pattern of electrodes or the like. Further, the light source causes luminance irregularity depending on the light source's configuration, shape, or the like. Thus, the luminance irregularity of the light source is directly projected as illuminance irregularity in the light distribution pattern. In other words, the luminance irregularity of a light-emitting surface of the light source is directly projected as illuminance irregularity in the light distribution pattern.

That is, the luminance irregularity of the light source is projected directly and that causes the light distribution irregularity to the light distribution pattern.

An object of the present invention, which has been made in consideration of the problem with the conventional technology, is to provide a headlight device capable of generating the high illuminance region while reducing the light distribution irregularity by using a segmented optical surface.

Means for Solving the Problem

A headlight module includes a light source configured to emit light, a light distribution control element configured to form a light distribution pattern by changing a divergence angle of the light incident therein, and a projection optical element configured to project the light distribution pattern. The light distribution control element includes a first light distribution formation part configured to form a high luminosity region in the light distribution pattern and a second light distribution formation part configured to form a low luminosity region in the light distribution pattern. The low luminosity region is lower in luminosity than the high luminosity region.

Effects of the Invention

According to the present invention, a headlight module or a headlight device with less light distribution irregularity can be provided.

BRIEF DESCRIPTION OF THE DRAWINGS

FIGS. 1A and 1B are configuration diagrams showing the configuration of a headlight module 100 according to a first embodiment.

FIGS. 2A and 2B are configuration diagrams showing the configuration of the headlight module 100 according to the first embodiment.

FIG. 3 is a perspective view of a light distribution control element 4 of the headlight module 100 according to the first embodiment.

FIGS. 4A and 4B are diagrams for explaining a condensing position PW of the headlight module 100 according to the first embodiment.

FIGS. 5A and 5B are diagrams for explaining the condensing position PW of the headlight module 100 according to the first embodiment.

FIG. 6 is a diagram showing illuminance distribution on an illumination surface 9 formed by the headlight module 100 according to the first embodiment in contour display.

FIG. 7 is a diagram showing illuminance distribution on the illumination surface 9 formed by the headlight module 100 according to the first embodiment in contour display.

FIGS. 8A and 8B are configuration diagrams showing a headlight module 101 according to a comparative example of the first embodiment.

FIG. 9 is a diagram showing illuminance distribution on the illumination surface 9 formed by the headlight module 101 according to the comparative example of the first embodiment in contour display.

FIG. 10 is a schematic diagram showing the shape of a side 51 of a light blocking plate 5 of the headlight module 100 according to the first embodiment.

FIGS. 11A and 11B are configuration diagrams showing the configuration of a headlight module 110 according to a second embodiment.

FIG. 12 is a perspective view of a light guide projection optical element 3 of the headlight module 110 according to the second embodiment.

FIGS. 13A and 13B are diagrams for explaining the condensing position PW of the headlight module 110 according to the second embodiment.

FIGS. 14A and 14B are diagrams for explaining the condensing position PW of the headlight module 110 according to the second embodiment.

MODE FOR CARRYING OUT THE INVENTION

Figure 15A:
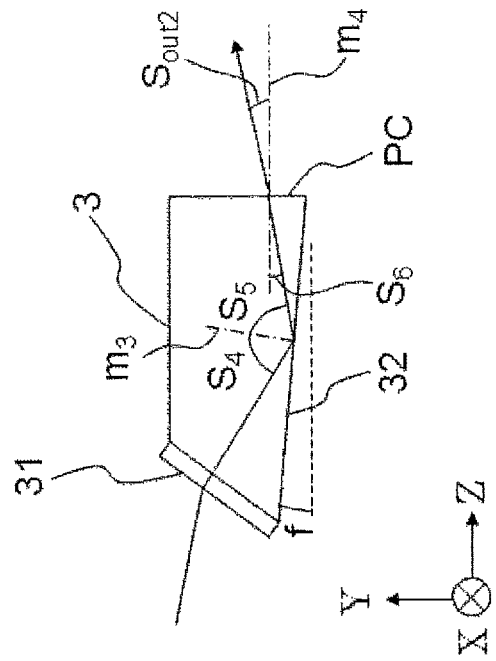
FIGS. 15A and 15B are diagrams for explaining the shape of a reflecting surface 32 of the light guide projection optical element 3 in the headlight module 110 according to the second embodiment.

As explained earlier, in the Patent Reference 1, a light source image is formed by a convex lens and the light source image is projected by a projection lens. In particular, the Patent Reference 1 discloses an example employing a white light-emitting diode (semiconductor light source) as the light source.

The light-emitting surface of the light-emitting diode does not uniformly emit light. The luminance irregularity occurs on the light-emitting surface of the light-emitting diode owing to the pattern of electrodes or the like. Thus, when the light source image is formed by a convex lens, the luminance irregularity is directly projected by the image projection lens and that causes the illuminance irregularity.

Further, the shape of the light-emitting surface of the light-emitting diode is generally a square shape or a circular shape. Thus, when the light source image is formed by a convex lens, the boundary line of the shape of the light-emitting surface is directly projected by the image projection lens. Accordingly, the light distribution irregularity occurs when the light distribution pattern is formed.

Furthermore, in cases where the light source image is formed by one convex lens as in the Patent Reference 1, the light distribution irregularity can be caused by occurrence of aberration.

These types of light distribution irregularity cannot be eliminated sufficiently just by superimposing a low-luminosity image on a high-luminosity image. In the Patent Reference 1, an overall shape of a light distribution pattern for a low beam is formed with reflected light from a reflector, an image of a light-emitting chip is substantially formed at a position above and in the vicinity of the upper edge of a shade by the convex lens, and the image is projected forward by the image projection lens, for example.

In the embodiments described below, the light distribution irregularity can be inhibited by using a segmented optical surface, and thus a high luminosity region can be formed by using a solid-state light source. The "segmented optical surface" means an optical surface divided into segments. In the following embodiments, segments of the segmented optical surface have different optical characteristics.

In the embodiments described below, light from the light source is incident on segments differing in the power, and superposing multiple images formed by the segments inhibits the interval between contour lines of the light distribution pattern from discontinuously changing. For example, the light distribution irregularity occurring at an edge of one light source image can be reduced by superimposing the edge of the one light source image on an adjoining light source image. Further, the high luminosity region in the light distribution pattern and the overall shape of the light distribution pattern are formed by using segments differing in the power.

The aperture of each segment is small in comparison with one lens. Therefore, the segmented optical surface is capable of inhibiting the occurrence of aberration compared to the case where the light source image is formed by one convex lens. Accordingly, the light distribution irregularity is inhibited.

Incidentally, the projection lens is used in the same meaning as the image projection lens. Here, the "projection" means to cast a ray. The "image projection" means to project an image. In this example, a projection lens 8 projects a light source image or a light distribution pattern onto an illumination surface 9.

In recent years, vehicles are desired to achieve energy saving, for example, from the viewpoint of lightening the load on the environment such as reducing carbon dioxide ($CO_2$) emission and fuel consumption. Accordingly, headlight devices for vehicles are also requested to achieve size reduction, weight reduction and electric power saving. In such a circumstance, it is desired to employ a semiconductor light source as a light source of a vehicle headlight device. The semiconductor light source has high luminous efficiency compared to a conventional halogen bulb (lamp light source).

The "semiconductor light source" means a light emitting diode (LED), a laser diode (LD) or the like, for example.

The conventional lamp light sources (vacuum light sources) are light sources of lower directivity in comparison with the semiconductor light sources. Incandescent lamps, halogen lamps, fluorescent lamps, etc. can be taken as examples of the lamp light sources. Therefore, the lamp light source gives directivity to the emitted light by use of a reflector (e.g., reflecting mirror). In contrast, the semiconductor light source, having at least one light-emitting surface, emits light to the light-emitting surface's side.

As above, the semiconductor light source differs from the lamp light source in the light emission characteristics.

Therefore, the semiconductor light source is desired to employ not the conventional optical system using a reflector (e.g., reflecting mirror) but an optical system suitable for the semiconductor light source.

For example, the reflector is suitable for a lamp having a point source of light. Therefore, if the reflector is used for a light source like an LED, light is emitted from not a single point source of light but multiple point sources of light and the amount of wasted light increases. The amount of light correctly reflected by the reflector decreases, while the wasted light turns into glare light. This causes a decrease in the amount of light in the region of the light distribution pattern.

Incidentally, the aforementioned semiconductor light source is a type of the solid-state light source. An organic electroluminescence (organic EL) light source and a light source emitting light by irradiating a fluorescent substance applied on a plane surface with pumping light are given as examples of the solid-state light source. These solid-state light sources are also desired to employ optical systems similar to the semiconductor light sources.

Such light sources, not including a vacuum light source and having directivity, will be referred to as "solid-state light sources".

The "directivity" is a property having different intensity thereof depending on directions when light or the like is emitted to space. Here, "having directivity" means a state in which light travels to the front side of the light-emitting surface without traveling to the back side of the light-emitting surface as mentioned earlier. That is, the divergence angle of the light emitted from the light source is less than or equal to 180 degrees.

The "headlight device" is an illuminating device mounted on a transport machine or the like and used for increasing the operator's visibility and visibility from the exterior. The headlight device for a vehicle is also referred to as a head lamp or a headlight.

In the following, examples of embodiments according to the present invention will be described with reference to drawings by giving a headlight device for a vehicle as an example.

Incidentally, the following description of the embodiments will be given by using XYZ coordinates to facilitate the explanation.

The lateral direction of the vehicle is defined as an X-axis direction. The left-hand side with respect to a forward direction of the vehicle is defined as a +X-axis direction, while the right-hand side with respect to the forward direction of the vehicle is defined as a −X-axis direction. Here, the "forward direction" means the traveling direction of the vehicle. In other words, the "forward direction" is the direction in which the headlight device emits light.

The vertical direction of the vehicle is defined as a Y-axis direction. The upper side is defined as a +Y-axis direction, while the lower side is defined as a −Y-axis direction. The "upper side" means the direction of the sky, while the "lower side" means the direction of the ground (e.g., road surface).

The traveling direction of the vehicle is defined as a Z-axis direction. The traveling direction is defined as a +Z-axis direction, while the opposite direction is defined as a −Z-axis direction. The +Z-axis direction will be referred to as the "forward direction", while the −Z-axis direction will be referred to as a "backward direction". Thus, the +Z-axis direction is the direction in which the headlight device emits light.

As explained above, in the following embodiments, a Z-X plane is regarded as a plane parallel to the road surface. This is because the road surface is a "horizontal plane" in common conception. Therefore, the Z-X plane is regarded as a "horizontal plane". The "horizontal plane" is a plane perpendicular to the direction of the gravity.

However, there are cases where the road surface is tilted with respect to the traveling direction of the vehicle, such as ascending slopes and descending slopes. In such cases, the "horizontal plane" is regarded as a plane parallel to the road surface, that is, the "horizontal plane" is not a plane perpendicular to the direction of the gravity.

On the other hand, it is rare for an ordinary road surface to be tilted in the lateral direction with respect to the traveling direction of the vehicle. The "lateral direction" means the width direction of the road. In such cases, the "horizontal plane" is considered as a plane perpendicular to the gravity direction. For example, even when the road surface is tilted in the lateral direction and the vehicle is perpendicular to the lateral direction of the road surface, this state is considered to be equivalent to a state in which the vehicle is tilted in the lateral direction with respect to the "horizontal plane".

For the sake of simplification, the following explanation will be given assuming that the "horizontal plane" is a plane perpendicular to the gravity direction, that is, the Z-X plane is a plane perpendicular to the gravity direction.

Further, the light source in the following embodiments will be described as a light source having directivity (solid-state light source). As mentioned earlier, a typical example of the light source is a semiconductor light source such as a light emitting diode or a laser diode. The light source can also be an organic electroluminescence light source, a light source emitting light by irradiating a fluorescent substance applied on a plane surface with pumping light, or the like.

The reason why a solid-state light source is employed as an example of the light source in the embodiments is that it is difficult to meet the request for the energy saving or the downsizing of the device when a vacuum light source is used. However, the light source may be a vacuum light source in cases where a request for increasing light utilization efficiency is prioritized over the request for the energy saving. In other words, the light source may be a vacuum light source in cases where there is no request for the energy saving or the downsizing of the device.

The present invention can be employed for the low beam, high beam, etc. of a headlight device for a vehicle. The present invention can be employed also for the low beam, high beam, etc. of a headlight device for a motorcycle. The present invention can be employed also for a headlight device for other types of vehicles such as a three-wheel vehicle and a four-wheel vehicle.

However, the following description will be given of cases of forming the light distribution pattern of the low beam of a headlight device for a motorcycle, for example. In the light distribution pattern of the low beam of a headlight device for a motorcycle, the cutoff line is a straight line that is horizontal in the lateral direction of the vehicle (X-axis direction). The region on the lower side of the cutoff line (on the inside of the light distribution pattern) is the brightest.

The "light distribution" means luminosity distribution of a light source with respect to space. In other words, it is spatial distribution of light emitted from the light source. The "luminosity", representing the degree of intensity of light emitted by an illuminant, is obtained by dividing a luminous flux passing through a minute solid angle in a certain direction by the minute solid angle. Thus, the "luminosity" is a physical quantity representing how intense is light emitted from the light source. The "illuminance" is a physical quantity representing brightness of light irradiated to a planar object. The illuminance equals a luminous flux irradiated a unit area.

The "light distribution pattern" represents the shape of a light flux and light intensity distribution (luminosity distribution) resulting from the direction of light emitted from the light source. The "light distribution pattern" will be also used to mean an illuminance pattern on the illumination surface 9 explained later. Thus, the light distribution pattern represents the shape of illumination and the illuminance distribution of the light on the illumination surface 9. Further, "lighting distribution" means intensity distribution (luminosity distribution) of light with respect to the direction of light emitted from the light source. The "lighting distribution" will be also used to mean illuminance distribution on the illumination surface 9 explained later.

Therefore, in the following embodiments, an image (light distribution pattern) formed on a conjugate plane PC is also explained as luminosity distribution, for example.

In the road traffic rules, so as not to dazzle drivers of oncoming vehicles, a light boundary line on the upper side of the light distribution pattern (cutoff line) is required to be distinct. Specifically, a distinct cutoff line which allows an area on the upper side of the cutoff line (outside the light distribution pattern) to be dark and allows an area on the lower side of the cutoff line (inside the light distribution pattern) to be bright is required.

To achieve such a distinct cutoff line, major chromatic aberration, blurring, or the like should not occur on the cutoff line. The "occurrence of blurring on the cutoff line" means the cutoff line becoming indistinct.

The headlight device for a vehicle is required to realize such complicated light distribution patterns. To realize the complicated light distribution patterns, it is necessary to locally increase the illuminance by using a condensing lens or the like.

The "cutoff line" means a bright-dark separator line of light formed when the light from the headlight device is irradiated to a wall or a screen, that is, a separator line formed on the upper side of the light distribution pattern. In other words, the cutoff line is a boundary line between a bright part and a dark part of light on the upper side of the light distribution pattern, that is, a boundary line between a bright region (the inside of the light distribution pattern) and a dark region (the outside of the light distribution pattern) of light on the upper side of the light distribution pattern.

The cutoff line is a term that is used when a direction of illumination by a headlight device used when vehicles are passing each other is adjusted. The headlight device used when vehicles are passing each other is referred to also as the low beam.

The "low beam" is a downward beam to be used when a vehicle passes by an oncoming vehicle, and the like. In general, the low beam illuminates approximately 40 meters ahead of the vehicle. The "vertical direction" means a direction perpendicular to the ground surface (road surface).

Incidentally, the aforementioned light distribution pattern on a wall or a screen is explained as illuminance distribution. Therefore, the brightest region is referred to as a "high illuminance region". In contrast, when the light distribution pattern is considered as luminosity distribution, the brightest region of the light distribution pattern is a "high luminosity region". For example, the high luminosity region of the light distribution pattern on the conjugate plane PC explained later corresponds to the high illuminance region of the light distribution pattern on the illumination surface 9.

Further, as an example of another road traffic rule, for recognition of pedestrians and traffic signs, the headlight device needs to have a "rising line" that raises illumination on a sidewalk's side. This is for letting the driver visually recognize humans or traffic signs or the like existing on the sidewalk's side without dazzling drivers of oncoming vehicles. Here, the "rising line" represents a shape of a light distribution pattern in which a low beam is flat on an oncoming vehicle's side and obliquely rises on a sidewalk's side with respect to the oncoming vehicle's side.

The aforementioned wall or screen is described as the illumination surface 9 in the following embodiments. The illumination surface 9 is an imaginary surface that is set at a predetermined position in front of the vehicle. The illumination surface 9 is a surface parallel to the X-Y plane. Thus, the illumination surface 9 is a surface perpendicular to the direction (+Z-axis direction) in which the headlight device emits light. The predetermined position in front of the vehicle is a position where the luminosity or illuminance of the headlight device is measured. The predetermined position in front of the vehicle is prescribed by road traffic rules or the like. In Europe, for example, the luminosity measurement position for automobile headlight devices prescribed by UNECE (United Nations Economic Commission for Europe) is a position at a distance of 25 meters from a light source. In Japan, the luminosity measurement position prescribed by Japanese Industrial Standards Committee (JIS) is a position at a distance of 10 meters from a light source.

A four-wheel vehicle is an ordinary four-wheel automobile or the like, for example. A three-wheel vehicle is a motor tricycle called Gyro, for example. The "motor tricycle called Gyro" means a scooter with three wheels including one front wheel and uniaxial two rear wheels. In Japan, it is categorized as a motorized bicycle. Such motor tricycles have a rotation axis in the vicinity of the center of the vehicle body and most of the vehicle body including the front wheel and the driver seat can be tilted in the lateral direction. This mechanism enables to shift the barycenter inward at a time of turning, similarly to a motorcycle.

First Embodiment

FIG. 1A and FIG. 1B are configuration diagrams showing a configuration of a headlight module 100 according to a first embodiment. FIG. 1A is a diagram showing the headlight module 100 as viewed from the right-hand side (−X-axis direction side) with respect to the vehicle's forward direction. FIG. 1B is a diagram showing the headlight module 100 as viewed from the upper side (+Y-axis direction side).

FIG. 2A and FIG. 2B are configuration diagrams showing a configuration of another headlight module 100 according to the first embodiment. FIG. 2A is a diagram showing the headlight module 100 as viewed from the right-hand side (−X-axis direction side) with respect to the vehicle's forward direction. FIG. 2B is a diagram showing the headlight module 100 as viewed from the upper side (+Y-axis direction side). FIG. 2 shows an example in which the shape of a condensing optical element 2 differs from that in FIG. 1.

FIG. 3 is a perspective view of a light distribution control element 4.

As shown in FIG. 1, the headlight module 100 according to the first embodiment includes a light source 1, the condensing optical element 2, the light distribution control element 4 and a projection lens 8. The headlight module 100 according to the first embodiment may include a light blocking plate 5. Incidentally, as will be explained later, the condensing optical element 2 can be left out in cases where the light distribution control element 4 has a light-condensing function. It is also possible to provide both the light distribution control element 4 and the condensing optical element 2 with the light-condensing function. There can be cases where the headlight module 100 includes the light source 1 and the condensing optical element 2 as a single unit formed by attaching the condensing optical element 2 to the light source 1.

In the first embodiment, an optical axis Cs of the light source 1, an optical axis C of the condensing optical element 2, and an optical axis Cp of the projection lens 8 coincide, for example. In the first embodiment, the optical axis C of the condensing optical element 2 coincides with the optical axis Cs of the light source 1, for example. In the first embodiment, the optical axis C of the condensing optical element 2 coincides with the optical axis Cp of the projection lens 8, for example.

<Light Source 1>

The light source 1 has a light-emitting surface 11. The light source 1 emits light from the light-emitting surface 11. For example, the light source 1 emits light for illuminating a region in front of the vehicle from the light-emitting surface 11.

The light source 1 is situated on the −Z-axis direction side of the condensing optical element 2.

In FIG. 1, the light source 1 emits light in the +Z-axis direction. To "emit" means to transmit light in a certain direction.

The type of the light source 1 is not particularly limited. However, the light source 1 is assumed to be an LED (light-emitting diode) in the following description as mentioned earlier. The light-emitting diode will hereinafter be referred to as an LED.

An axis extending perpendicularly to the light-emitting surface 11 of the light source 1 from the center of the light-emitting surface 11 is defined as the optical axis Cs of the light source 1. In FIG. 3, the optical axis Cs of the light source 1 is parallel to the Z-axis.

<Condensing Optical Element 2>

The condensing optical element 2 converts the light emitted from the light source 1 into condensed light. The condensing optical element 2 condenses the light emitted from the light source 1.

The condensing optical element 2 is situated on the +Z-axis side of (in front of) the light source 1. The condensing optical element 2 is situated on the −Z-axis side of (to the rear of) the light distribution control element 4.

The light emitted from the light source 1 is incident on the condensing optical element 2.

In the case of the condensing optical element 2, for example, the "incidence" means entry of light into the inside of the condensing optical element 2.

The "incidence" includes arrival of light at a light incidence surface, for example. In FIG. 2, this means arrival of light at an incidence surface 211 or 212 of the condensing optical element 2. Thus, in the case of the condensing optical element 2, the "incidence" includes arrival of light at the condensing optical element 2.

The condensing optical element 2 condenses light into any position in the forward direction (+Z-axis direction). The condensing optical element 2 is an optical element having the light-condensing function. Specifically, the condensing optical element 2 is an optical element having positive power.

The condensing position of the condensing optical element 2 will be explained later by referring to FIG. 4 and FIG. 5.

In FIG. 1, the condensing optical element 2 is illustrated as a convex lens having positive power. In FIG. 2, the condensing optical element 2 is illustrated as an optical element employing refraction of light and reflection of light.

The inside of the condensing optical element 2 shown in the first embodiment is filled with a refractive material, for example.

While the condensing optical element 2 is formed of one optical element in FIG. 1 and FIG. 2, it is also possible to use a plurality of optical elements. However, the use of a plurality of optical elements deteriorates productivity since it is necessary to secure positioning accuracy of each optical element, for example.

The light source 1 and the condensing optical element 2 are arranged to the rear of (on the −Z-axis side of) the light distribution control element 4. The light source 1 is arranged to the rear of (on the −Z-axis side of) the light distribution control element 4. The condensing optical element 2 is arranged to the rear of (on the −Z-axis side of) the light distribution control element 4.

In FIG. 1 and FIG. 2, the optical axis Cs of the light source 1 coincides with the optical axis C of the condensing optical element 2.

The following explanation will be given by using the condensing optical element 2 shown in FIG. 2 as an example.

In FIG. 2, the condensing optical element 2 has the incidence surfaces 211 and 212, a reflecting surface 22, and exit surfaces 231 and 232, for example.

The condensing optical element 2 is arranged immediately after the light source 1. Here, the "after" means being on a side in the traveling direction of the light emitted from the light source 1, and it differs from the aforementioned "backward direction". According to "immediately after" used here, the light emitted from the light-emitting surface 11 immediately enters the condensing optical element 2.

The LED emits light of Lambert distribution. The "Lambert distribution" is light distribution in which the luminance of the light-emitting surface is constant irrespective of the direction of viewing. In other words, the directivity of the LED's light distribution is wide. Therefore, reducing the distance between the light source 1 and the condensing optical element 2 makes it possible to have a greater amount of light enter the condensing optical element 2.

The condensing optical element 2 is made of a transparent resin, glass or silicone material, for example. The material of the condensing optical element 2 is not limited as long as the material has permeability; even transparent resin or the like is usable. In other words, the material of the condensing optical element 2 just needs to have permeability. However, from the viewpoint of light utilization efficiency, materials having high permeability are suitable for the material of the condensing optical element 2. Further, since the condensing optical element 2 is arranged immediately after the light source 1, materials of outstanding heat resistance are preferable as the material of the condensing optical element 2.

"Permeation" means a phenomenon in which light or the like passes through the inside of an object.

The incidence surface 211 is an incidence surface formed in a central part of the condensing optical element 2. The "central part of the condensing lens 2" means that the optical axis C has an intersection point on the incidence surface 211. That is, the optical axis C passes through the incidence surface 211.

Further, the incidence surface 211 is in a convex shape having positive power, for example. The convex shape of the incidence surface 211 has the convex shape in the −Z-axis direction. The incidence surface 211 has a rotationally symmetric shape centering at the optical axis C as the rotation axis, for example.

Incidentally, the power in regard to a lens is also referred to as "refractive power".

The incidence surface 212 has a shape as a part of the surface shape of a body of rotation formed by rotating an ellipse around its major axis or minor axis as the rotation axis, for example. The body of rotation formed by rotating an ellipse around its major axis or minor axis as the rotation axis is referred to as a "spheroid". The rotation axis of the spheroid coincides with the optical axis C. The incidence surface 212 has a surface shape obtained by cutting away the spheroid's both ends in the rotation axis direction. In other words, the incidence surface 212 has a tubular shape.

One end (end on the +Z-axis direction side) of the tubular shape of the incidence surface 212 is connected to the outer circumference of the incidence surface 211. The tubular shape of the incidence surface 212 is formed on the light source 1's side (in the −Z-axis direction) relative to the incidence surface 211. The tubular shape of the incidence surface 212 is formed in the backward direction relative to the incidence surface 211. That is, the tubular shape of the incidence surface 212 is formed on the light source 1's side of the incidence surface 211.

The reflecting surface 22 has a tubular shape and a shape of its cross-section on an X-Y plane is a circular shape centering at the optical axis C, for example. In the tubular shape of the reflecting surface 22, the diameter of the circular shape on an X-Y plane at an end on the −Z-axis direction side is smaller than the diameter of the circular shape on an X-Y plane at an end on the +Z-axis direction side. In other words, the diameter of the reflecting surface 22 increases from the −Z-axis direction side towards the +Z-axis direction side.

For example, the reflecting surface 22 has a shape of a side face of a circular truncated cone. The shape of the circular truncated cone's side face on a plane including the optical axis is a linear shape. However, the shape of the reflecting surface 22 on a plane including the optical axis C may also be a curved shape. The "plane including the optical axis C" means that the line of the optical axis C can be drawn on the plane.

One end (end on the −Z-axis direction side) of the tubular shape of the reflecting surface 22 is connected to the other end (end on the −Z-axis direction side) of the tubular shape of the incidence surface 212. In other words, the reflecting surface 22 is situated on the outer circumferential side of the incidence surface 212.

The exit surface 231 is situated on the +Z-axis direction side of the incidence surface 211. The exit surface 231 is in a convex shape having positive power, for example. The convex shape of the exit surface 231 is convex in the +Z-axis direction. The optical axis C has an intersection point on the exit surface 231. That is, the optical axis C passes through the incidence surface 231. The exit surface 231 has a rotationally symmetric shape centering at the optical axis C as the rotation axis, for example.

The combination of the incidence surface 211 and the exit surface 231 has the light-condensing function. That is, the combination of the incidence surface 211 and the exit surface 231 has positive power. In this case, one of the incidence surface 211 and the exit surface 231 may have negative power, for example.

The exit surface 232 is situated on the outer circumferential side of the exit surface 231. The exit surface 232 has a planar shape parallel to the X-Y plane, for example. In other words, the exit surface 232 has a planar shape parallel to a plane perpendicular to the optical axis C, for example. The inner circumference and the outer circumference of the exit surface 232 have circular shapes.

The inner circumference of the exit surface 232 is connected to the outer circumference of the exit surface 231. The outer circumference of the exit surface 232 is connected to the other end (end on the +Z-axis direction side) of the tubular shape of the reflecting surface 22.

A ray emitted at a small emission angle of the light emitted from the light-emitting surface 11 is incident on the incidence surface 211. The divergence angle of the ray of a small emission angle is within 60 degrees, for example. The ray of a small emission angle is incident on the incidence surface 211 and emanates from the exit surface 231. The ray of a small emission angle emanating from the exit surface 231 is condensed by the incidence surface 211 or the exit surface 231. The ray of a small emission angle emanating from the exit surface 231 is condensed into any position in front of (in the +Z-axis direction from) the condensing optical element 2. As mentioned earlier, the condensing position will be explained later.

The "divergence angle" means an angle of spreading of light.

A ray having a large emission angle of the light emitted from the light-emitting surface 11 is incident on the incidence surface 212. The divergence angle of the ray having a large emission angle is larger than 60 degrees, for example. The ray incident on the incidence surface 212 is reflected by the reflecting surface 22. The ray reflected by the reflecting surface 22 travels in the +Z-axis direction. The ray reflected by the reflecting surface 22 emanates from the exit surface 232. The ray of a large emission angle emanating from the exit surface 232 is condensed by the reflecting surface 22. The ray of a large emission angle emanating from the exit surface 232 is condensed into any position in front of (in the +Z-axis direction from) the condensing optical element 2. As mentioned earlier, the condensing position will be explained later.

The condensing optical element 2 in the following description of the embodiments will be described as an optical element having the following functions, for example.

The light passing through the incidence surface 211 and the exit surface 231 is condensed by refraction. In contrast, the light passing through the incidence surface 212 and the exit surface 232 is condensed by reflection in the reflecting surface 22. That is, the condensing optical element 2 condenses rays emitted from the light source 1 at small emission angles by refraction. Meanwhile, the condensing optical element 2 condenses rays emitted from the light source 1 at large emission angles by reflection.

At the condensing position of the light emanating from the exit surface 231, an image in a shape similar to the pattern of the light source 1 (shape of the light-emitting surface 11) is formed. In other words, an image of the light source 1 is formed at the condensing position of the light emanating from the exit surface 231. Accordingly, the shape of the light-emitting surface 11 of the light source 1 is projected by the projection lens 8 and that can cause the light distribution irregularity.

In such cases, the light distribution irregularity caused by the light emanating from the exit surface 231 can be mitigated by making the condensing position of the light emanating from the exit surface 231 and the condensing position of the light emanating from the exit surface 232 different from each other, for example.

The condensing position of the ray emanating from the exit surface 232 and the condensing position of the ray emanating from the exit surface 231 are not necessarily the same. For example, the condensing position of the light emanating from the exit surface 232 may be closer to the condensing optical element 2 than the condensing position of the light emanating from the exit surface 231.

This is because the light emanating from the exit surface 232 does not form a light source image. Thus, luminosity irregularity of the light source image can be reduced by superimposing the light emanating from the exit surface 232 on the light source image formed by the light emanating from the exit surface 231.

Incidentally, in the first embodiment, the cutoff line 91 is formed by using the light blocking plate 5, and thus light blocked by the light blocking plate 5 is not used as the projection light. Specifically, half of the image of the light source 1 formed at the condensing position of the light emanating from the exit surface 231 is not used as the projection light.

In cases where the condensing optical element 2 shown in FIG. 2 is used, reduction effect of the light distribution irregularity can be enhanced by using the condensing optical element 2 together with the light distribution control element 4.

Further, in cases where an ordinary condensing lens is used as the condensing optical element 2 as shown in FIG. 1, the light distribution irregularity can be reduced by using the light distribution control element 4.

In the first embodiment, all of the incidence surfaces 211 and 212, the reflecting surface 22 and the exit surfaces 231 and 232 of the condensing optical element 2 have rotationally symmetric shapes centering at the optical axis C. However, the shapes of these surfaces are not limited to rotationally symmetric shapes as long as the light emitted from the light source 1 can be condensed.

For example, by making a shape of a cross-section of the reflecting surface 22 on the X-Y plane an elliptic shape, a condensed light spot at the condensing position can also be formed in an elliptic shape. This facilitates the headlight module 100 to generate a wide light distribution pattern.

The "condensed light spot" means the shape of a light flux at a position where light is condensed. The "position where light is condensed" means the position where a flux of light emitted from an exit surface becomes the smallest.

Even in a case where the shape of the light-emitting surface 11 of the light source 1 is a rectangular shape, when the shape of a cross-section of the reflecting surface 22 on the X-Y plane is an elliptic shape, for example, the condensing optical element 2 can be made smaller.

It is sufficient that the condensing optical element 2 have positive power as a whole, while each of the incidence surfaces 211 and 212, the reflecting surface 22 and the exit surfaces 231 and 232 may have arbitrary power.

Incidentally, as mentioned earlier, a reflecting mirror can be used as the condensing optical element in cases where a vacuum light source is employed as the light source 1.

<Light Distribution Control Element 4>

The light distribution control element 4 is situated in the +Z-axis direction from the light source 1. The light distribution control element 4 is situated in the +Z-axis direction from the condensing optical element 2. The light distribution control element 4 is situated in the −Z-axis direction from the light blocking plate 5. The light distribution control element 4 is situated in the −Z-axis direction from the projection lens 8.

The light emanating from the condensing optical element 2 is incident on the light distribution control element 4. The light distribution control element 4 emits the light in the forward direction (+Z-axis direction). In cases where the condensing optical element 2 is not used, the light emitted from the light source 1 is incident on the light distribution control element 4.

FIG. 3 is a perspective view of the light distribution control element 4. The light distribution control element 4 shown in FIG. 3 is just an example.

The light distribution control element 4 is, for example, a plate-like optical element.

The light distribution control element 4 is made of a transparent resin, glass, silicone material or the like, for example.

The light distribution control element 4 includes a spot light distribution formation part 41 and diffusive light distribution formation parts 42.

The "spot light distribution" in the following description means light distribution that intensively illuminates one region.

In the first embodiment, the spot light distribution is, for example, light distribution for illuminating a high illuminance region.

The "diffusive light distribution" means light distribution that illuminates the whole of a region to be illuminated. The diffusive light distribution is light distribution for illuminating a low illuminance region. The low illuminance region is a region that is lower in luminosity than the high illuminance region illuminated by the spot light distribution. In the first embodiment, the diffusive light distribution is light distribution for illuminating the whole of the light distribution pattern, for example.

Further, "diffusive light" means light that has been diffused. The "condensed light" means light that has been condensed. Thus, a divergence angle of light passing through the diffusive light distribution formation part 42 is large. Meanwhile, a divergence angle of light passing through the spot light distribution formation part 41 is small.

The light distribution control element 4 forms lighting distribution, for the light distribution pattern projected by the projection optical element 8, on the conjugate plane PC. The projection optical element 8 projects the light distribution pattern formed by the light distribution control element 4 onto the illumination surface 9. The projection optical element 8 projects the light distribution pattern formed on the conjugate plane PC onto the illumination surface 9. The light distribution pattern on the illumination surface 9 is similar in shape to the light distribution pattern on the conjugate plane PC.

The spot light distribution formation part 41 forms the high luminosity region in the light distribution pattern on the conjugate plane PC. The diffusive light distribution formation parts 42 form a low luminosity region in the light distribution pattern on the conjugate plane PC. The low luminosity region is a region that is lower in luminosity than the high luminosity region.

As explained above, the light distribution control element 4 changes the focal position of the condensed light emanating from the condensing optical element 2.

In FIG. 3, the spot light distribution formation part 41 and the diffusive light distribution formation parts 42 are formed on the incidence surface's side of the light distribution control element 4, for example. In other words, the spot light distribution formation part 41 and the diffusive light distribution formation parts 42 are formed on a surface of the light distribution control element 4 on the −Z-axis direction side.

In FIG. 3, the light distribution control element 4 includes two diffusive light distribution formation parts 42a and 42b, for example. The diffusive light distribution formation part 42a is situated on the +X-axis direction side of the light distribution control element 4. The diffusive light distribution formation part 42b is situated on the −X-axis direction side of the light distribution control element 4.

The spot light distribution formation part 41 is arranged between the two diffusive light distribution formation parts 42*a* and 42*b*. The spot light distribution formation part 41 is situated between the two diffusive light distribution formation parts 42*a* and 42*b*.

In this embodiment, the spot light distribution formation part 41 and the diffusive light distribution formation parts 42*a* and 42*b* are arranged in a line in the X-axis direction. In other words, the segmented optical surfaces 41, 42*a* and 42*b* are arranged in a line in the X-axis direction. However, it is also possible to arrange the segmented optical surfaces two-dimensionally on an X-Y plane, for example.

First, the spot light distribution formation part 41 will be explained below.

The spot light distribution formation part 41 is a cylindrical lens in a convex shape having curvature in the X-axis direction and no curvature in the Y-axis direction, for example. Thus, the spot light distribution formation part 41 condenses the incident light on the Z-X plane. In contrast, the spot light distribution formation part 41 transmits the incident light as it is on the Y-Z plane.

The cylindrical lens is a lens having a refracting surface in a shape of a side face of a cylinder. The cylindrical lens is a lens having refractive power and converging or diverging light in one direction but having no refractive power in the perpendicular direction.

Light parallelly incident on the convex cylindrical lens is condensed on a straight line. In FIG. 3, the straight line where the light is condensed is parallel to the Y-axis.

In FIG. 3, the spot light distribution formation part 41 is in a convex shape having positive power in a horizontal direction (X-axis direction). Thus, if the spot light distribution formation part 41 is cut at a plane parallel to the Z-X plane, the cross section has a shape of a convex lens.

In the case where the spot light distribution formation part 41 has positive power in the horizontal direction (X-axis direction), the light condensed by the condensing optical element 2 and entering the spot light distribution formation part 41 changes its divergence angle. The light entering the spot light distribution formation part 41 further condenses in the horizontal direction (X-axis direction) after passing through the spot light distribution formation part 41.

The optical axis C passes through the lens surface of the spot light distribution formation part 41. In FIG. 3, the optical axis C coincides with the optical axis of the convex lens in the case where the spot light distribution formation part 41 is cut at a plane parallel to the Z-X plane.

Alternatively, the optical axis Cs of the light source 1 passes through the lens surface of the spot light distribution formation part 41.

In other words, a central ray of the light emitted from the light source 1 passes through the lens surface of the spot light distribution formation part 41. The central ray is a ray situated at the center of the flux of the light emitted from the center of the light-emitting surface 11 of the light source 1. Each of the embodiments describes the central ray which coincides with the optical axis of the light source, as an example. Each of the embodiments also describes the optical axis of the light source which coincides with the optical axis of the condensing optical element, as an example.

Next, the diffusive light distribution formation parts 42 will be explained below.

The diffusive light distribution formation part 42 is a cylindrical lens in a concave shape having curvature in the X-axis direction and no curvature in the Y-axis direction, for example. Thus, the diffusive light distribution formation part 42 diverges the incident light on the Z-X plane. In contrast, the diffusive light distribution formation part 42 transmits the incident light as it is on the Y-Z plane.

In FIG. 3, each of the diffusive light distribution formation parts 42*a* and 42*b* is in a concave shape having negative power in the horizontal direction (X-axis direction). Thus, if the diffusive light distribution formation part 42 is cut at a plane parallel to the Z-X plane, the cross section has a shape of a concave lens.

In the case where the diffusive light distribution formation parts 42*a* and 42*b* have negative power in the horizontal direction (X-axis direction), the light condensed by the condensing optical element 2 and entering the diffusive light distribution formation part 42*a* or 42*b* changes its divergence angle. The light entering the diffusive light distribution formation part 42*a* or 42*b* diverges in the horizontal direction (X-axis direction) after passing through the diffusive light distribution formation part 42*a* or 42*b*. In other words, the light entering the diffusive light distribution formation part 42*a* or 42*b* increases in the divergence angle.

The diffusive light distribution formation parts 42 are formed at the periphery of the spot light distribution formation part 41.

The diffusive light distribution formation parts 42 are arranged outside the spot light distribution formation part 41 with respect to the optical axis C of the condensing optical element 2. Alternatively, the diffusive light distribution formation parts 42 are arranged outside the spot light distribution formation part 41 with respect to the optical axis Cs of the light source 1. Alternatively, the diffusive light distribution formation parts 42 are arranged outside the spot light distribution formation part 41 with respect to the central ray of the light emitted from the light source 1.

As mentioned earlier, in FIG. 3, the diffusive light distribution formation part 42*a* is arranged on the +X-axis side of the spot light distribution formation part 41. The diffusive light distribution formation part 42*b* is arranged on the −X-axis side of the spot light distribution formation part 41.

In FIG. 3, the diffusive light distribution formation parts 42*a* and 42*b* are arranged in contact with the spot light distribution formation part 41. Therefore, the light reaching the light distribution control element 4 enters the light distribution control element 4 through the spot light distribution formation part 41 or one of the diffusive light distribution formation parts 42. In other words, the light reaching the light distribution control element 4 reaches the spot light distribution formation part 41 or one of the diffusive light distribution formation parts 42.

However, it is not necessarily needed to arrange the diffusive light distribution formation parts 42*a* and 42*b* in contact with the spot light distribution formation part 41.

The light distribution control element 4 can be regarded as an example of a light distribution pattern shape formation element. The light distribution control element 4 can be regarded also as an example of a light-condensing element.

The "light distribution pattern shape formation element" means an element that forms the shape of a light distribution pattern.

<Light Blocking Plate 5>

Next, the light blocking plate 5 will be explained below.

The light blocking plate 5 blocks part of the light emanating from the light distribution control element 4. The light blocking plate 5 forms the aforementioned cutoff line 91.

The light blocking plate 5 is situated at a position optically conjugate with the illumination surface 9. The illumination surface 9 is considered to be arranged at an infinite distance from the headlight module 100. Accordingly, the conjugate point is the projection lens 8's focal point on the front side. The light blocking plate 5 is arranged at the projection lens 8's focal position on the front side. Specifically, the conjugate plane PC is a plane perpendicular to the optical axis Cp of the projection lens 8. The conjugate plane PC is situated at the projection lens 8's focal position on the front side. The focal point on the front side means a focal point on the side from which the light is incident. In the first embodiment, the light is incident on the projection lens 8 from the −Z-axis direction side. Thus, the focal point on the front side is the focal point on the −Z-axis side of the projection lens 8.

The "optically conjugate" represents a relationship in which light emitted from one point forms an image at another point. Therefore, a side 51 of the light blocking plate 5 on the +Y-axis direction side is desired to be formed in the shape of the cutoff line 91. This is because the light blocking plate 5 is situated at the position optically conjugate with the illumination surface 9 and that makes the light distribution pattern at the position of the light blocking plate 5 (conjugate plane PC) and the light distribution pattern on the illumination surface 9 similar to each other in shape. Incidentally, the light distribution pattern at the position of the light blocking plate 5 is projected onto the illumination surface 9 while being inverted in the vertical direction and the lateral direction.

Parenthetically, in cases where the projection lens 8 is a toroidal lens, for example, the light distribution pattern on the illumination surface 9 differs from the light distribution pattern at the position of the light blocking plate 5 (conjugate plane PC) in the ratio regarding the vertical direction and the lateral direction. In other words, the light distribution pattern on the illumination surface 9 is formed based on the light distribution pattern at the position of the light blocking plate 5 (conjugate plane PC).

<Projection Lens 8>

The projection lens 8 is situated in the +Z-axis direction from the light blocking plate 5.

The projection lens 8 is a lens having positive power. The image of the light distribution pattern formed at the position of the light blocking plate 5 (conjugate plane PC) is magnified and projected by the projection lens 8 onto the illumination surface 9 in front of the vehicle.

The projection lens 8 is a "projection optical element" that magnifies and projects the image of the light distribution pattern formed at the position of the light blocking plate 5. In this embodiment, the projection optical element is assumed to be the projection lens 8, for example.

The projection lens 8 may be formed of one lens. The projection lens 8 may also be formed by using a plurality of lenses. However, the light utilization efficiency decreases with the increase in the number of lenses. Thus, the projection lens 8 is desired to be formed of one or two lenses.

The projection lens 8 is made of transparent resin or the like. The material of the projection lens 8 is not limited to transparent resin; any refractive material having transmittance is usable. The same goes for the condensing optical element 2 and light distribution control element 4 explained above. The "transmittance" means a property to transmit light.

It is desirable to arrange the projection lens 8 so that its optical axis Cp is situated on the lower side (−Y-axis direction side) of the optical axis C of the condensing optical element 2. Incidentally, the optical axis C of the condensing optical element 2 and the optical axis Cp of the projection lens 8 are illustrated in FIG. 2 to coincide with each other for simplification of the explanation.

This is because it is necessary to place the cutoff line on the oncoming vehicle's side slightly below the horizontal line, in a predetermined light distribution pattern required for the automobile low beam. By arranging the optical axis Cp of the projection lens 8 on the lower side (−Y-axis direction side) of the optical axis C of the condensing optical element 2, the light distribution pattern on the illumination surface 9 can be placed at a lower position (in the −Y-axis direction).

The optical axis Cp of the projection lens 8 is a line connecting the curvature centers of both surfaces of the lens. The optical axis Cp of the projection lens 8 is a normal line passing through the surface vertices of the projection lens 8. In the case of FIG. 1 and FIG. 2, the optical axis Cp of the projection lens 8 is an axis passing through the surface vertices of the projection lens 8 and parallel to the Z-axis.

When a surface vertex of the projection lens 8 is translated in the X-axis direction or the Y-axis direction on an X-Y plane, the normal line to the surface vertex of the projection lens 8 is also translated in the X-axis direction or the Y-axis direction on X-Y planes. Therefore, the optical axis Cp of the projection lens 8 is also translated in the same way in the X-axis direction or the Y-axis direction on X-Y planes. When the projection lens 8 is inclined with respect to the X-Y plane, the normal line to the surface vertex of the projection lens 8 is also inclined with respect to the X-Y plane. Therefore, the optical axis Cp of the projection lens 8 is also inclined with respect to the X-Y plane in the same way.

In FIG. 1 and FIG. 2, the optical axis Cp of the projection lens 8 coincides with the optical axis of the light source 1 and the optical axis C of the condensing lens 2, for example. Further, the optical axis Cs of the light source 1 coincides with a normal line to the central position of the light-emitting surface 11.

In FIG. 1 and FIG. 2, the projection lens 8 is arranged so that the Y-axis direction position of the side 51 of the light blocking plate 5 on the +Y-axis direction side coincides with the Y-axis direction position of the optical axis Cp of the projection lens 8. In other words, in FIG. 1 and FIG. 2, the side 51 of the light blocking plate 5 on the +Y-axis direction side intersects with the optical axis Cp of the projection lens 8. In FIG. 1 and FIG. 2, the side 51 of the light blocking plate 5 on the +Y-axis direction side intersects with the optical axis Cp of the projection lens 8 at right angles.

Incidentally, in cases where the side 51 of the light blocking plate 5 on the +Y-axis direction side is not a straight line, a plane parallel to the X-Y plane and situated at the position where the side 51 of the light blocking plate 5 on the +Y-axis direction side and the optical axis Cp of the projection lens 8 intersect with each other (point Q) is in the optically conjugate relationship with the illumination surface 9, for example. In other words, the plane including the point Q and parallel to the X-Y plane can be arranged at the position optically conjugate with the illumination surface 9. The point Q is the point where the side 51 and the optical axis Cp intersect with each other.

This arrangement allows the Y-axis direction position of the cutoff line 91 on the illumination surface 9 to coincide with the Y-axis direction position of the center of the light source 1. Put another way, the Y-axis direction position of the cutoff line 91 on the illumination surface 9 can be made to coincide with the Y-axis direction position of the center of the light source 1 by employing the arrangement in which the side 51 and the optical axis Cp intersect with each other.

Incidentally, the side 51 of the light blocking plate 5 on the +Y-axis direction side and the optical axis Cp of the projection lens 8 do not necessarily need to intersect with each other. Specifically, it is permissible if the position of the point Q in the optical axis Cp direction (Z-axis direction)

coincides with the focal position of the projection lens 8 in the optical axis Cp direction (Z-axis direction).

In cases where the vehicle is equipped with the headlight module 100 in an inclined state, the position where the projection lens 8 is arranged may of course be modified according to the inclination. However, the position of the projection lens 8 can be adjusted with ease since the adjustment of the position of the projection lens 8 is adjustment of a small part in comparison with the adjustment of the entire headlight module 100. Further, the adjustment can be made within the headlight module 100 alone.

<Behavior of Ray>

As shown in FIG. 2, the light condensed by the condensing optical element 2 enters the light distribution control element 4 through the spot light distribution formation part 41, the diffusive light distribution formation part 42a or the diffusive light distribution formation part 42b.

The spot light distribution formation part 41 is a refracting surface in a convex shape having curvature only in the X-axis direction, for example. Each diffusive light distribution formation part 42a, 42b is a refracting surface in a concave shape having curvature only in the X-axis direction, for example.

Here, curvatures of the spot light distribution formation part 41, the diffusive light distribution formation part 42a and the diffusive light distribution formation part 42b in the X-axis direction contribute to a "light distribution width" in the horizontal direction with respect to the road surface. Curvatures of the spot light distribution formation part 41, the diffusive light distribution formation part 42a and the diffusive light distribution formation part 42b in the Y-axis direction contribute to a "light distribution height" in the direction perpendicular to the road surface.

The "light distribution width" means the X-axis direction length of the light distribution pattern projected on the illumination surface 9. The "light distribution height" means the Y-axis direction length of the light distribution pattern projected on the illumination surface 9.

In the above explanation, the spot light distribution formation part 41 and the diffusive light distribution formation parts 42a and 42b have been described as cylindrical lenses. However, in cases where the "light distribution height" is adjusted, the spot light distribution formation part 41 or the diffusive light distribution formation part 42a and 42b may be formed as a lens surface having power differing between the X-axis direction and the Y-axis direction.

A toroidal lens surface can be taken as an example of a lens surface having curvature differing between the X-axis direction and the Y-axis direction. The "toroidal lens surface" is a surface whose curvatures in two perpendicular axial directions differ from each other like the surface of a barrel or a doughnut.

<Behavior of Ray on Z-X Plane>

First, the light passing through the spot light distribution formation part 41 will be explained below.

As shown in FIG. 2B, the spot light distribution formation part 41 is in a convex shape as viewed on the Z-X plane. Namely, the spot light distribution formation part 41 has positive power in regard to the horizontal direction (X-axis direction).

Here, "as viewed on the Z-X plane" means as viewed in the Y-axis direction, for example. Namely, it means as viewed while being projected on the Z-X plane.

Thus, the light incident on the spot light distribution formation part 41 is condensed further and emanates from an exit surface 43 of the light distribution control element 4. Accordingly, in cases where the spot light distribution formation part 41 is a cylindrical lens, the light incident on the spot light distribution formation part 41 is condensed at a position on the front side (−Z-axis direction side) of the condensing position PH.

Therefore, with respect to the light incident on the spot light distribution formation part 41 and emanating from the exit surface 43 of the light distribution control element 4, the X-axis direction width of the flux of the light on the conjugate plane PC varies according to the curvature of the spot light distribution formation part 41.

As viewed on the Z-X plane, in order to form the brightest spot light distribution with the spot light distribution formation part 41, it is sufficient if the X-axis direction condensing position PW of the light emitted from the spot light distribution formation part 41 coincides with the conjugate plane PC as shown in FIG. 2. In other words, it is sufficient if the condensing position PW is situated on the conjugate plane PC. However, a region in the X-axis direction illuminated by the spot light distribution formation part 41 becomes the smallest.

To sum up, the brightest spot light distribution is formed if the condensing position PW coincides with the conjugate plane PC. The condensing position PW is the X-axis direction condensing position of the light emitted from the spot light distribution formation part 41.

In FIG. 2A, the Y-axis direction condensing position PH is indicated by a chain line. In FIG. 2A, the conjugate plane PC is indicated by a broken line. In FIG. 2B, the X-axis direction condensing position PW is indicated by a chain line.

Parenthetically, in regard to the light passing through the incidence surface 211 and the exit surface 231 of the condensing optical element 2, the fact that the condensing positions PH and PW of the light are situated on the conjugate plane PC means that the image of the light-emitting surface 11 of the light source 1 is formed on the conjugate plane PC. Put another way, in regard to the light passing through the incidence surface 211 and the exit surface 231 of the condensing optical element 2, if the condensing positions PH and PW of the light coincide with the position of the conjugate plane PC, the image of the light-emitting surface 11 of the light source 1 is formed on the conjugate plane PC.

In FIG. 2A and FIG. 2B, in regard to the light passing through the incidence surface 211 and the exit surface 231 of the condensing optical element 2, each of the condensing position PW and the condensing position PH coincides with the position of the conjugate plane PC. This means that the condensing optical element 2 and the light distribution control element 4 form the image of the light-emitting surface 11 of the light source 1 on the conjugate plane PC in regard to the X-axis direction and the Y-axis direction. In short, the condensing optical element 2 and the light distribution control element 4 form the image of the light-emitting surface 11 on the conjugate plane PC.

The condensing position PW is the condensing position regarding the X-axis direction. Namely, the condensing position PW is the condensing position on the Z-X plane. The condensing position PH is the condensing position regarding the Y-axis direction. Namely, the condensing position PH is the condensing position on the Y-Z plane.

Specifically, the condensing optical element 2 in FIG. 2 has power differing between the X-axis direction and the Y-axis direction. For example, the incidence surface 211 and the exit surface 231 of the condensing optical element 2 constitute a toroidal lens.

For example, as viewed on the Y-Z plane as shown in FIG. 2A, the condensing position PH obtained by the combination of the power of the condensing optical element 2 and the power of the spot light distribution formation part 41 is on the conjugate plane PC. However, since the spot light distribution formation part 41 has no power in FIG. 2A, the condensing position PH equals the Y-axis direction condensing position of the condensing optical element 2.

Meanwhile, as viewed on the Z-X plane as shown in FIG. 2B, the condensing position PW obtained by the combination of the power of the condensing optical element 2 and the power of the spot light distribution formation part 41 is on the conjugate plane PC. In FIG. 2B, the spot light distribution formation part 41 has power.

The condensing positions PH and PW are condensing positions obtained by the combined power of the condensing optical element 2 and the light distribution control element 4. In FIG. 2A, the condensing position PH is the Y-axis direction condensing position obtained by the power of the condensing optical element 2. In FIG. 2B, the condensing position PW is the X-axis direction condensing position obtained by the combined power of the condensing optical element 2 and the spot light distribution formation part 41.

Therefore, the focal length of the focal point of the condensing optical element 2 regarding the X-axis direction becomes shorter than the focal length of the focal point of the condensing optical element 2 regarding the Y-axis direction. In other words, the focal length of the condensing optical element 2 on the Z-X plane becomes shorter than the focal length of the condensing optical element 2 on the Y-Z plane. The position of the focal point regarding the X-axis direction is the focal position PW. The position of the focal point regarding the Y-axis direction is the focal position PH.

The conjugate plane PC is situated at the position conjugate with the illumination surface 9.

Therefore, the spread of light on the conjugate plane PC in the horizontal direction corresponds to the "light distribution width" on the illumination surface 9. Thus, the X-axis direction width of the light flux on the conjugate plane PC can be controlled by changing the curvature of the spot light distribution formation part 41 in the X-axis direction.

This allows the brightness of the spot light distribution (high illuminance region) of the headlight module 100 to be changed. Specifically, when the spot light distribution is narrow, the brightness of the spot light distribution is brighter than when the spot light distribution is wide. The brightness of a narrow spot light distribution is higher than the brightness of a wide spot light distribution.

The condensing position PW determined by the spot light distribution formation part 41 does not necessarily need to coincide with the conjugate plane PC.

FIG. 4 and FIG. 5 are diagrams for explaining the condensing position PW of the headlight module 100 according to the first embodiment. Incidentally, the condensing position PH is situated on the conjugate plane PC as shown in FIG. 4A and FIG. 5A.

In FIG. 4, the condensing position PW of the light emitted from the spot light distribution formation part 41 is situated on the front side (−Z-axis direction side) of the conjugate plane PC. Namely, the condensing position PW is situated between the spot light distribution formation part 41 and the light blocking plate 5. The condensing position PW is situated between the spot light distribution formation part 41 and the conjugate plane PC. The condensing position PW is situated in a space between the spot light distribution formation part 41 and the light blocking plate 5. In FIG. 4, the condensing position PW is determined by the condensing optical element 2 and the spot light distribution formation part 41.

The "space" means a void.

In the configuration of FIG. 4, the light after passing through the condensing position PW diverges. Therefore, the X-axis direction width of the light flux on the conjugate plane PC is greater than the X-axis direction width of the light flux at the condensing position PW. Accordingly, light having a width in the horizontal direction (X-axis direction) emanates from the conjugate plane PC.

In FIG. 5, the condensing position PW of the light emitted from the spot light distribution formation part 41 is situated after (on the +Z-axis direction side of) the conjugate plane PC. In FIG. 5, the condensing position PW is situated on the +Z-axis direction side of the conjugate plane PC. Namely, the condensing position PW is situated between the light blocking plate 5 (conjugate plane PC) and the projection lens 8. In FIG. 5, the condensing position PW is determined by the condensing optical element 2 and the spot light distribution formation part 41.

Incidentally, the "after" represents the direction in which the light travels. For example, in the case where the light emanating from the condensing optical element 2 reaches the light distribution control element 4, the light distribution control element 4 is arranged after the condensing optical element 2.

In the configuration of FIG. 5, the light passing through the conjugate plane PC condenses at the condensing position PW. Therefore, the X-axis direction width of the light flux on the conjugate plane PC is greater than the X-axis direction width of the light flux at the condensing position PW. Accordingly, light having a width in the horizontal direction (X-axis direction) emanates from the conjugate plane PC.

The X-axis direction width of the light flux on the conjugate plane PC can be controlled by controlling the distance from the conjugate plane PC to the condensing position PW. Accordingly, light having a width in the horizontal direction (X-axis direction) emanates from the conjugate plane PC.

Incidentally, each condensing position PH, PW is a position where the density of light per unit area reaches the maximum due to the minimum light flux diameter on the X-Y plane.

Therefore, in cases where the condensing position PW and the position of the conjugate plane PC coincide with each other, the width of the spot light distribution on the illumination surface 9 becomes the smallest. Further, the illuminance of the spot light distribution on the illumination surface 9 becomes the highest.

Thus, when it is desired to form the brightest spot light distribution, it is achieved by making the condensing position PW of the light passing through the spot light distribution formation part 41 coincide with the position of the conjugate plane PC. it is achieved by making the condensing position PH of the light passing through the spot light distribution formation part 41 coincide with the position of the conjugate plane PC.

Here, the condensing positions PH and PW and the position of the conjugate plane PC are positions in the Z-axis direction.

Next, the light passing through the diffusive light distribution formation part 42a or 42b will be explained below.

As shown in FIG. 2B, each of the diffusive light distribution formation part 42a, 42b is in a concave shape as viewed on the Z-X plane. Namely, the diffusive light distribution formation part 42a, 42b has negative power in regard to the horizontal direction (X-axis direction). In FIG. 2B, the diffusive light distribution formation part 42a, 42b has a concave shape that is concave in the −Y-axis direction.

Thus, the light incident on the diffusive light distribution formation part 42a, 42b is diffused and emanates from the exit surface 43 of the light distribution control element 4. Namely, the light incident on the diffusive light distribution formation part 42a, 42b emanates from the exit surface 43 of the light distribution control element 4 while the divergence angle increases.

Therefore, the X-axis direction width of the light flux incident on the diffusive light distribution formation part 42a, 42b and emanating from the exit surface 43 of the light distribution control element 4 on the conjugate plane PC is wide. The X-axis direction width of the light flux on the conjugate plane PC is increased by the diffusive light distribution formation part 42a, 42b.

For example, as shown in FIG. 2B, the width of the light flux $L_2$ incident on the diffusive light distribution formation part 42a or 42b and emanating from the exit surface 43 of the light distribution control element 4 on the conjugate plane PC is greater than the width of the light flux $L_1$ incident on the spot light distribution formation part 41 and emanating from the exit surface 43 of the light distribution control element 4 on the conjugate plane PC. Here, the width means the dimension of the light flux in the X-axis direction.

As above, the diffusive light distribution formation parts 42a and 42b have the negative power in the X-axis direction and thus are capable of forming a wide light distribution pattern. The diffusive light distribution formation parts 42a and 42b form a diffusive light distribution wider than the spot light distribution generated by the passage through the spot light distribution formation part 41.

The diffusive light distribution formation parts 42a and 42b form a diffusive light distribution wider than the spot light distribution. The spot light distribution is formed by the passage through the spot light distribution formation part 41. The diffusive light distribution is formed by the passage through the diffusive light distribution formation part 42a or 42b.

Accordingly, the width of the light flux $L_2$ incident on the diffusive light distribution formation part 42a or 42b and emanating from the exit surface 43 of the light distribution control element 4 on the conjugate plane PC becomes greater than the width of the light flux $L_1$ incident on the spot light distribution formation part 41 and emanating from the exit surface 43 of the light distribution control element 4 on the conjugate plane PC.

In other words, on the conjugate plane PC and in the X-axis direction, the width of the light flux $L_2$ becomes greater than the width of the light flux $L_1$. The light flux $L_1$ is the flux of the light incident on the spot light distribution formation part 41 and emanating from the exit surface 43 of the light distribution control element 4. The light flux $L_2$ is the flux of the light incident on the diffusive light distribution formation part 42a or 42b and emanating from the exit surface 43 of the light distribution control element 4.

This diffusive light distribution is superimposed on the spot light distribution and projected onto the illumination surface 9. The spot light distribution is formed by the spot light distribution formation part 41. The diffusive light distribution is formed by the diffusive light distribution formation parts 42a and 42b.

To "superimpose" means to overlay.

As above, the diffusive light distribution is superimposed so as to contain the spot light distribution. The diffusive light distribution is capable of blurring the boundary line of the shape of the light-emitting surface 11 of the light source 1 (light source image) projected on the illumination surface 9 by the spot light distribution. The headlight module 100 is capable of reducing the light distribution irregularity with ease while maintaining the brightness of the spot light distribution.

To "contain" means to have something inside. In this example, to "contain" means that the spot light distribution is situated in the region of the diffusive light distribution.

Thus, the spot light distribution is situated in the region of the diffusive light distribution. Accordingly, the high illuminance region is formed inside the light distribution pattern on the illumination surface 9. The diffusive light distribution forms the whole of the light distribution pattern. Meanwhile, the spot light distribution forms the high illuminance region.

The high illuminance region is formed based on the shape of the light-emitting surface 11 (light source image). The shape of the light-emitting surface 11 is generally a rectangular shape or a circular shape. Therefore, the high illuminance region is formed with ease based on the shape of the light-emitting surface 11.

The headlight module 100 shown in FIG. 1 forms the light distribution pattern and the high illuminance region by using refracting surfaces. The headlight module 100 shown in FIG. 2 forms the light distribution pattern and the high illuminance region by using refracting surfaces and a total reflection surface. Thus, the headlight module 100 does not employ a reflector having a mirror surface. Accordingly, the headlight module 100 facilitates the increase of the light utilization efficiency or simplification of the manufacturing process as will be explained later.

Incidentally, each of the diffusive light distribution formation part 42a, 42b can be formed in a convex shape as viewed on the Z-X plane. In other words, each of the diffusive light distribution formation part 42a, 42b can have positive power in the X-axis direction.

<Behavior of Ray on Z-Y Plane>

The light distribution control element 4 has no power in the Y-axis direction (vertical direction). Namely, the light distribution control element 4 has no power as viewed on the Y-Z plane. Therefore, when the light entering the light distribution control element 4 is viewed on the Y-Z plane as shown in FIG. 2A, for example, the angles of the ray incident on the light distribution control element 4 and the ray emanating from the light distribution control element 4 with respect to the optical axis C do not differ from each other.

Therefore, the light emitted from the light source 1 is condensed on the conjugate plane PC by the condensing optical element 2.

In the light distribution pattern prescribed by road traffic rules or the like, a region on the lower side of the cutoff line 91 has the maximum illuminance, for example.

The conjugate plane PC and the illumination surface 9 are in the conjugate relationship. Therefore, in order to let the region on the illumination surface 9 on the lower side (−Y-axis direction side) of the cutoff line 91 have the maximum illuminance, it is sufficient if the luminosity of a region on the upper side (+Y-axis direction side) of the side 51 of the light blocking plate 5 is made to be the highest.

In order to form such a light distribution pattern, part of the light condensed on the conjugate plane PC by the condensing optical element 2 is blocked by the light blocking plate 5, for example. The luminosity of the light condensed on the conjugate plane PC is the highest on the optical axis C. Therefore, it is possible to make the region on the lower side (−Y-axis direction side) of the cutoff line 91 have the maximum illuminance by blocking the light on the optical axis C as shown in FIG. 2A, for example.

In FIG. 2A, an example of arranging the side 51 of the light blocking plate 5 on the optical axis C is shown. However, even if the side 51 of the light blocking plate 5 is arranged in the vicinity of the optical axis C, the illuminance of the region on the lower side (−Y-axis direction side) of the cutoff line 91 does not drop significantly. Thus, it is at least possible to produce the headlight module 100 while arranging the side 51 of the light blocking plate 5 at a position slightly deviated from the optical axis C.

For example, it is possible to make an edge of the image of the light-emitting surface 11 on the −Y-axis direction side and the side 51 of the light blocking plate 5 coincide with each other. In this case, the whole of the high luminosity region formed with the image of the light-emitting surface 11 can be projected onto the illumination surface 9.

In FIG. 2A, the spot light distribution formation part 41 and the diffusive light distribution formation parts 42a and 42b have been described as cylindrical lenses. However, it is possible to form the spot light distribution formation part 41 or the diffusive light distribution formation part 42a or 42b as a lens surface having power differing between the X-axis direction and the Y-axis direction. For instance, a toroidal lens surface can be taken as an example of such a lens surface.

As above, the height of the light flux on the Y-Z plane can be adjusted by properly changing the curvatures of the spot light distribution formation part 41 and the diffusive light distribution formation parts 42a and 42b of the light distribution control element 4 in the vertical direction (Y-axis direction) similarly to the cases of adjusting the horizontal direction width of the light distribution.

<Light Distribution Pattern>

In the light distribution pattern of the headlight device for a motorcycle, the cutoff line 91 is in a shape of a horizontal straight line. Namely, the cutoff line 91 is in a shape of a straight line extending in the vehicle's lateral direction (X-axis direction).

In the light distribution pattern of the low beam of the headlight device for a motorcycle, a region on the lower side of the cutoff line 91 should be the brightest. The region at the maximum illuminance is referred to as the "high illuminance region". Thus, the region on the lower side of the cutoff line 91 is the high illuminance region.

The conjugate plane PC on the light blocking plate 5 and the illumination surface 9 are in the optically conjugate relationship. The side 51 is situated at the lowermost (−Y-axis direction side) end of the region on the conjugate plane PC through which the light passes. Therefore, the side 51 corresponds to the cutoff line 91 on the illumination surface 9.

The light distribution pattern on the conjugate plane PC is projected by the projection lens 8 onto the illumination surface 9 while being inverted in the vertical direction and the lateral direction.

The headlight module 100 according to the first embodiment projects the light distribution pattern formed on the conjugate plane PC directly onto the illumination surface 9 with the projection lens 8. Therefore, the light distribution pattern on the conjugate plane PC is directly projected onto the illumination surface 9. Thus, the luminosity distribution on the conjugate plane PC directly forms the illuminance distribution on the illumination surface 9.

Accordingly, in order to realize the light distribution pattern in which a region on the lower side of the cutoff line 91 is the brightest, it is sufficient if the luminosity distribution on the conjugate plane PC is formed so that the luminosity of a region on the +Y-axis direction side of the side 51 is the highest.

Further, in order to prevent the light distribution irregularity (illuminance irregularity) in the light distribution pattern projected on the illumination surface 9, it is sufficient if a lighting distribution without irregularity is formed on the conjugate plane PC.

FIG. 6 and FIG. 7 are diagrams showing the illuminance distribution on the illumination surface 9 formed by the headlight module 100 according to the first embodiment in contour display.

The "contour display" means displaying in a contour drawing. The "contour drawing" means a drawing in which points having the same value are connected by lines.

FIG. 6 shows the illuminance distribution in the case where the light distribution control element 4 shown in FIG. 2 is used. Specifically, the conjugate plane PC is situated at the position of the light blocking plate 5. The condensing positions PH and PW are situated on the conjugate plane PC. Namely, the condensing positions PH and PW are situated on the light blocking plate 5.

FIG. 7 shows the illuminance distribution in the case where the light distribution control element 4 shown in FIG. 4 is used. Specifically, the conjugate plane PC is situated at the position of the light blocking plate 5. The condensing position PW is situated between the light distribution control element 4 and the light blocking plate 5. The condensing position PH is situated on the conjugate plane PC. Namely, the condensing position PH is situated on the light blocking plate 5.

This illuminance distribution is illuminance distribution projected on an illumination surface 9 that is 25 meters ahead (+Z-axis direction). This illuminance distribution was obtained by simulation.

As it is known from FIG. 6, the cutoff line 91 of the light distribution pattern is a distinct straight line. Specifically, the interval between contour lines is narrow under the cutoff line 91. In the lighting distribution, there is the highest illuminance region (high illuminance region) 93 at a short distance from the cutoff line 91.

In FIG. 6, the center of the high illuminance region 93 is situated on the +Y-axis direction side of the center of the light distribution pattern. In FIG. 6, the high illuminance region 93 is within a range on the +Y-axis direction side of the center of the light distribution pattern. The center of the light distribution pattern means the center of the light distribution pattern in its width direction and height direction.

It is known that a region 92 on the lower side (−Y-axis direction side) of the cutoff line 91 of the light distribution pattern is the brightest. Specifically, the region 93 which is the brightest in the light distribution pattern is contained in the region 92 on the lower side of the cutoff line 91 of the light distribution pattern.

The interval between contour lines of the light distribution pattern narrows continuously from the high illuminance region 93 towards the periphery. Specifically, the contour line interval does not narrow extremely from the high illuminance region 93 towards the periphery of the light distribution pattern. Further, the contour line interval does not widen extremely. In short, the contour line interval narrows continuously.

The fact that the contour line interval of the light distribution pattern narrows continuously means that the light distribution irregularity has not occurred. The fact that the contour line interval of the light distribution pattern changes continuously means that the light distribution irregularity has not occurred.

In the light distribution pattern shown in FIG. 7, the cutoff line 91 is a distinct straight line. Specifically, the interval between contour lines is narrow on the lower side of the cutoff line 91. In the lighting distribution, there is the highest illuminance region (high illuminance region) 93 at a short distance from the cutoff line 91.

In FIG. 7, the center of the high illuminance region 93 is situated on the +Y-axis direction side of the center of the light distribution pattern. In FIG. 7, the high illuminance region 93 is within a range on the +Y-axis direction side of the center of the light distribution pattern.

In the light distribution pattern shown in FIG. 7, a region 92 on the lower side (−Y-axis direction side) of the cutoff line 91 is most brightly illuminated. Specifically, the region 93 which is the brightest in the light distribution pattern is contained in the region 92 on the lower side of the cutoff line 91 of the light distribution pattern.

In FIG. 6 and FIG. 7, the region 92 on the lower side of the cutoff line 91 is situated between the center of the light distribution pattern and the cutoff line 91.

The contour line interval of the light distribution pattern narrows continuously from the high illuminance region 93 towards the periphery. Specifically, the contour line interval does not narrow extremely from the high illuminance region 93 towards the periphery of the light distribution pattern. Further, the contour line interval does not widen extremely. In short, the contour line interval narrows continuously.

The fact that the contour line interval of the light distribution pattern narrows continuously means that the light distribution irregularity has not occurred. The fact that the contour line interval of the light distribution pattern changes continuously means that the light distribution irregularity has not occurred.

As above, the lighting distribution can be changed with ease by changing the curved surface shape of the spot light distribution formation part 41. Especially, the shape and the illuminance of the high illuminance region can be changed.

Further, the high illuminance region 93 is formed successfully without clearly projecting the light source image of the light source 1 in the light distribution pattern. Namely, the high illuminance region 93 is formed successfully without causing the light distribution irregularity. The high illuminance region 93 is formed while inhibiting the luminance irregularity.

As described above, the headlight module 100 does not need a complicated configuration of the optical system in order to form the high illuminance region in the light distribution pattern. The headlight module 100 does not need a complicated configuration of the optical system in order to inhibit the luminance irregularity in the high illuminance region. The headlight module 100 does not need a complicated configuration of the optical system in order to inhibit the luminance irregularity in the light distribution pattern. Thus, the headlight module 100 is capable of realizing a headlight device that is small in size, is simply configured and improves light utilization efficiency.

Comparative Example

A comparative example for verifying the effects of the headlight module 100 according to the first embodiment will be described below. In this comparative example, the light distribution control element 4 is removed from the components of the headlight module 100 according to the first embodiment.

FIG. 8 is a configuration diagram showing a headlight module 101 as the comparative example.

In the headlight module 100, the condensing positions PH and PW of the condensing optical element 2 coincide with the conjugate plane PC. Also in the headlight module 101 as the comparative example, the condensing positions PH and PW of the condensing optical element 2 coincide with the conjugate plane PC.

With such a configuration, the high illuminance region 93 can be obtained in the region 92 on the lower side of the cutoff line.

FIG. 9 is a diagram showing the illuminance distribution on the illumination surface 9 formed by the headlight module 101 in the comparative example in contour display. Conditions of the simulation are the same as those in the cases of FIG. 6 and FIG. 7.

In FIG. 9, the light source image of the light source 1 is projected as a rectangle. Specifically, the boundary of the light source image of the light source 1 is projected clearly.

Further, the contour line interval of the light distribution pattern changes discontinuously from the high illuminance region 93 towards the periphery. Specifically, the contour line interval narrows extremely in some regions from the high illuminance region 93 towards the periphery of the light distribution pattern. Further, the contour line interval widens extremely in some regions.

Namely, the light distribution irregularity has occurred in FIG. 9. The light distribution irregularity has occurred in regions around the high illuminance region 93. The fact that the contour line interval of the light distribution pattern changes discontinuously means that the light distribution irregularity has occurred.

This is because the image of the light-emitting surface 11 of the light source 1 is formed on the conjugate plane PC by the light incident on the incidence surface 211 of the condensing optical element 2 and emanating from the exit surface 232.

Accordingly, the boundary of the light-emitting surface 11 of the light source 1 is directly projected on the illumination surface 9. The formation of the image of the light-emitting surface 11 of the light source 1 on the conjugate plane PC undergoes the influence of aberration or the like. The boundary of the light-emitting surface 11 appears as the light distribution irregularity.

The headlight module 100 shown in FIG. 2 forms three images on the conjugate plane PC. In contrast, the headlight module 101 shown in FIG. 8 forms one image on the conjugate plane PC. In this regard, the headlight module 101 as the comparative example differs from the headlight module 100.

As above, the comparative example succeeds in forming the high illuminance region by making the condensing position PH of the condensing optical element 2 coincide with the conjugate plane PC. However, the light distribution irregularity occurs in the comparative example and there is a possibility of deteriorating the driver's sense of distance.

In contrast, the headlight module 100 according to the first embodiment, in which the light distribution control element 4 is arranged, is capable of effectively reducing the light distribution irregularity while maintaining the high illuminance region.

This is because the diffusive light emitted from each diffusive light distribution formation part 42 is superimposed on the image formed on the conjugate plane PC by the spot light distribution formation part 41. In other words, this is because the image formed on the conjugate plane PC by the diffusive light distribution formation part 42 is superimposed on the image formed on the conjugate plane PC by the spot light distribution formation part 41.

The headlight module 100 according to the first embodiment of the present invention has been described by taking the low beam of a headlight device for a motorcycle as an example. However, the present invention is not limited to this example. For example, the headlight module 100 is applicable also to the low beam of a headlight device for a motor tricycle and the low beam of a headlight device for a four-wheel automobile.

FIG. 10 is a schematic diagram showing an example of the shape of the side 51 of the light blocking plate 5. The side 51 may be formed in a shape with a step as shown in FIG. 10, for example. Specifically, the side 51 shown in FIG. 10 is in a bent line shape.

As viewed from the back (from the −Z-axis direction side), the side 51a on the left-hand side (−X-axis direction side) is at a position higher than (on the +Y-axis direction side relative to) the side 51b on the right-hand side (+X-axis direction side).

The conjugate plane PC and the illumination surface 9 are in the optically conjugate relationship. Therefore, the shape of the light distribution pattern on the conjugate plane PC is projected by the projection lens 8 onto the illumination surface 9 while being inverted in the vertical direction and the lateral direction. The light distribution pattern is formed on the +Y-axis direction side of the side 51.

Thus, on the illumination surface 9, the cutoff line 91 on the left-hand side with respect to the vehicle's traveling direction is high and the cutoff line 91 on the right-hand side is low.

Accordingly, it is possible to easily form the "rising line" raising the illumination on the sidewalk's side (left-hand side) for recognition of pedestrians and traffic signs.

Incidentally, this explanation is given of cases where vehicles travel on the left-hand side of the road. Thus, the rising line is inverted in the lateral direction in cases where vehicles travel on the right-hand side of the road. Namely, a rising line raising the illumination on the right-hand side is formed.

There are vehicles on which a plurality of headlight modules are arranged to form a light distribution pattern by adding light distribution patterns of the modules together. Namely, there are cases where a plurality of headlight modules are arranged and one light distribution pattern is formed by adding light distribution patterns of the modules together. Even in such cases, the headlight module 100 according to the first embodiment can be employed with ease.

With the headlight module 100, the width or the height of the light distribution pattern can be changed by adjusting the curved surface shape of the spot light distribution formation part 41 or each diffusive light distribution formation part 42 of the light distribution control element 4. Further, the lighting distribution can also be changed.

In the first embodiment, an example of forming the spot light distribution formation part 41 in one region and forming the diffusive light distribution formation part 42 in two regions has been described. However, the diffusive light distribution formation part 42 is not limited to this example and may be formed in a plurality of regions. Incidentally, the spot light distribution formation part 41 is desired to be formed in a region intersecting with the optical axis C.

The spot light distribution formation part 41 does not necessarily need to have positive power in the horizontal direction (X-axis direction). For example, even if the spot light distribution formation part 41 has negative power in the horizontal direction (X-axis direction), the same effects can be obtained if positive power is formed in combination with the power of the condensing optical element 2.

A second modification shows an example in which the condensing optical element 2 is left out by forming a spot light distribution formation part 311 or a diffusive light distribution formation part 312 as a toroidal lens surface.

The spot light distribution formation part 41 forms the high illuminance region situated in a central part of the light distribution pattern. Therefore, the spot light distribution formation part 41 is desired to have greater power in the horizontal direction (X-axis direction) than the diffusive light distribution formation part 42. Namely, the power of the spot light distribution formation part 41 in the horizontal direction (X-axis direction) is desired to be set greater than the power of the diffusive light distribution formation part 42 in the horizontal direction (X-axis direction).

Having the high illuminance region illuminated by the ray traveling along the optical axis C minimizes the load on the light distribution control element 4 and is the most efficient. The high illuminance region is generally situated at the center of the light distribution pattern. Therefore, it is desirable to arrange the spot light distribution formation part 41 on the optical axis C. Further, the spot light distribution formation part 41 is desired to have greater power in the horizontal direction (X-axis direction) than the diffusive light distribution formation part 42.

Thus, the spot light distribution formation part 41 has greater power in the horizontal direction than the diffusive light distribution formation part 42. The spot light distribution formation part 41 forms the high illuminance region by condensing light. The diffusive light distribution formation part 42 is arranged at a position deviated from the optical axis C. Namely, the optical axis C does not pass through the diffusive light distribution formation part 42. Therefore, it is desirable that the diffusive light distribution formation part 42 have weaker positive power or negative power than the spot light distribution formation part 41 and diffuse light wider compared to the spot light distribution formation part.

Specifically, in cases where the spot light distribution formation part 41 and the diffusive light distribution formation parts 42 are convex surfaces in the horizontal direction (X-axis direction), for example, the curvature radius of the spot light distribution formation part 41 in the horizontal direction (X-axis direction) is smaller than the curvature radius of the diffusive light distribution formation part 42 in the horizontal direction (X-axis direction).

In contrast, in cases where the spot light distribution formation part 41 and the diffusive light distribution formation parts 42 are concave surfaces in the horizontal direction (X-axis direction), the curvature radius of the spot light distribution formation part 41 in the horizontal direction (X-axis direction) is larger than the curvature radius of the diffusive light distribution formation part 42 in the horizontal direction (X-axis direction).

To sum up, in the horizontal direction (X-axis direction), the power of the diffusive light distribution formation part 42 is smaller than the power of the spot light distribution formation part 41.

A convex surface has positive power and a concave surface has negative power. Thus, in cases where the spot light distribution formation part 41 is a convex surface and the diffusive light distribution formation part 42 is a concave surface, the spot light distribution formation part 41 has positive power and the diffusive light distribution formation part 42 has negative power. Accordingly, the power of the diffusive light distribution formation part 42 is smaller than the power of the spot light distribution formation part 41.

With the headlight module 100, the width and the height of the light distribution pattern can be changed by adjusting the optical positional relationship between the condensing optical element 2 and the light distribution control element 4. Further, the lighting distribution can also be changed.

In the headlight module 100, the shape of the cutoff line 91 can be defined by the shape of the side 51 of the light blocking plate 5. In other words, the light distribution pattern can be formed according to the shape of the light blocking plate 5.

Thus, especially, it is unnecessary to change the shape of the condensing optical element 2 or the like among the plurality of headlight modules. Namely, the condensing optical element 2 can be used as a common component. Accordingly, the number of types of components can be reduced, the assembling efficiency can be improved, and the production cost can be reduced.

It is sufficient as long as such functions of desirably adjusting the width and the height of the light distribution pattern and desirably adjusting the lighting distribution are fulfilled by the whole of the headlight module 100. The headlight module 100 includes the condensing optical element 2, the light distribution control element 4 and the light blocking plate 5 as optical components. Thus, it is also possible to allocate these functions between an optical surface of the condensing optical element 2 or the light distribution control element 4 and the light blocking plate 5 that form the headlight module 100.

<First Modification>

The spot light distribution formation part 41 and the diffusive light distribution formation parts 42 have been described as segmented discontinuous surfaces. However, the spot light distribution formation part 41 and the diffusive light distribution formation parts 42 can be formed as connected surfaces. Further, the spot light distribution formation part 41 and the diffusive light distribution formation parts 42 can be formed as smoothly connected continuous surfaces.

Figure 18A:
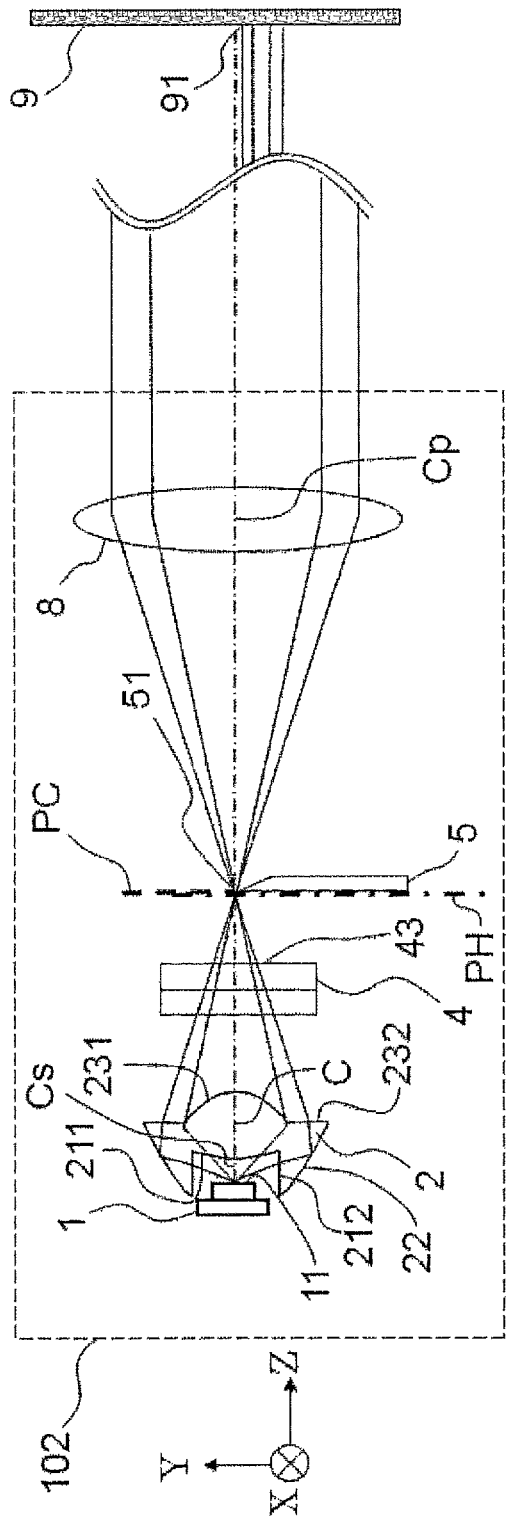
FIGS. 18A and 18B are configuration diagrams showing the configuration of a headlight module 102 according to a first modification of the first embodiment.
Figure 18B:
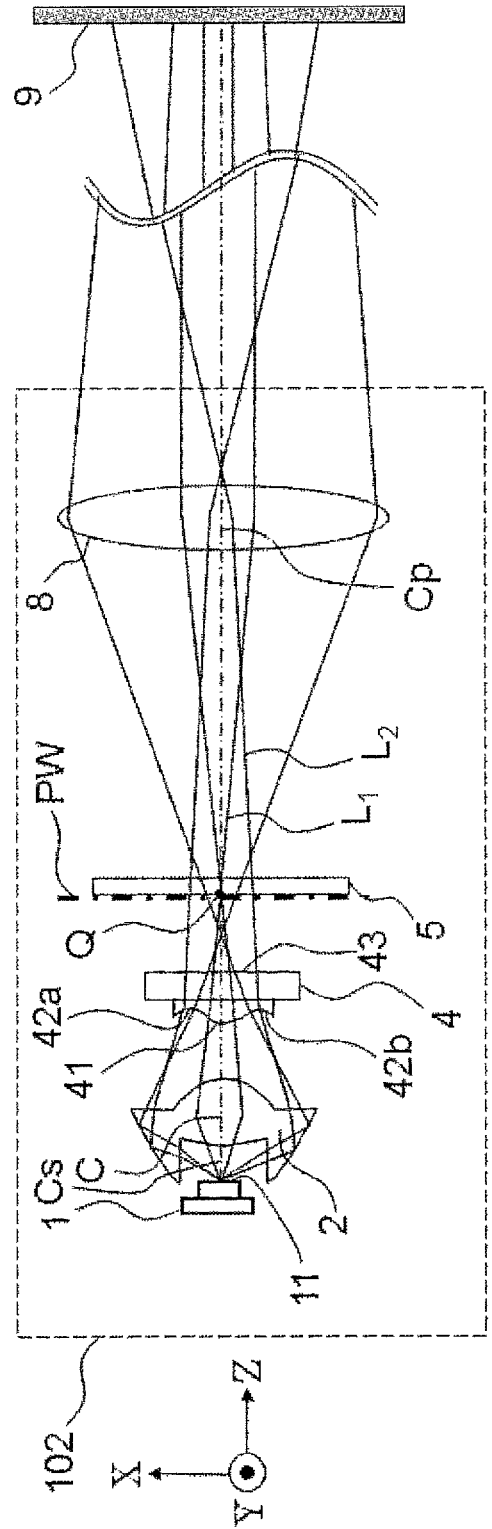
Figure 19:
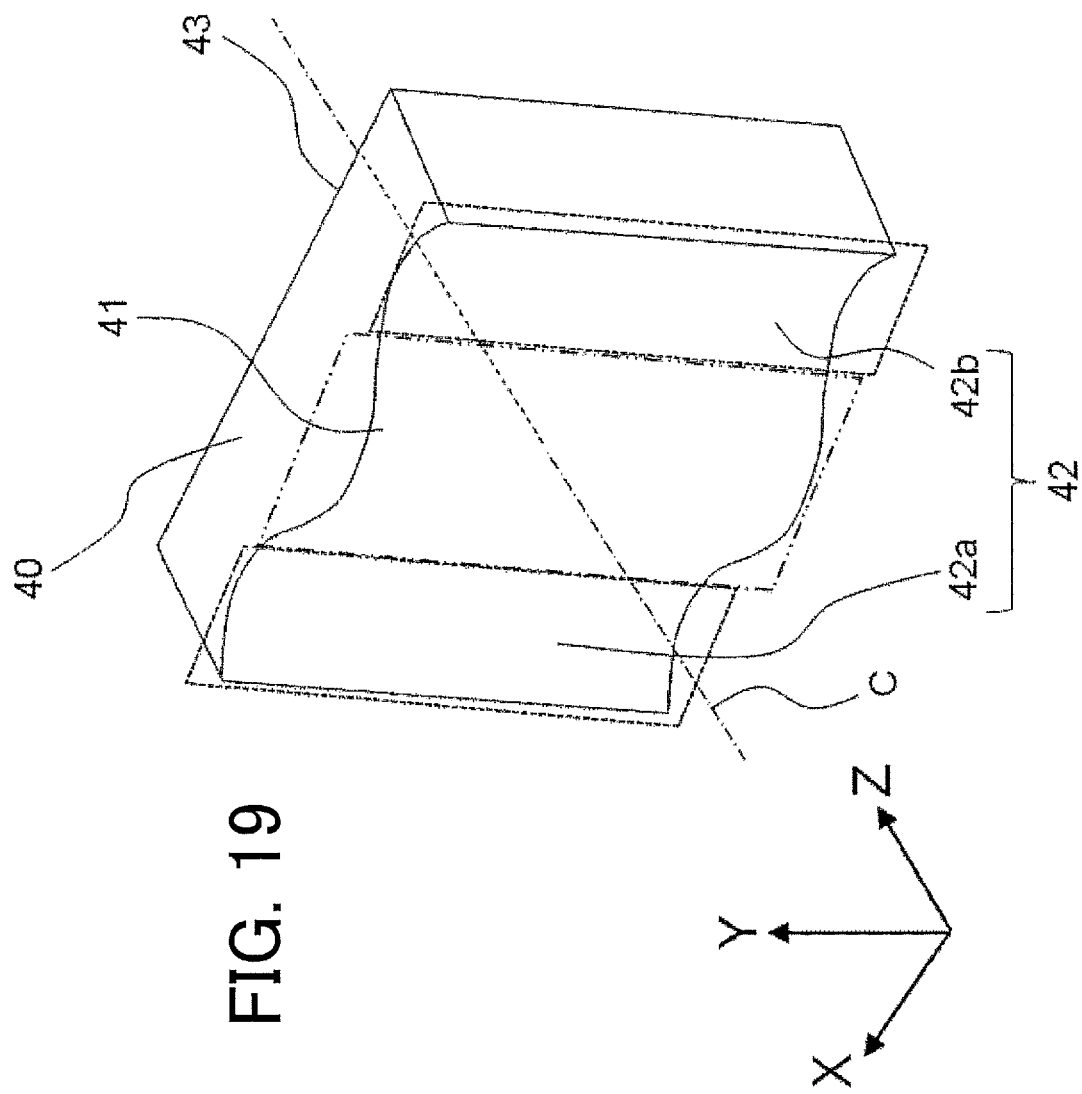
FIG. 19 is a perspective view of a light distribution control element 40 according to the first modification of the first embodiment.

FIG. 18A and FIG. 18B are configuration diagrams showing the configuration of a headlight module 102 according to a first modification of the first embodiment. FIG. 19 is a perspective view of a light distribution control element 40 according to the first modification.

For example, in FIG. 19, the spot light distribution formation part 41 is a region surrounded by two-dot chain lines. The diffusive light distribution formation part 42 is a region surrounded by broken lines.

As it is known from FIG. 19, the boundary between the spot light distribution formation part 41 and the diffusive light distribution formation part 42 is continuously connected so as to form a smooth curved surface. The incidence surface of the light distribution control element 40 is formed as a surface that is continuous throughout the incidence surface. In other words, there is no step at the boundary between the spot light distribution formation part 41 and the diffusive light distribution formation part 42. Further, the boundary between the spot light distribution formation part 41 and the diffusive light distribution formation part 42 is not bent like a V-shape, for example. A "bend like a V-shape" means a bend like a ridge line formed between two surfaces. The "ridge line" means a line segment at a part where two surfaces intersect with each other. Specifically, a corner is formed between two surfaces.

Figure 20:
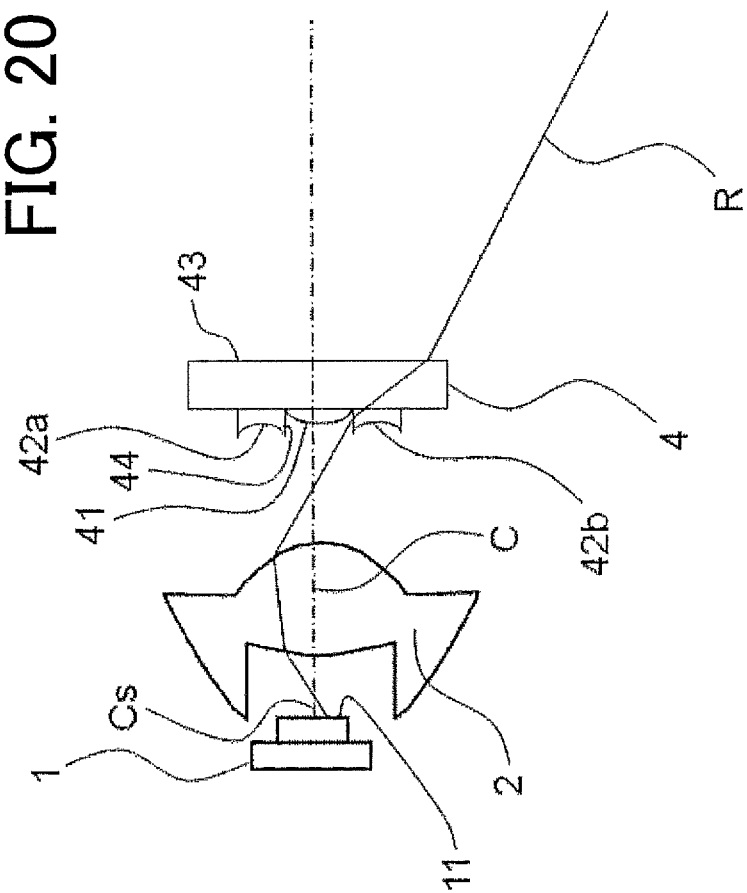
FIG. 20 is a diagram showing an example of a ray entering the light distribution control element 4 according to the first modification of the first embodiment.

FIG. 20 shows an example of a ray incident on the light distribution control element 4. FIG. 20 is a diagram showing a view from the +Y-axis direction side.

As it is known from FIG. 20, in cases where the spot light distribution formation part 41 and the diffusive light distribution formation parts 42 are segmented, there exist rays incident on a step 44 at the boundary between the spot light distribution formation part 41 and the diffusive light distribution formation part 42. In FIG. 20, a ray R of light is incident on the step 44, for example.

The ray R of light is not incident on the spot light distribution formation part 41 or the diffusive light distribution formation part 42. Thus, the ray R of light does not reach a designed position. For example, the ray R of light does not reach a designed position on the conjugate plane PC. In other words, the ray R of light is not controlled by the light distribution control element 4. Accordingly, the ray R of light deteriorates the quality of the light distribution pattern. Further, the ray R of light is not used for the light distribution pattern in cases where the ray R of light does not reach a valid range on the conjugate plane PC.

Such rays R of light incident on the step 44 cannot be used effectively. Thus, the step 44 causes a drop in the light utilization efficiency. Further, such rays R of light, as unnecessary light, cause the glare or the like. The glare light means dazzling light. In regard to the headlight device, the glare light means light that causes one's field of vision uncomfortable and makes it hard to see the front.

Also in cases where the boundary is bent like a V-shape, a phenomenon similar to that caused by the step 44 occurs.

However, the light distribution control element 40 has no step at the boundary between the spot light distribution formation part 41 and the diffusive light distribution formation part 42. Accordingly, the light incident on the spot light distribution formation part 41 or the diffusive light distribution formation part 42 is used for the design of the light distribution pattern. In other words, the light incident on the light distribution control element 40 is controlled by the light distribution control element 40. In the light distribution control element 40, light not used for the light distribution pattern or light deteriorating the quality of the light distribution pattern does not occur. The light distribution control element 40 contributes to the increase in the light utilization efficiency and the reduction of the glare light.

The first modification described above is applicable also to other embodiments.

Second Embodiment

FIG. 11A and FIG. 11B are configuration diagrams showing the configuration of a headlight module 110 according to a second embodiment. FIG. 11A is a diagram showing the headlight module 110 as viewed from the right-hand side (−X-axis direction side) with respect to the vehicle's forward direction. FIG. 11B is a diagram showing the headlight module 110 as viewed from the upper side (+Y-axis direction side).

As shown in FIG. 11A and FIG. 11B, the headlight module 110 according to the second embodiment includes the light source 1, the condensing optical element 2 and a light guide projection optical element 3. Incidentally, the condensing optical element 2 can be left out in cases where a light distribution control surface 31 of the light guide projection optical element 3 has the light-condensing function. There can be cases where the headlight module 110 includes the light source 1 and the condensing optical element 2 as a single unit formed by attaching the condensing optical element 2 to the light source 1.

The second embodiment differs from the first embodiment in including the light guide projection optical element 3 having the functions of the light distribution control element 4, the light blocking plate 5 and the projection lens 8 in the first embodiment in one body. Specifically, the light guide projection optical element 3 has a configuration including the light distribution control element 4 and the projection lens 8. The function of the light blocking plate 5 is implemented by a reflecting surface 32.

Components equivalent to those of the headlight module 100 described in the first embodiment are assigned the same reference characters as in the first embodiment and repeated explanation thereof is omitted.

The components equivalent to those in the first embodiment are the light source 1 and the condensing optical element 2. However, the arrangement of the light source 1 and the condensing optical element 2 in the second embodiment is different from that in the first embodiment.

The explanation in the first embodiment is substituted for the explanation of the configuration, function, operation, etc. of each component identical with that in the first embodiment even when the explanation is omitted in the second embodiment. Further, description in the second embodiment in regard to the first embodiment is used as explanation of the first embodiment. Here, the "operation" includes the behavior of light.

The light source 1 and the condensing optical element 2 are arranged with their optical axes Cs and C inclined in the −Y-axis direction by an angle "a". "Inclining the optical axis in the −Y-axis direction" means rotating the optical axis, originally being parallel to the Z-axis, around the X-axis as the rotation axis clockwise as viewed from the −X-axis direction side.

To simplify the explanation of the light source 1 and the condensing optical element 2, $X_1Y_1Z_1$ coordinates will be used as a new coordinate system. The $X_1Y_1Z_1$ coordinates are coordinates obtained by rotating the XYZ coordinates around the X-axis as the rotation axis clockwise by the angle "a" as viewed from the −X-axis direction side.

In the second embodiment, the X-axis is parallel to the reflecting surface 32 and perpendicular to an optical axis $C_1$. The Y-axis is perpendicular to the Z-X plane. The Z-axis is parallel to the optical axis $C_1$. An $X_1$-axis is parallel to the reflecting surface 32 and perpendicular to the optical axis $C_1$. Namely, the $X_1$-axis is identical with the X-axis. A $Y_1$-axis is perpendicular to a $Z_1$-$X_1$ plane. A $Z_1$-axis is parallel to an optical axis $C_2$. Alternatively, the $Z_1$-axis is parallel to the optical axis Cs.

Incidentally, in the first embodiment, the optical axis $C_2$ of the condensing optical element 2 is parallel to the $Z_1$-axis. Further, the optical axis $C_2$ of the condensing optical element 2 coincides with the optical axis Cs of the light source 1.

In the second embodiment, the optical axis $C_1$ is the optical axis of the light guide projection optical element 3. The optical axis $C_2$ is the optical axis of the condensing optical element 2. The optical axis Cs is the optical axis of the light source 1.

<Light Source 1>

The light source 1 has the light-emitting surface 11. The light source 1 emits light for illuminating a region in front of (in the +Z-axis direction from) the vehicle from the light-emitting surface 11.

The light source 1 is situated on the −$Z_1$-axis direction side of the condensing optical element 2. The light source 1 is situated on the −Z-axis direction side of (to the rear of) the light guide projection optical element 3. The light source 1 is situated on the +Y-axis direction side (upper side) of the light guide projection optical element 3.

In FIG. 11, the light source 1 emits light in the +$Z_1$-axis direction. While the type of the light source 1 is not particularly limited, the following explanation will be given assuming that the light source 1 is an LED in the same way as the foregoing explanation.

<Condensing Optical Element 2>

The condensing optical element 2 itself is the same as that in the first embodiment. In regard to the condensing optical element 2 itself, the explanation in the second embodiment is omitted while substituting the explanation in the first embodiment for the explanation in the second embodiment.

Incidentally, the optical axis C of the condensing optical element 2 explained in the first embodiment changes to the optical axis $C_2$ in the second embodiment. Thus, the optical axis C in the explanation in the first embodiment is replaced with the optical axis $C_2$.

Further, the XYZ coordinates of the condensing optical element 2 explained in the first embodiment changes to the $X_1Y_1Z_1$ coordinates in the second embodiment. Thus, the XYZ coordinates in the explanation in the first embodiment is replaced with the $X_1Y_1Z_1$ coordinates.

The condensing optical element 2 is situated on the +$Z_1$-axis direction side of the light source 1. The condensing optical element 2 is situated on the −$Z_1$-axis direction side of the light guide projection optical element 3. The condensing optical element 2 is situated on the −Z-axis direction side of (to the rear of) the light guide projection optical element 3. The condensing optical element 2 is situated on the +Y-axis direction side (upper side) of the light guide projection optical element 3.

The light emitted from the light source 1 is incident on the condensing optical element 2. The condensing optical element 2 condenses the light into any position in front (in the +$Z_1$-axis direction). The condensing optical element 2 is an optical element having the light-condensing function. The condensing position of the condensing optical element 2 will be explained later by referring to FIG. 13 and FIG. 14.

The light source 1 and the condensing optical element 2 are arranged on the upper side (+Y-axis direction side) of the light guide projection optical element 3. The light source 1 and the condensing optical element 2 are arranged to the rear of (on the −Z-axis direction side of) the light guide projection optical element 3.

The light source 1 and the condensing optical element 2 are situated on one side of the reflecting surface 32 on which the reflecting surface 32 reflects light. Namely, the light source 1 and the condensing optical element 2 are situated on a front side of the reflecting surface 32. The light source 1 and the condensing lens 2 are situated on the front side of the reflecting surface 32 in regard to the direction of a normal line to the reflecting surface 32. The condensing optical element 2 is arranged on the side facing the reflecting surface 32.

In FIG. 11, the optical axis Cs of the light source 1 coincides with the optical axis $C_2$ of the condensing optical element 2.

Further, the optical axes Cs and $C_2$ of the light source 1 and the condensing optical element 2 have an intersection point on the reflecting surface 32, for example.

In cases where the light is refracted by the incidence surface 31, for example, a central ray emanating from the condensing optical element 2 reaches the reflecting surface 32. Namely, the optical axis $C_2$ of the condensing optical element 2 or the central ray has an intersection point on the reflecting surface 32. Incidentally, the central ray coincides with the optical axis $C_2$ until the central ray emitted from the light source 1 emanates from the condensing optical element 2.

The central ray is a ray situated at the center of the flux of the light emitted from the center of the light-emitting surface of the light source. Each of the embodiments describes the central ray which coincides with the optical axis of the light source, as an example. Each of the embodiments also describes the optical axis of the light source which coincides with the optical axis of the condensing optical element, as an example.

The condensing optical element 2 is arranged immediately after the light source 1. Here, the "after" means being on a side in the traveling direction of the light emitted from the light source 1 and differs from the aforementioned "backward direction". According to "immediately after" used here, the light emitted from the light-emitting surface 11 immediately enters the condensing optical element 2.

<Light Guide Projection Optical Element 3>

The light guide projection optical element 3 is situated on the $+Z_1$-axis direction side of the condensing optical element 2. The light guide projection optical element 3 is situated on the +Z-axis direction side of the condensing optical element 2. The light guide projection optical element 3 is situated on the −Y-axis direction side of the condensing optical element 2.

The light emanating from the condensing optical element 2 is incident on the light guide projection optical element 3. The light guide projection optical element 3 emits the light in the forward direction (+Z-axis direction).

The light guide projection optical element 3 has a function of guiding light with its reflecting surface 32. The light guide projection optical element 3 also has a function of projecting light with its exit surface 33. Thus, in the explanation of the optical element 3, the optical element 3 is described as a light guide projection optical element 3 to facilitate the understanding. The light guide projection optical element 3 is an optical element that guides and projects light.

To "guide light" means to lead light incident from one side (incidence surface) to the other side (exit surface) by using internal reflection.

FIG. 12 is a perspective view of the light guide projection optical element 3. The light guide projection optical element 3 has the light distribution control surface 31, the reflecting surface 32 and the exit surface 33. The light guide projection optical element 3 can have an incidence surface 34.

The light guide projection optical element 3 enables the exit surface 33 not to have the projecting function. In such cases, the headlight module 110 may be provided with the projection lens 8 as described in the first embodiment.

The light guide projection optical element 3 is made of a transparent resin, glass, silicone material or the like, for example.

The light guide projection optical element 3 shown in the second embodiment is filled with a refractive material, for example.

The light distribution control surface 31 is formed at an end of the light guide projection optical element 3 on the −Z-axis direction side. The light distribution control surface 31 is formed on a part of the light guide projection optical element 3 on the +Y-axis direction side.

The light distribution control surface 31 has a function equivalent to that of the light distribution control element 4 in the first embodiment. Namely, the light distribution control surface 31 has a spot light distribution formation part 311 and diffusive light distribution formation parts 312. In other words, the light guide projection optical element 3 has a configuration including the light distribution control element 4. The spot light distribution formation part 311 corresponds to the spot light distribution formation part 41 of the light distribution control element 4. The diffusive light distribution formation parts 312 correspond to the diffusive light distribution formation parts 42 of the light distribution control element 4.

In FIG. 11A, FIG. 11B and FIG. 12, the light distribution control surface 31 of the light guide projection optical element 3 has two diffusive light distribution formation parts 312a and 312b, for example. The diffusive light distribution formation part 312a is situated on the +X-axis direction side (+X-axis direction side) of the light distribution control surface 31. The diffusive light distribution formation part 312b is situated on the $-X_1$-axis direction side (−X-axis direction side) of the light distribution control surface 31.

The spot light distribution formation part 311 is arranged between the two diffusive light distribution formation parts 312a and 312b.

In the first embodiment, the light distribution control element 4 is arranged to be perpendicular to the optical axis C. However, in the second embodiment, the light distribution control surface 31 is inclined with respect to the optical axis $C_2$. In FIG. 11, the optical axis $C_2$ is inclined in the $-Y_1$-axis direction with respect to the normal line to the light distribution control surface 31.

Namely, with respect to the normal line to the light distribution control surface 31, the optical axis $C_2$ is rotated counterclockwise as viewed from the −X-axis direction side. The central ray emanating from the condensing optical element 2 reaches the light distribution control surface 31 from the $-Y_1$-axis direction side with respect to the normal line to the light distribution control surface 31. The central ray emanating from the condensing optical element 2 reaches the light distribution control surface 31 from the direction in which the reflecting surface 32 is arranged with respect to the light distribution control surface 31. In the second embodiment, the central ray is indicated as a ray on the optical axis $C_2$.

This is for allowing the light incident from the light distribution control surface 31 to be refracted and reach the reflecting surface 32.

In FIG. 11A, FIG. 11B and FIG. 12, the spot light distribution formation part 311 is a cylindrical lens in a convex shape having curvature in the $X_1$-axis direction (X-axis direction) and no curvature in the $Y_1$-axis direction (or the Y-axis direction).

Specifically, the spot light distribution formation part 311 has no curvature in a direction parallel to the light distribution control surface 31 and perpendicular to the X-axis. The light distribution control surface 31 is described in this explanation as a plane on which the spot light distribution formation part 311 and the diffusive light distribution formation parts 312 are provided. Namely, the spot light distribution formation part 311 and the diffusive light distribution formation parts 312 are assumed to be formed on this imaginary plane. This plane can be an approximated plane in cases where the light distribution control surface 31 is a curved surface, for example. The same goes for the following explanation of the shapes of the spot light distribution formation part 311 and the diffusive light distribution formation parts 312.

In FIG. 11, the spot light distribution formation part 311 is in a convex shape having positive power in the $X_1$-axis direction (X-axis direction). Thus, if the spot light distribution formation part 311 is cut at a plane parallel to the $Z_1$-$X_1$ plane (or the Z-X plane), the cross section has a shape of a convex lens.

In other words, if the spot light distribution formation part 311 is cut at a plane parallel to the X-axis and perpendicular to the light distribution control surface 31, the cross section has a shape of a convex lens.

The optical axis $C_2$ passes through the lens surface of the spot light distribution formation part 311. In FIG. 11, the optical axis $C_2$ coincides with the optical axis of the convex lens in the case where the spot light distribution formation part 311 is cut at the plane parallel to the $Z_1$-$X_1$ plane, for example.

In other words, in FIG. 11, the optical axis $C_2$ coincides with the optical axis of the convex lens in the case where the spot light distribution formation part 311 is cut at the plane parallel to the X-axis and perpendicular to the light distribution control surface 31, for example.

The diffusive light distribution formation part 312 is a cylindrical lens in a concave shape having curvature in the $X_1$-axis direction and no curvature in the $Y_1$-axis direction, for example.

Specifically, the diffusive light distribution formation part 312 has no curvature in the direction parallel to the light distribution control surface 31 and perpendicular to the X-axis. The diffusive light distribution formation part 312 has no curvature on the Y-Z plane.

In FIG. 11, each of the diffusive light distribution formation parts 312a and 312b is in a concave shape having negative power in the $X_1$-axis direction (X-axis direction). Thus, if the diffusive light distribution formation part 312 is cut at a plane parallel to the $Z_1$-$X_1$ plane (or the Z-X plane), the cross section has a shape of a concave lens.

In other words, if the diffusive light distribution formation part 312 is cut at a plane parallel to the X-axis and perpendicular to the light distribution control surface 31, the cross section has a shape of a concave lens.

The light distribution control surface 31 can be regarded as an example of a light distribution pattern shape formation part. The light distribution control surface 31 can be regarded also as an example of a light-condensing part.

The "light distribution pattern shape formation part" means a part that forms the shape of a light distribution pattern.

The reflecting surface 32 is provided at an end of the light distribution control surface 31 on the −Y-axis direction side. Namely, the reflecting surface 32 is arranged on the −Y-axis direction side of the light distribution control surface 31. Further, the reflecting surface 32 is arranged on the +Z-axis direction side of the light distribution control surface 31. In the second embodiment, an end of the reflecting surface 32 on the −Z-axis direction side is connected to the end of the light distribution control surface 31 on the −Y-axis direction side.

The reflecting surface 32 reflects light reaching the reflecting surface 32. In other words, the reflecting surface 32 has a function of reflecting light. Thus, the reflecting surface 32 functions as a light-reflecting part. The reflecting surface 32 can be regarded as an example of the light-reflecting part.

The reflecting surface 32 faces the +Y-axis direction. Specifically, the front face of the reflecting surface 32 faces the +Y-axis direction. To "face" means to have the front part toward something. The front face of the reflecting surface 32 is a face that reflects light. The front face of the reflecting surface 32 is pointed approximately in the +Y-axis direction. The back face of the reflecting surface 32 is pointed approximately in the −Y-axis direction.

The reflecting surface 32 is a surface that is rotated with respect to the Z-X plane clockwise around an axis parallel to the X-axis as viewed from the −X-axis direction side. In FIG. 11, the reflecting surface 32 is a surface that is rotated with respect to the Z-X plane by an angle "b".

Specifically, the reflecting surface 32 is inclined so that the reflecting surface is slightly oriented in the direction in which the light guide projection optical element 3 emits light (+Z-axis direction).

In FIG. 11, the reflecting surface 32 is indicated as a plane surface. However, the reflecting surface 32 does not need to be a plane surface. The reflecting surface 32 may have a curved surface shape.

The reflecting surface 32 may be formed as a mirror surface by means of mirror vapor deposition. However, it is desirable to have the reflecting surface 32 function as a total reflection surface without conducting the mirror vapor deposition.

This is because the total reflection surface has higher reflectivity than the mirror surface and contributes to the increase in the light utilization efficiency. Further, the manufacturing process of the light guide projection optical element 3 can be simplified by eliminating the mirror vapor deposition step. This contributes to the reduction of the production cost of the light guide projection optical element 3.

Especially, the configuration shown in the first embodiment has a characteristic in that the reflecting surface 32 can be formed as a total reflection surface without conducting the mirror vapor deposition since the incidence angle of the ray to the reflecting surface 32 is shallow. The "incidence angle is shallow" means that the incidence angle is large. The incidence angle is the angle made by the direction of incidence and the normal line to the interface surface when the ray is incident. In this example, the interface surface is the reflecting surface 32.

Figure 21:
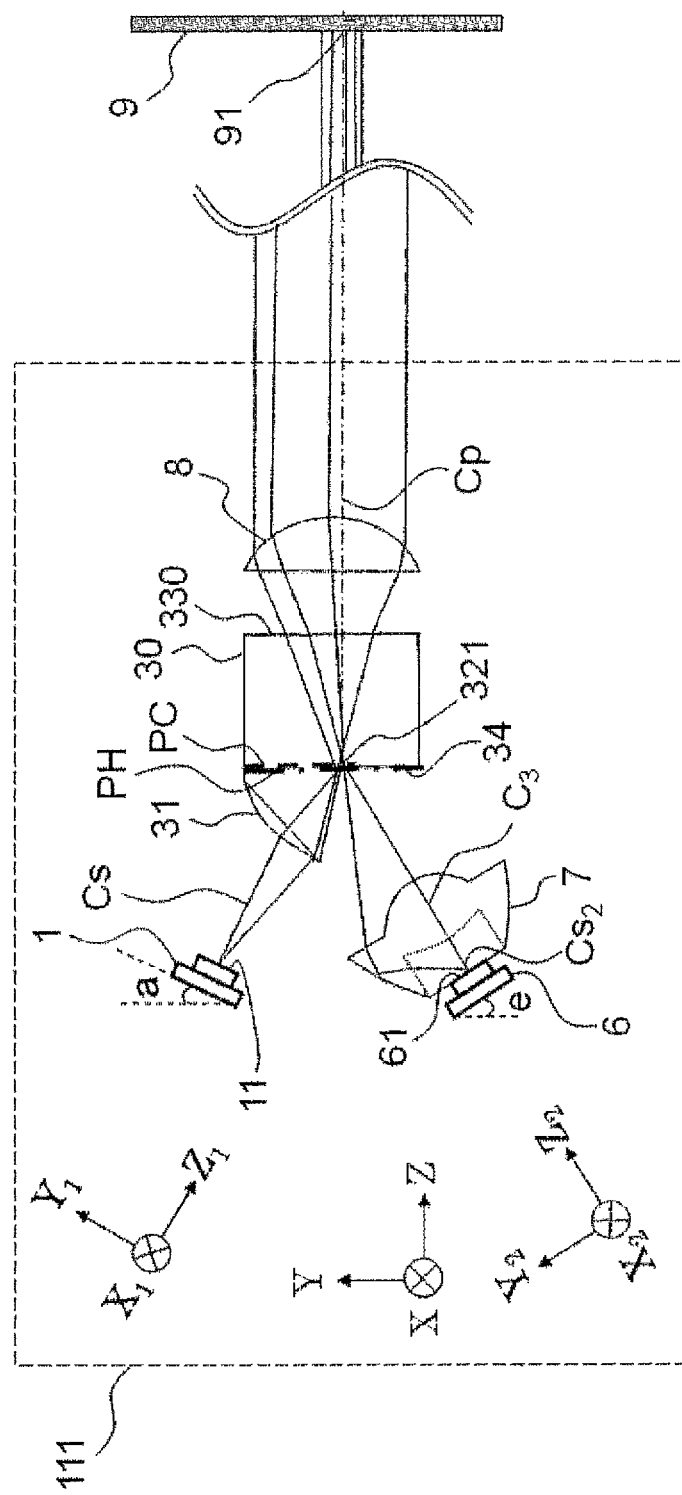
FIG. 21 is a configuration diagram showing the configuration of a headlight module 111 according to a second modification of the second embodiment.

The incidence surface 34 is used for receiving incident light and emitting light corresponding to the high beam from the exit surface 33, for example. While the light source for the high beam is not shown in FIG. 11, the light source is arranged at a position facing the incidence surface 34, for example. The light source for the high beam (light source 6), which is shown in FIG. 21, will be explained later in a second modification by referring to FIG. 21.

The incidence surface 34 is a surface parallel to the X-Y plane, for example. However, the incidence surface 34 may have a curved surface shape. By forming the incidence surface 34 in a curved surface shape, the light distribution of the incident light can be changed.

The incidence surface 34 is arranged on the −Y-axis direction side of the reflecting surface 32. Namely, the incidence surface 34 is arranged on the back side of the reflecting surface 32. In FIG. 11, an end of the incidence surface 34 on the +Y-axis direction side is connected to an end of the reflecting surface 32 on the +Z-axis direction side. In FIG. 11, the end of the incidence surface 34 on the +Y-axis direction side is arranged at the end of the reflecting surface 32 on the +Z-axis direction side.

The incidence surface 34 in FIG. 11 is situated at a position optically conjugate with the illumination surface 9. Therefore, the shape of light on the incidence surface 34 and the conjugate plane PC situated on an extension of the incidence surface 34 is projected onto the illumination surface 9. Namely, the exit surface 33 projects the shape of light on the incidence surface 34 and the conjugate plane PC situated on an extension of the incidence surface 34 onto the illumination surface 9. Here, the shape of light is the light distribution pattern.

In FIG. 11, no ray is incident from the incidence surface 34. Namely, there is no ray incident from the incidence surface 34. Thus, in FIG. 11, the shape of light incident from the light distribution control surface 31 on the conjugate plane PC is projected onto the illumination surface 9.

Incidentally, the image of the light on the conjugate plane PC (light distribution pattern) is formed on a part of the conjugate plane PC inside the light guide projection optical element 3. Specifically, the light distribution pattern can be formed in a shape suitable for the headlight module 110 within a range on the conjugate plane PC inside the light guide projection optical element 3. For example, in cases where one light distribution pattern is formed on the illumination surface 9 by using a plurality of headlight modules, a light distribution pattern corresponding to the function of each headlight module can be formed on the conjugate plane PC.

A ridge line part 321 is a side of the reflecting surface 32 on the −Y-axis direction side. The ridge line part 321 is a side of the reflecting surface 32 on the +Z-axis direction side. The ridge line part 321 is situated at a position optically conjugate with the illumination surface 9. The ridge line part 321 corresponds to the side 51 of the light blocking plate 5 in the first embodiment.

The "ridge line" generally means a boundary line between two surfaces. However, the "ridge line" used here can mean an edge of a surface. In the first embodiment, the ridge line part 321 is the part connecting the reflecting surface 32 and the incidence surface 34 together, for example. Namely, the part where the reflecting surface 32 and the incidence surface 34 connect to each other is the ridge line part 321.

However, in cases where the inside of the light guide projection optical element 3 is hollow and the incidence surface 34 is an opening, for example, the ridge line part 321 is an edge of the reflecting surface 32. Thus, the ridge line part 321 can be a boundary line between two surfaces. The ridge line part 321 can also be an edge of a surface. Incidentally, in the second embodiment, the inside of the light guide projection optical element 3 is filled with a refractive material as mentioned earlier.

Further, the "ridge line" is not limited to a straight line but can be a curved line or the like. For example, the ridge line can be formed in the shape of the aforementioned "rising line". The ridge line can be formed in a shape similar to the sides 51a and 51b of the light blocking plate 5 described in the first embodiment. In the second embodiment, the ridge line part 321 is in a shape of a straight line. In the second embodiment, the ridge line part 321 is in a shape of a straight line parallel to the X-axis.

To sum up, the shape, etc. of the ridge line part 321 is similar to the shape, etc. of the side 51 in the first embodiment. Thus, the explanation of the shape, etc. of the side 51 in the first embodiment is substituted for the explanation of the shape, etc. of the ridge line part 321.

Further, in the second embodiment, the ridge line part 321 is a side of the incidence surface 34 on the +Y-axis direction side. The ridge line part 321 is also situated on the incidence surface 34. Accordingly, the ridge line part 321 is situated at a position optically conjugate with the illumination surface 9.

Furthermore, in the second embodiment, the ridge line part 321 intersects with the optical axis $C_1$ of the exit surface 33. The ridge line part 321 intersects with the optical axis $C_1$ of the exit surface 33 at right angles. The optical axis $C_1$ corresponds to the optical axis Cp in the first embodiment.

The optical axis $C_1$ is a normal line to the exit surface 33 that passes through the surface vertex of the exit surface 33. In the case of FIG. 11, the optical axis $C_1$ is an axis parallel to the Z-axis and passing through the surface vertex of the exit surface 33.

Thus, when the surface vertex of the exit surface 33 is translated in the X-axis direction or the Y-axis direction on an X-Y plane, the normal line to the surface vertex of the exit surface 33 is also translated in the same way in the X-axis direction or the Y-axis direction on X-Y planes. Therefore, the optical axis $C_1$ is also translated in the same way in the X-axis direction or the Y-axis direction on X-Y planes. When the exit surface 33 is inclined with respect to the X-Y plane, the normal line to the surface vertex of the exit surface 33 is also inclined with respect to the X-Y plane. Therefore, the optical axis $C_1$ is also inclined with respect to the X-Y plane in the same way.

The ridge line part 321 is in the shape of the cutoff line 91 of the light distribution pattern. This is because the ridge line part 321 is situated at the position optically conjugate with the illumination surface 9. Accordingly, the light distribution pattern on the illumination surface 9 becomes similar in shape to the light distribution pattern on the conjugate plane PC including the ridge line part 321. Therefore, it is desirable to form the ridge line part 321 in the shape of the cutoff line 91.

Parenthetically, in cases where the exit surface 33 is a toroidal lens surface, for example, the light distribution pattern on the illumination surface 9 differs from the light distribution pattern at the position of the conjugate plane PC in the ratio regarding the vertical direction and the lateral direction. To sum up, the light distribution pattern on the illumination surface 9 is formed based on the light distribution pattern at the position of the conjugate plane PC.

The exit surface 33 is provided at an end of the light guide projection optical element 3 on the +Z-axis direction side. The exit surface 33 is in a curved surface shape having positive power. The exit surface 33 is in a convex shape projecting in the +Z-axis direction.

The optical axis $C_1$ is the optical axis of the exit surface 33. In cases where the exit surface 33 is a plane surface and the projection lens 8 is employed as mentioned earlier, the optical axis $C_1$ may be defined as the optical axis of the projection lens 8. An example employing the projection lens 8, which is shown in FIG. 21, will be explained later in the second modification by referring to FIG. 21.

<Behavior of Ray>

As shown in FIG. 11, the light condensed by the condensing optical element 2 enters the light guide projection optical element 3 from the spot light distribution formation part 311, the diffusive light distribution formation part 312a or the diffusive light distribution formation part 312b.

In FIG. 11B and FIG. 12, the outside of the diffusive light distribution formation parts 312a and 312b are in planar shapes. However, the light condensed by the condensing optical element 2 does not enter the light guide projection optical element 3 from the planar parts. Namely, the light flux at the time of entering the light guide projection optical element 3 is within the region of the spot light distribution formation part 311 and the diffusive light distribution formation parts 312a and 312b.

The light distribution control surface 31 has functions equivalent to those of the light distribution control element 4 in the first embodiment. Specifically, the spot light distribution formation part 311 has functions equivalent to those of the spot light distribution formation part 41 in the first embodiment. The diffusive light distribution formation parts 312a and 312b have functions equivalent to those of the diffusive light distribution formation parts 42a and 42b in the first embodiment.

The spot light distribution formation part 311 is a refracting surface in a convex shape having curvature only in the X-axis direction, for example. Each diffusive light distribution formation part 312a, 312b is a refracting surface in a concave shape having curvature only in the X-axis direction, for example.

Each diffusive light distribution formation part 312a, 312b may be formed as a refracting surface in a convex shape having curvature only in the X-axis direction, for example, as explained in the first embodiment.

Here, curvatures of the spot light distribution formation part 311, the diffusive light distribution formation part 312a and the diffusive light distribution formation part 312b in the X-axis direction contribute to the "light distribution width" in the horizontal direction with respect to the road surface. Namely, curvatures of the spot light distribution formation part 311, the diffusive light distribution formation part 312a and the diffusive light distribution formation part 312b on the Z-X plane contribute to the "light distribution width" in the horizontal direction with respect to the road surface.

In other words, curvatures of cut surfaces obtained by cutting the spot light distribution formation part 311, the diffusive light distribution formation part 312a and the diffusive light distribution formation part 312b at a plane parallel to the X-axis and perpendicular to the light distribution control surface 31 contribute to the "light distribution width" in the horizontal direction with respect to the road surface.

Curvatures of the spot light distribution formation part 311, the diffusive light distribution formation part 312a and the diffusive light distribution formation part 312b in the Y-axis direction contribute to the "light distribution height" in the direction perpendicular to the road surface. Namely, curvatures of the spot light distribution formation part 311, the diffusive light distribution formation part 312a and the diffusive light distribution formation part 312b on the Y-Z plane contribute to the "light distribution height" in the direction perpendicular to the road surface.

In other words, curvatures of the spot light distribution formation part 311, the diffusive light distribution formation part 312a and the diffusive light distribution formation part 312b in a direction parallel to the light distribution control surface 31 and perpendicular to the X-axis contribute to the "light distribution height" in the direction perpendicular to the road surface. Incidentally, in the second embodiment, the Z-X plane is a plane perpendicular to the light distribution control surface 31 and the reflecting surface 32.

In the above explanation, the spot light distribution formation part 311 and the diffusive light distribution formation parts 312a and 312b have been described as cylindrical lenses. However, in cases where the "light distribution height" is adjusted, each of the spot light distribution formation part 311 and the diffusive light distribution formation parts 312a and 312b may be formed as a lens surface having power differing between the X-axis direction and the Y-axis direction. The "Y-axis direction" in this case is the direction parallel to the light distribution control surface 31 and perpendicular to the X-axis as mentioned above.

A toroidal lens surface can be taken as an example of a lens surface having curvature differing between the X-axis direction and the Y-axis direction. The "toroidal lens surface" is a surface whose curvatures in two perpendicular axial directions differ from each other like the surface of a barrel or a doughnut.

An example in which the diffusive light distribution formation parts 312a and 312b are toroidal lens surfaces, which is shown in FIG. 21, will be explained later in the second modification by referring to FIG. 21.

<Behavior of Ray on Z-X Plane>

First, the light passing through the spot light distribution formation part 311 will be explained below.

As shown in FIG. 11B, the spot light distribution formation part 311 is in a convex shape as viewed on the Z-X plane. Namely, the spot light distribution formation part 311 has positive power in regard to the horizontal direction (X-axis direction).

Here, "as viewed on the Z-X plane" means as viewed in the Y-axis direction. Namely, as viewed while being projected on the Z-X plane. Thus, the light incident on the spot light distribution formation part 311 propagates while being further condensed by the spot light distribution formation part 311. Here, to "propagate" in this case means that light travels in the light guide projection optical element 3.

Therefore, the X-axis direction width of the flux of the light incident on the spot light distribution formation part 311 and emitted from the exit surface 33 of the light guide projection optical element 3 on the conjugate plane PC changes depending on the curvature of the spot light distribution formation part 311.

As shown in FIG. 11B, a light flux $L_1$ is incident on the spot light distribution formation part 311 and emanates from the exit surface 33 of the light guide projection optical element 3. A light flux $L_2$ is incident on the diffusive light distribution formation part 312 and emanates from the exit surface 33 of the light guide projection optical element 3.

The X-axis direction width of the light flux $L_1$ on the conjugate plane PC changes depending on the curvature of the spot light distribution formation part 311.

As viewed on the Z-X plane, in order to form the brightest spot light distribution (high illuminance region) with the spot light distribution formation part 311, it is sufficient if the condensing position PW of the light emitted from the spot light distribution formation part 311 coincides with the conjugate plane PC as shown in FIG. 11B. However, a region in the X-axis direction illuminated by the spot light distribution formation part 311 becomes the smallest.

To sum up, the brightest spot light distribution is formed if the condensing position PW coincides with the conjugate plane PC. The condensing position PW is the X-axis direction condensing position of the light emitted from the spot light distribution formation part 311.

In FIG. 11B, the X-axis direction condensing position PW is indicated by a chain line. The condensing position PW is situated on the ridge line part 321. In FIG. 11B, the position of the ridge line part 321 is the position of the conjugate plane PC. In FIG. 11A, the conjugate plane PC is indicated by a broken line. The Y-axis direction condensing position PH is indicated by a chain line.

Parenthetically, in regard to the light passing through the incidence surface 211 and the exit surface 231 of the condensing optical element 2, the fact that the condensing positions PH and PW of the light are situated on the conjugate plane PC means that the image of the light-emitting surface 11 of the LED is formed on the conjugate plane PC. Put another way, in regard to the light passing through the incidence surface 211 and the exit surface 231 of the condensing optical element 2, the condensing positions PH and PW of the light coincide with the position of the conjugate plane PC, and the image of the light-emitting surface 11 of the light source 1 is formed on the conjugate plane PC.

In FIG. 11A and FIG. 11B, in regard to the light passing through the incidence surface 211 and the exit surface 231 of the condensing optical element 2, each of the condensing position PW and the condensing position PH coincides with the position of the conjugate plane PC. This means that the condensing optical element 2 and the light distribution control surface 31 form the image of the light-emitting surface 11 of the light source 1 on the conjugate plane PC in regard to the X-axis direction and the Y-axis direction. In short, the condensing optical element 2 and the light distribution control surface 31 form the image of the light-emitting surface 11 on the conjugate plane PC.

The condensing position PW is the condensing position regarding the X-axis direction. Namely, the condensing position PW is the condensing position on the Z-X plane. The condensing position PH is the condensing position regarding the Y-axis direction. Namely, the condensing position PH is the condensing position on the Y-Z plane.

Specifically, the condensing optical element 2 in FIG. 11 has power differing between the $X_1$-axis direction and the $Y_1$-axis direction. For example, the incidence surface 211 and the exit surface 231 of the condensing optical element 2 constitute a toroidal lens.

For example, as viewed on the Y-Z plane as shown in FIG. 11A, the condensing position PH obtained by the combination of the power of the condensing optical element 2 and the power of the spot light distribution formation part 311 is on the conjugate plane PC. However, since the spot light distribution formation part 311 has no power in FIG. 11A, the condensing position PH equals the Y-axis direction condensing position of the condensing optical element 2.

In contrast, as viewed on the Z-X plane as shown in FIG. 11B, the condensing position PW obtained by the combination of the power of the condensing optical element 2 and the power of the spot light distribution formation part 311 is on the conjugate plane PC. In FIG. 11B, the spot light distribution formation part 311 has power.

The condensing positions PH and PW are condensing positions obtained by the combined power of the condensing optical element 2 and the light distribution control element 4. In FIG. 11A, the condensing position PH is the Y-axis direction condensing position obtained by the power of the condensing optical element 2. In FIG. 11B, the condensing position PW is the X-axis direction condensing position obtained by the combined power of the condensing optical element 2 and the spot light distribution formation part 311.

Therefore, the focal length of the focal point of the condensing optical element 2 regarding the X-axis direction becomes shorter than the focal length of the focal point of the condensing optical element 2 regarding the Y-axis direction. In other words, the focal length of the condensing optical element 2 on the Z-X plane becomes shorter than the focal length of the condensing optical element 2 on the Y-Z plane. The position of the focal point regarding the X-axis direction is the focal position PH. The position of the focal point regarding the Y-axis direction is the focal position PW.

The conjugate plane PC is situated at the position conjugate with the illumination surface 9.

Therefore, the spread of light on the conjugate plane PC in the horizontal direction corresponds to the "light distribution width" on the illumination surface 9. Thus, the X-axis direction width of the light flux on the conjugate plane PC can be controlled by changing the curvature of the spot light distribution formation part 311 of the incidence surface 31 in the X-axis direction.

The brightness of the spot light distribution (high illuminance region) of the headlight module 110 can be changed as above. Specifically, when the spot light distribution is narrow, the brightness of the spot light distribution is higher than when the spot light distribution is wide. The brightness of a narrow spot light distribution is higher than the brightness of a wide spot light distribution.

The condensing position PW determined by the spot light distribution formation part 311 does not necessarily have to coincide with the conjugate plane PC.

FIG. 13 and FIG. 14 are diagrams for explaining the condensing position PW of the headlight module 110 according to the second embodiment.

In FIG. 13, the condensing position PW of the light emitted from the spot light distribution formation part 311 is situated on the front side (−Z-axis direction side) of the conjugate plane PC. Namely, the condensing position PW is situated between the condensing optical element 2 and the conjugate plane PC of the light guide projection optical element 3. The condensing position PW is situated between the condensing optical element 2 and the conjugate plane PC. In FIG. 13, the condensing position PW is determined by the condensing optical element 2 and the spot light distribution formation part 311.

In the configuration of FIG. 13, the light after passing through the condensing position PW diverges. Therefore, the X-axis direction width of the light flux on the conjugate plane PC is greater than the X-axis direction width of the light flux at the condensing position PW. Accordingly, light having a width in the horizontal direction (X-axis direction) emanates from the conjugate plane PC.

In FIG. 14, the condensing position PW of the light emitted from the spot light distribution formation part 311 is situated after (on the +Z-axis direction side of) the ridge line part 321 (conjugate plane PC). In FIG. 14, the condensing position PW is situated on the +Z-axis direction side of the conjugate plane PC. In FIG. 14, the conjugate plane PC is situated on the −Z-axis direction side of the condensing position PW. Namely, the condensing position PW is situated between the ridge line part 321 (conjugate plane PC) and the exit surface 33.

In the configuration of FIG. 14, the light passing through the conjugate plane PC condenses at the condensing position PW. Therefore, the X-axis direction width of the light flux on the conjugate plane PC is greater than the X-axis direction width of the light flux at the condensing position PW. Accordingly, light having a width in the horizontal direction (X-axis direction) emanates from the conjugate plane PC.

The X-axis direction width of the light flux on the conjugate plane PC can be controlled by controlling the distance from the conjugate plane PC to the condensing position PW. Accordingly, light having a width in the horizontal direction (X-axis direction) emanates from the conjugate plane PC.

Incidentally, each condensing position PH, PW is a position where the density of light per unit area reaches the maximum due to the minimum light flux diameter on the X-Y plane.

Therefore, in cases where the condensing position PW and the position of the conjugate plane PC (the Z-axis direction position of the ridge line part 321) coincide with each other, the width of the light distribution on the illumination surface 9 becomes the smallest. Further, the illuminance of the spot light distribution on the illumination surface 9 becomes the highest. Incidentally, this explanation is about the position in the Z-axis direction.

Thus, when it is desired to form the brightest spot light distribution, it works to make the condensing position PW of the light passing through the spot light distribution formation part 311 coincide with the position of the conjugate plane PC. It also works to make the condensing position PH of the light passing through the spot light distribution formation part 311 coincide with the position of the conjugate plane PC.

Here, the condensing positions PH and PW and the position of the conjugate plane PC are positions in the Z-axis direction.

Next, the light passing through the diffusive light distribution formation part 312a or 312b will be explained below.

As shown in FIG. 11B, each diffusive light distribution formation part 312a, 312b is in a concave shape as viewed on the Z-X plane. Namely, the diffusive light distribution formation part 312a, 312b has negative power in regard to the horizontal direction (X-axis direction). In FIG. 11B, the diffusive light distribution formation part 312a, 312b has a concave shape that is concave in the −Y-axis direction.

Thus, the light incident on the diffusive light distribution formation part 312a, 312b enters the light guide projection optical element 3 while being diffused, and then reaches the conjugate plane PC. Namely, the light incident on the diffusive light distribution formation part 312a, 312b enters the light guide projection optical element 3 at an increased divergence angle. Then, the light at the increased divergence angle reaches the conjugate plane PC.

Therefore, the X-axis direction width of the flux of the light incident on the diffusive light distribution formation part 312a, 312b and emanating from the exit surface 33 of the light guide projection optical element 3 on the conjugate plane PC is wide. The X-axis direction width of the light flux on the conjugate plane PC is increased by the diffusive light distribution formation part 312a, 312b.

For example, as shown in FIG. 11B, the width of the flux $L_2$ of the light incident on the diffusive light distribution formation part 312a or 312b and emanating from the exit surface 33 of the light guide projection optical element 3 on the conjugate plane PC is greater than the width of the flux $L_1$ of the light incident on the spot light distribution formation part 311 and emanating from the exit surface 33 of the light guide projection optical element 3 on the conjugate plane PC. Here, the width means the dimension of the light flux in the X-axis direction.

As above, the diffusive light distribution formation parts 312a and 312b are capable of forming a wide light distribution pattern due to the negative power in the X-axis direction. The diffusive light distribution formation parts 312a and 312b form a diffusive light distribution wider than the spot light distribution generated by the passage through the spot light distribution formation part 311.

The diffusive light distribution formation parts 312a and 312b form a diffusive light distribution wider than the spot light distribution. The spot light distribution is formed by the passage through the spot light distribution formation part 311. The diffusive light distribution is formed by the passage through the diffusive light distribution formation part 312a or 312b.

Incidentally, each diffusive light distribution formation part 312a, 312b can be formed in a convex shape as viewed on the Z-X plane. In other words, each diffusive light distribution formation part 312a, 312b can have positive power in the X-axis direction. In this case, the focal length of the diffusive light distribution formation parts 312a and 312b is longer than the focal length of the spot light distribution formation part 311.

Accordingly, the width of the flux $L_2$ of the light incident on the diffusive light distribution formation part 312a or 312b and emanating from the exit surface 33 of the light guide projection optical element 3 on the conjugate plane PC becomes greater than the width of the flux $L_1$ of the light incident on the spot light distribution formation part 311 and emanating from the exit surface 33 of the light guide projection optical element 3 on the conjugate plane PC.

In other words, on the conjugate plane PC and in the X-axis direction, the width of the light flux $L_2$ becomes greater than the width of the light flux $L_1$. The light flux $L_1$ is the flux of the light incident on the spot light distribution formation part 311 and emanating from the exit surface 33 of the light guide projection optical element 3. The light flux $L_2$ is the flux of the light incident on the diffusive light distribution formation part 312a or 312b and emanating from the exit surface 33 of the light guide projection optical element 3.

This diffusive light distribution is superimposed on the spot light distribution and projected onto the illumination surface 9. The spot light distribution is formed by the spot light distribution formation part 311. The diffusive light distribution is formed by the diffusive light distribution formation parts 312a and 312b.

As above, the diffusive light distribution is superimposed so as to contain the spot light distribution. Further, the diffusive light distribution is capable of blurring the boundary line of the shape of the light-emitting surface 11 of the light source 1 (light source image) projected on the illumination surface 9 by the spot light distribution. The headlight module 110 is capable of reducing the light distribution irregularity with ease while maintaining the brightness of the spot light distribution.

Specifically, the spot light distribution is situated in the region of the diffusive light distribution. Accordingly, the high illuminance region is formed inside the light distribution pattern on the illumination surface 9. The diffusive light distribution forms the whole of the light distribution pattern. Meanwhile, the spot light distribution forms the high illuminance region.

The high illuminance region is formed based on the shape of the light-emitting surface 11 (light source image). The shape of the light-emitting surface 11 is generally a rectangular shape or a circular shape. Therefore, the high illuminance region is formed with ease based on the shape of the light-emitting surface 11.

The headlight module 110 shown in FIG. 11 forms the light distribution pattern and the high illuminance region by using refracting surfaces and a total reflection surface. When the condensing optical element 2 shown in FIG. 11 is implemented by an ordinary type of condensing lens, the headlight module 110 can form the light distribution pattern and the high illuminance region by using refracting surfaces. Thus, the headlight module 110 does not employ a reflector having a mirror surface. Accordingly, the headlight module 110 facilitates the increase of the light utilization efficiency or the simplification of the manufacturing process.

<Behavior of Ray on Y-Z Plane>

The light distribution control surface 31 has no power as viewed on the Y-Z plane. Therefore, when the light incident from the light distribution control surface 31 is viewed on the Y-Z plane, as shown in FIG. 11A, for example, the light refracted by the light distribution control surface 31 propagates in the light guide projection optical element 3 and is guided to the reflecting surface 32. Here, to "propagate" means that light travels in the light guide component 3.

The light entering the light guide projection optical element 3 and reaching the reflecting surface 32 directly reaches the reflecting surface 32 after entering the light guide projection optical element 3. To "directly reach" means to reach without being reflected by another surface or the like. The light entering the light guide projection optical element 3 and reaching the reflecting surface 32 reaches the reflecting surface 32 without being reflected by another surface or the like. Thus, the light reaching the reflecting surface 32 undergoes the first reflection in the light guide projection optical element 3.

Further, the light reflected by the reflecting surface 32 directly emanates from the exit surface 33. Namely, the light reflected by the reflecting surface 32 reaches the exit surface 33 without being reflected by another surface or the like. Thus, the light undergoing the first reflection at the reflecting surface 32 reaches the exit surface 33 due to the single reflection.

In FIG. 11, light emanating from parts of the condensing optical element 2's exit surfaces 231 and 232 on the $+Y_1$-axis direction side of the optical axis $C_2$ of the condensing optical element 2 reaches the reflecting surface 32. Meanwhile, light emanating from parts of the condensing optical element 2's exit surfaces 231 and 232 on the $-Y_1$-axis direction side of the optical axis $C_2$ of the condensing optical element 2 emanates from the exit surface 33 without being reflected by the reflecting surface 32.

In short, part of the light incident on the light guide projection optical element 3 reaches the reflecting surface 32. The light reaching the reflecting surface 32 is reflected by the reflecting surface 32 and then emanates from the exit surface 33.

Incidentally, depending on the setting of the inclination angle "a" of the light source 1 and the condensing optical element 2, it is possible to have all of the light emanating from the condensing optical element 2 reflected by the reflecting surface 32. Further, depending on the setting of the inclination angle "b" of the reflecting surface 32, it is possible to have all of the light emanating from the condensing optical element 2 reflected by the reflecting surface 32.

Depending on the setting of the inclination angle "a" of the light source 1 and the condensing optical element 2, the length of the light guide projection optical element 3 in the optical axis $C_1$ direction (Z-axis direction) can be shortened. Further, the depth (length in the Z-axis direction) of the optical system can be shortened. Here, the "optical system" in the second embodiment means an optical system including the condensing optical element 2 and the light guide projection optical element 3 as its components, Depending on the setting of the inclination angle "a" of the light source 1 and the condensing optical element 2, it becomes easy to guide the light emanating from the condensing optical element 2 to the reflecting surface 32. This makes it easy to efficiently collect light into a region on the conjugate plane PC and inside (on the +Y-axis direction side of) the ridge line part 321.

Specifically, by collecting the light emanating from the condensing optical element 2 onto the conjugate plane PC's side of the reflecting surface 32, the amount of light emanating from the region on the +Y-axis direction side of the ridge line part 321 can be increased. In this case, the point of intersection of the reflecting surface 32 and the central ray emanating from the condensing optical element 2 is situated on the conjugate plane PC's side of the reflecting surface 32.

In FIG. 11, the central ray of the light emanating from the condensing optical element 2 reaches the position of the ridge line part 321. In FIG. 11, the light emanating from the condensing optical element 2 condenses at the position of the ridge line part 321.

Namely, the central ray of the light emanating from the condensing optical element 2 and passing through the spot light distribution formation part 311 reaches the position of the ridge line part 321. Accordingly, the condensing optical element 2 and the light distribution control surface 31 form the image of the light-emitting surface 11 on the conjugate plane PC as mentioned earlier. Further, the center of the image of the light-emitting surface 11 is situated on the ridge line part 321.

Therefore, the image of a part of the light-emitting surface 11 on the $-Y_1$-axis direction side of the center of the light-emitting surface 11 is formed in a region on the conjugate plane PC on the +Y-axis direction side of the ridge line part 321. Meanwhile, the image of a part of the light-emitting surface 11 on the $+Y_1$-axis direction side of the center of the light-emitting surface 11 is inverted by the reflecting surface 32 and superimposed on the image of the part of the light-emitting surface 11 on the $-Y_1$-axis direction side of the center of the light-emitting surface 11 on the conjugate plane PC.

The image of the part of the light-emitting surface 11 on the $-Y_1$-axis direction side of the center of the light-emitting surface 11 is defined as a first image, while the image of the part of the light-emitting surface 11 on the $+Y_1$-axis direction side of the center of the light-emitting surface 11 is defined as a second image. The second image is inverted by the reflecting surface 32 and superimposed on the first image on the conjugate plane PC.

Accordingly, the headlight module 110 is capable of forming a light distribution pattern of higher luminosity compared to the case of the headlight module 100. In other words, the headlight module 110 is capable of realizing higher light utilization efficiency compared to the headlight module 100.

As explained in the first embodiment, the headlight module 100 employs a configuration in which the light blocking plate 5 blocks light. Thus, in the headlight module 100, the light for forming the second image is blocked by the light blocking plate 5.

Incidentally, since the optical axes Cs and $C_2$ are inclined with respect to the conjugate plane PC, the light source image is inclined with respect to the conjugate plane PC. However, the inclination of the light source image can be made within a range not affecting the formation of the light distribution pattern.

Even in configurations in which no light source image is formed on the conjugate plane PC, it is possible to form the high luminosity region on the conjugate plane PC by reflecting light with the reflecting surface 32.

Accordingly, it becomes easy to brighten the region of the light distribution pattern projected on the illumination surface 9 on the lower side of the cutoff line 91.

Further, thanks to the shortening of the length of the light guide projection optical element 3 in the optical axis $C_1$ direction (Z-axis direction), internal absorption of light in the light guide projection optical element 3 decreases and the light utilization efficiency can be increased. The "internal absorption" means the optical loss inside a material when light passes through a light guide component (in this embodiment, the light guide projection optical element 3), excluding a loss due to surface reflection. The internal absorption increases with the increase in the length of the light guide component.

In an ordinary type of light guide element, light travels inside the light guide element while being repeatedly reflected by side faces of the light guide element. Accordingly, intensity distribution of the light is uniformalized. In the second embodiment, the light entering the light guide projection optical element 3 is reflected once by the reflecting surface 32 and emanates from the exit surface 33. In this regard, the usage of the light guide projection optical element 3 in the second embodiment differs from the usage of the conventional light guide element.

In the light distribution pattern prescribed by road traffic rules or the like, a region on the lower side (−Y-axis direction side) of the cutoff line 91 has the maximum illuminance, for example. As mentioned earlier, the ridge line part 321 of the light guide projection optical element 3 is in the conjugate relationship with the illumination surface 9. Therefore, in order to let the region on the lower side (−Y-axis direction side) of the cutoff line 91 have the maximum illuminance, it is sufficient if the luminosity of a region on the upper side (+Y-axis direction side) of the ridge line part 321 of the light guide projection optical element 3 is made to be the highest.

Parenthetically, in cases where the ridge line part 321 is not a straight line, it is possible, for example, to make a plane parallel to the X-Y plane and situated at a position (point Q) where the ridge line part 321 and the optical axis $C_1$ intersect with each other (i.e., the conjugate plane PC) satisfy the conjugate relationship with the illumination surface 9. Incidentally, the ridge line part 321 and the optical axis $C_1$ of the exit surface 33 do not necessarily have to intersect with each other. Namely, the ridge line part 321 may be situated on the +Y-axis direction side or the −Y-axis direction side of the optical axis $C_1$.

In order to generate such a light distribution pattern in which the region on the lower side (−Y-axis direction side) of the cutoff line 91 has the maximum illuminance, it is effective, as shown in FIG. 11A, to make the reflecting surface 32 reflect part of the light incident from the light distribution control surface 31 of the light guide projection optical element 3 as viewed on the Y-Z plane.

This is because the part of the light incident from the light distribution control surface 31 that reaches the +Y-axis direction side of the ridge line part 321 without being reflected by the reflecting surface 32 and the part of the light incident from the light distribution control surface 31 that is reflected by the reflecting surface 32 are superimposed on each other on the conjugate plane PC.

Namely, in the region on the conjugate plane PC corresponding to the high illuminance region on the illumination surface 9, the light reaching the conjugate plane PC without being reflected by the reflecting surface 32 and the light reaching the conjugate plane PC after being reflected by the reflecting surface 32 are superimposed on each other. With such a configuration, the luminosity of the region on the upper side (+Y-axis direction side) of the ridge line part 321 can be made to be the highest in the luminosity on the conjugate plane PC.

The region of high luminosity is formed by superimposing the light reaching the conjugate plane PC without being reflected by the reflecting surface 32 and the light reaching the conjugate plane PC after being reflected by the reflecting surface 32 on each other on the conjugate plane PC. Modification of the position of the high luminosity region on the conjugate plane PC is possible by changing the light-reflecting position on the reflecting surface 32.

By making the light-reflecting position on the reflecting surface 32 close to the conjugate plane PC, a region on the conjugate plane PC and close to the ridge line part 321 can be made to be the high luminosity region. Namely, the region on the illumination surface 9 on the lower side of the cutoff line 91 can be made to be the high illuminance region.

In FIG. 11, the light emanating from the condensing optical element 2 is condensed at the position of the ridge line part 321. Therefore, the region on the illumination surface 9 on the lower side of the cutoff line 91 can be made to be the high illuminance region.

The amount of the superimposed light can be adjusted by desirably changing the curvature of the light distribution control surface 31 in the vertical direction (Y-axis direction) similarly to the adjustment of the light distribution width in the horizontal direction.

The "amount of the superimposed light" means the amount of the light as the result of the superimposition of the light reaching the +Y-axis direction side of the ridge line part 321 (on the conjugate plane PC) without being reflected by the reflecting surface 32 and the light reflected by the reflecting surface 32.

As above, the light distribution can be adjusted by adjusting the curvature of the light distribution control surface 31. In other words, a desired light distribution can be obtained by adjusting the curvature of the light distribution control surface 31. Here, the "desired light distribution" means the prescribed light distribution prescribed by road traffic rules or the like, for example. In cases where one light distribution pattern is formed by using a plurality of headlight modules, the "desired light distribution" means a light distribution required of each headlight module.

Further, the light distribution can be adjusted by adjusting geometrical relationship between the condensing optical element 2 and the light guide projection optical element 3. Namely, a desired light distribution can be obtained by adjusting the geometrical relationship between the condensing optical element 2 and the light guide projection optical element 3. Here, the "desired light distribution" means the prescribed light distribution prescribed by road traffic rules or the like, for example. In cases where one light distribution pattern is formed by using a plurality of headlight modules, the "desired light distribution" means a light distribution required of each headlight module.

The "geometrical relationship" means positional relationship between the condensing optical element 2 and the light guide projection optical element 3 in the optical axis $C_1$ direction, for example. With the decrease in the distance from the condensing optical element 2 to the light guide projection optical element 3, the amount of light reflected by the reflecting surface 32 decreases and the dimension of the light distribution in the vertical direction (Y-axis direction) decreases. Namely, the height of the light distribution pattern decreases. Conversely, with the increase in the distance from the condensing optical element 2 to the light guide projection optical element 3, the amount of light reflected by the reflecting surface 32 increases and the dimension of the light distribution in the vertical direction (Y-axis direction) increases. Namely, the height of the light distribution pattern increases.

Furthermore, the position of the superimposed light can be changed by adjusting the position of the light reflected by the reflecting surface 32.

The "position of the superimposed light" means the position where the light reaching the +Y-axis direction side of the ridge line part 321 (on the conjugate plane PC) without being reflected by the reflecting surface 32 and the light reflected by the reflecting surface 32 are superimposed on each other on the conjugate plane PC. Thus, the position of the superimposed light means the range of the high luminosity region on the conjugate plane PC. The high luminosity region is the region on the conjugate plane PC corresponding to the high illuminance region on the illumination surface 9.

Moreover, the height of the high luminosity region on the exit surface 33 can be adjusted by adjusting the condensing position of the light reflected by the reflecting surface 32. Specifically, when the condensing position is close to the conjugate plane PC, the dimension of the high luminosity region in the height direction becomes short. Conversely, when the condensing position is far from the conjugate plane PC, the dimension of the high luminosity region in the height direction becomes long.

In the above explanation, the high illuminance region is described as a region on the lower side (−Y-axis direction side) of the cutoff line 91. This is the position of the high illuminance region of the light distribution pattern on the illumination surface 9.

For example, there are cases where one light distribution pattern is formed on the illumination surface 9 by using a plurality of headlight modules. In such cases, the high luminosity region of each headlight module on the conjugate plane PC is not limited to a region on the +Y-axis direction side of the ridge line part 321. The high luminosity region on the conjugate plane PC is formed at a position suitable for the light distribution pattern of each headlight module.

As explained above, the width of the light distribution pattern can be controlled by adjusting the condensing position PW regarding the horizontal direction. The height of the light distribution pattern can be controlled by adjusting the condensing position PH regarding the vertical direction. Further, the width of the high illuminance region can be controlled by adjusting the condensing position PW regarding the horizontal direction. The height of the high illuminance region can be controlled by adjusting the condensing position PH regarding the vertical direction.

As above, the condensing position PW regarding the horizontal direction and the condensing position PH regarding the vertical direction do not necessarily have to coincide with each other. The shape of the light distribution pattern or the shape of the high illuminance region can be controlled by independently setting the condensing position PW regarding the horizontal direction and the condensing position PH regarding the vertical direction.

Further, the shape of the cutoff line 91 can be formed with ease by changing the shape of the ridge line part 321 of the light guide projection optical element 3. Namely, the cutoff line 91 can be formed with ease by forming the ridge line part 321 of the light guide projection optical element 3 in the shape of the cutoff line 91. Thus, this embodiment also has an advantage in that the light utilization efficiency is high compared to the case in the first embodiment in which the shape of the cutoff line 91 is formed by using the light blocking plate 5. This is because the cutoff line 91 can be formed without blocking light.

The image of the light distribution pattern formed on the conjugate plane PC is magnified and projected by the light guide projection optical element 3 onto the illumination surface 9 in front of the vehicle. The light guide projection optical element 3 projects the image of the light distribution pattern formed on the conjugate plane PC onto the illumination surface 9. Specifically, the exit surface 33 projects the image of the light distribution pattern formed on the conjugate plane PC onto the illumination surface 9.

The focal position of the exit surface 33 coincides with the position (position in the Z-axis direction) of the ridge line part 321 on the optical axis $C_1$, for example. Namely, the focal position of the exit surface 33 is at the point of intersection of the ridge line part 321 and the optical axis $C_1$.

Alternatively, the position of the focal point of the exit surface 33 in the Z-axis direction (optical axis $C_1$ direction) coincides with the position of the ridge line part 321 in the Z-axis direction. In this case, the focal point of the exit surface 33 does not have to be on the ridge line part 321.

In conventional headlight devices, a light blocking plate and a projection lens are used, and thus changes such as deformation of the cutoff line or variations in the light distribution occur due to positional variations between components. However, the light guide projection optical element 3 is capable of making the focal position of the exit surface 33 coincide with the position of the ridge line part 321 in the optical axis $C_1$ direction by means of shape accuracy of one component.

Accordingly, the headlight module 110 is capable of inhibiting the changes such as deformation of the cutoff line or variations in the light distribution. This is because improving the shape accuracy of one component is generally easier than improving the positional accuracy between two components.

Figure 15B:
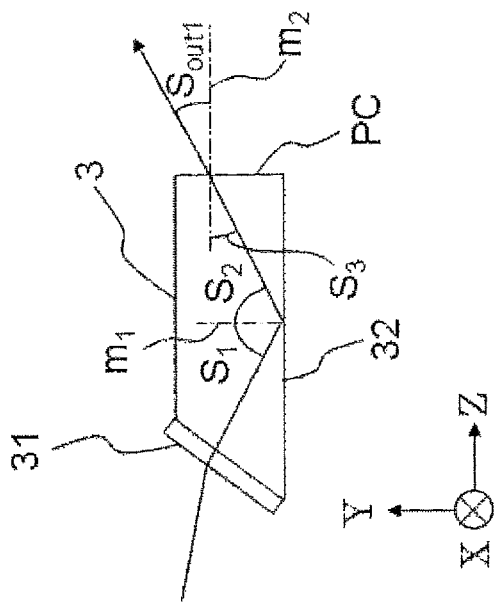

FIG. 15A and FIG. 15B are diagrams for explaining the shape of the reflecting surface 32 of the light guide projection optical element 3 in the headlight module 110 according to the second embodiment. In FIG. 15A and FIG. 15B, a part of the light guide projection optical element 3 from the light distribution control surface 31 to the conjugate plane PC is excerpted and shown.

FIG. 15A shows a case where the reflecting surface 32 is not inclined with respect to the Z-X plane for the sake of comparison. Namely, the reflecting surface 32 in FIG. 15A is parallel to the Z-X plane. FIG. 15B shows the shape of the reflecting surface 32 of the light guide projection optical element 3.

The reflecting surface 32 of the light guide projection optical element 3 shown in FIG. 15B is not a surface parallel to the Z-X plane. For example, as shown in FIG. 15B, the reflecting surface 32 is a plane surface inclined with respect to the Z-X plane around the X-axis as the rotation axis (inclined surface). The reflecting surface 32 of the light guide projection optical element 3 is a surface rotated around the X-axis as the rotation axis clockwise as viewed from the −X-axis direction side. In FIG. 15B, the reflecting surface 32 is a surface rotated by an angle "f" with respect to the Z-X plane. Thus, an end of the reflecting surface 32 on the light distribution control surface 31's side (−Z-axis direction side) is situated on the +Y-axis direction side relative to an end of the reflecting surface 32 on the conjugate plane PC's side (+Z-axis direction side) (i.e., the ridge line part 321).

The reflecting surface 32 of the light guide projection optical element 3 shown in FIG. 15A is a plane surface parallel to the Z-X plane. The light incident from the incidence surface 31 is reflected by the reflecting surface 32 and then reaches the conjugate plane PC.

The incidence angle of the light to the reflecting surface 32 is the incidence angle $S_1$. The reflection angle of the light at the reflecting surface 32 is the reflection angle $S_2$. According to the law of reflection, the reflection angle $S_2$ equals the incidence angle $S_1$. A perpendicular line $m_1$ to the reflecting surface 32 is indicated by a chain line in FIG. 15A.

The light is incident on the conjugate plane PC at an incidence angle $S_3$. The light emanates from the conjugate plane PC at an emission angle $S_{out1}$. The emission angle $S_{out1}$ equals the incidence angle $S_3$. A perpendicular line $m_2$ to the conjugate plane PC is indicated by a chain line in FIG. 15A. The perpendicular line $m_2$ to the conjugate plane PC is parallel to the optical axis $C_1$.

In FIG. 15A and FIG. 15B, the conjugate plane PC is drawn with a solid line. However, the conjugate plane PC is a fictitious plane as explained earlier. Namely, the conjugate plane PC is an imaginary plane.

Since the light is refracted greatly by the light distribution control surface 31, the emission angle $S_{out1}$ of the light emanating from the conjugate plane PC becomes large. If the emission angle $S_{out1}$ becomes large, the aperture of the exit surface 33 increases accordingly. This is because light at a large emission angle $S_{out1}$ reaches a position on the exit surface 33 far from the optical axis $C_1$.

In contrast, the reflecting surface 32 of the light guide projection optical element 3 shown in FIG. 15B is inclined with respect to the X-Z plane. The direction of the inclination of the reflecting surface 32 is the direction of rotating from the X-Z plane clockwise as viewed from the −X-axis direction side.

Namely, the reflecting surface 32 is inclined with respect to the light traveling direction (+Z-axis direction) in a direction of widening the optical channel in the light guide projection optical element 3. The reflecting surface 32 is inclined towards the light traveling direction (+Z-axis direction) so that the optical channel in the light guide projection optical element 3 widens. Here, the light traveling direction is the traveling direction of the light in the light guide projection optical element 3. Accordingly, the light traveling direction is the direction parallel to the optical axis $C_1$ of the light guide projection optical element 3.

The reflecting surface 32 is inclined in the direction of the optical axis $C_1$ of the exit surface 33 so as to face the exit surface 33's side. To "face the exit surface 33's side" means that the reflecting surface 32 is visible as viewed from the exit surface 33's side (+Z-axis direction side).

The light incident from the light distribution control surface 31 is reflected by the reflecting surface 32 and then reaches the conjugate plane PC.

The incidence angle of the light to the reflecting surface 32 is the incidence angle $S_4$. The reflection angle of the light at the reflecting surface 32 is the reflection angle $S_5$. According to the law of reflection, the reflection angle $S_5$ equals the incidence angle $S_4$. A perpendicular line $m_3$ to the reflecting surface 32 is indicated by a chain line in FIG. 15B.

The light is incident on the conjugate plane PC at an incidence angle $S_6$. The light emanates from the conjugate plane PC at an emission angle $S_{out2}$. The emission angle $S_{out2}$ equals the incidence angle $S_6$. A perpendicular line $m_4$ to the conjugate plane PC is indicated by a chain line in FIG. 15B. The perpendicular line $m_4$ to the conjugate plane PC is parallel to the optical axis $C_1$.

Due to the inclination of the reflecting surface 32, the incidence angle $S_4$ is larger than the incidence angle $S_1$. Further, the reflection angle $S_5$ is larger than the reflection angle $S_2$. Thus, the incidence angle $S_6$ is smaller than the incidence angle $S_3$. Specifically, in regard to the inclination angle of the light emitted from the conjugate plane PC with respect to the optical axis $C_1$, the emission angle $S_{out2}$ is smaller than the emission angle $S_{out1}$.

By inclining the reflecting surface 32 towards the light traveling direction (+Z-axis direction) so that the optical channel in the light guide projection optical element 3 widens, the aperture of the exit surface 33 can be made small.

By inclining the reflecting surface 32 in the direction of the optical axis $C_1$ of the exit surface 33 so as to face the exit surface 33's side, the aperture of the exit surface 33 can be made small. In cases where the projection lens 8 is employed, the aperture of the projection lens 8 can be made small by inclining the reflecting surface 32 in the direction of the optical axis Cp of the projection lens 8 so as to face the projection lens 8's side.

Incidentally, it is also possible to form the reflecting surface 32 in a curved surface shape in order to make the emission angle $S_{out2}$ smaller than the emission angle $S_{out1}$. Namely, the reflecting surface 32 is formed as a curved surface so that the optical channel widens towards the light traveling direction (+Z-axis direction).

The reflecting surface 32 is formed as a curved surface that faces the exit surface 33's side in the direction of the optical axis $C_1$ of the exit surface 33. In cases where the projection lens 8 is employed, the reflecting surface 32 is formed as a curved surface that faces the projection lens 8's side in the direction of the optical axis Cp of the projection lens 8.

The inclination of the reflecting surface 32 works to reduce the emission angle $S_{out}$ at the time when the light reflected by the reflecting surface 32 emanates from the conjugate plane PC. Therefore, the aperture of the exit surface 33 can be made small by the inclination of the reflecting surface 32. In cases where the projection lens 8 is employed, the aperture of the projection lens 8 can be made small by the inclination of the reflecting surface 32. Further, the headlight module 110 can be downsized. Especially, the inclination of the reflecting surface 32 contributes to the thinning of the headlight module 110 in the height direction (Y-axis direction).

Incidentally, the light guide projection optical element 3 may employ the configuration of the reflecting surface 32 shown in FIG. 15A.

<Light Distribution Pattern>

The headlight module 110 is capable of obtaining a light distribution pattern similar to that in the first embodiment since the light distribution control surface 31 is employed as an incidence surface of the light guide projection optical element 3. Therefore, the explanation of the light distribution pattern in the first embodiment is substituted for the explanation of the light distribution pattern in this embodiment.

Further, the "rising line" can be formed with ease by the shape of the ridge line part 321 similarly to the use of the light blocking plate 5 in the first embodiment.

Figure 16:
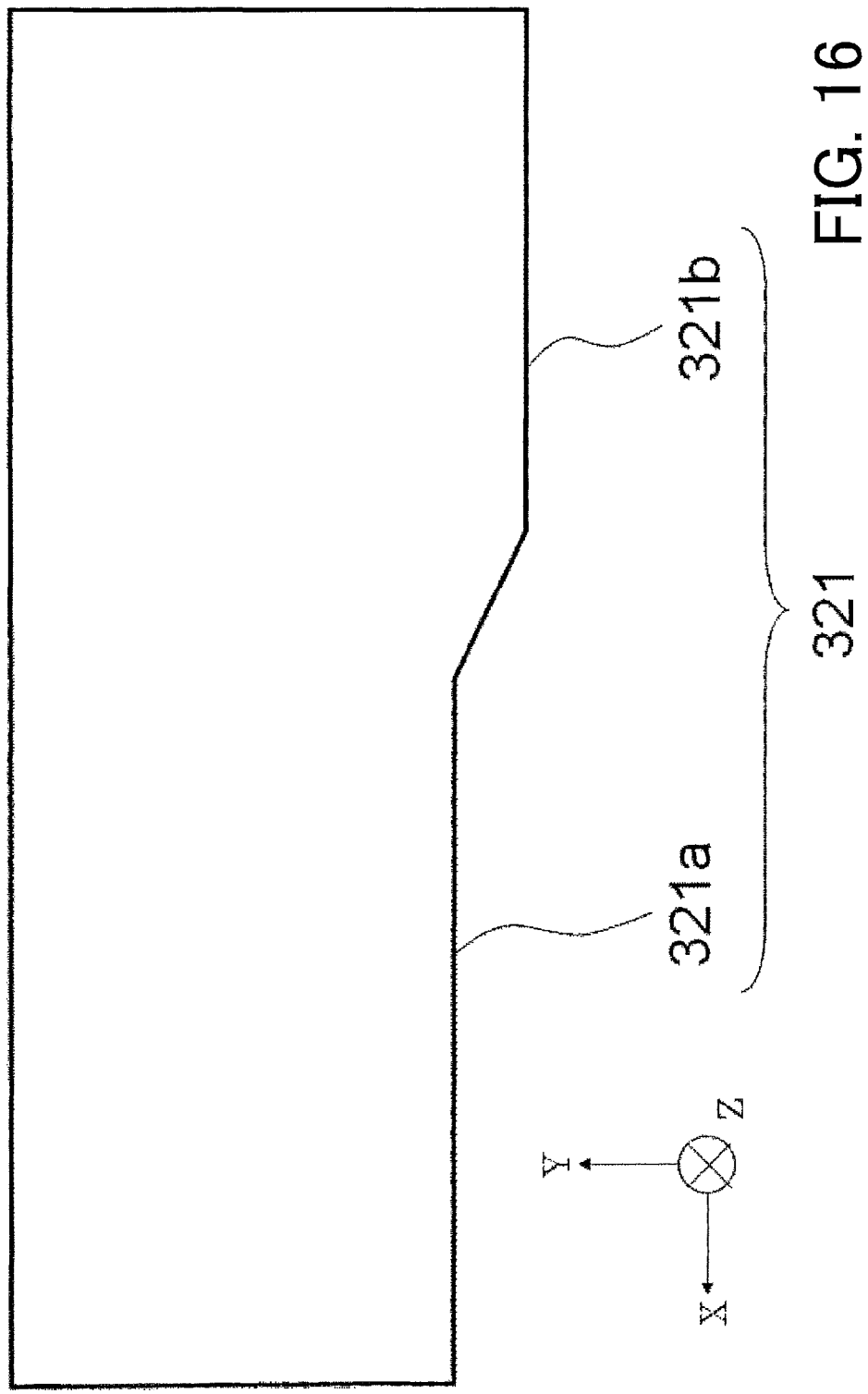
FIG. 16 is a schematic diagram showing a cross-sectional shape of the light guide projection optical element 3 of the headlight module 110 according to the second embodiment on a conjugate plane PC.

FIG. 16 is a schematic diagram showing an example of a cross-sectional shape of the light guide projection optical element 3 on the conjugate plane PC. The ridge line part 321 may be formed in a shape having a step as shown in FIG. 16, for example. Namely, the shape of the ridge line part 321 shown in FIG. 16 is the aforementioned bent line shape.

In the case of the light guide projection optical element 3, the light travels inside the light guide projection optical element 3. Therefore, the shape of each ridge line part 321a, 321b is the same as the shape of each side 51a, 51b of the light blocking plate 5 shown in the first embodiment. The ridge line parts 321a and 321b are sides of the cross section of the light guide projection optical element 3 on the −Y-axis direction side. The sides 51a and 51b are sides of the light blocking plate 5 on the +Y-axis direction side.

As viewed from behind (from the −Z-axis direction side), the ridge line part 321a on the left-hand side (+X-axis direction side) is at a higher position than (on the +Y-axis direction side relative to) the ridge line part 321b on the right-hand side (−X-axis direction side).

The conjugate plane PC and the illumination surface 9 are in the optically conjugate relationship. Therefore, the shape of the light distribution pattern on the conjugate plane PC is projected onto the illumination surface 9 while being inverted in the vertical direction and the lateral direction. Thus, on the illumination surface 9, the cutoff line 91 on the left-hand side with respect to the vehicle's traveling direction is high and the cutoff line 91 on the right-hand side with respect to the vehicle's traveling direction is low.

With this configuration, the "rising line" raising the illumination on the sidewalk's side (left-hand side) for the recognition of pedestrians and traffic signs can be formed with ease. Incidentally, this explanation is given of cases where vehicles travel on the left-hand side of the road. Thus, the rising line is inverted in the lateral direction in cases where vehicles travel on the right-hand side of the road. Namely, a rising line raising the illumination on the right-hand side is formed.

There are vehicles on which a plurality of headlight modules are arranged to form a light distribution pattern by adding light distribution patterns of the modules together. Namely, there are cases where a plurality of headlight modules are arranged and a light distribution pattern is formed by adding light distribution patterns of the modules together. Even in such cases, the headlight module 110 according to the second embodiment can be employed with ease.

With the headlight module 110, the width and the height of the light distribution pattern can be changed by adjusting the curved surface shape of the light distribution control surface 31 of the light guide projection optical element 3. Further, the lighting distribution can also be changed.

With the headlight module 110, the width and the height of the light distribution pattern can be changed by adjusting the optical positional relationship between the condensing optical element 2 and the light guide projection optical element 3 or the shape of the light distribution control surface 31 of the light guide projection optical element 3. Further, the lighting distribution can also be changed.

By use of the reflecting surface 32, changing the lighting distribution can also be facilitated. For example, the position of the high illuminance region can be changed by changing the inclination angle "b" of the reflecting surface 32.

With the headlight module 110, the shape of the cutoff line 91 can be defined by the shape of the ridge line part 321 of the light guide projection optical element 3. In other words, the light distribution pattern can be formed according to the shape of the light guide projection optical element 3.

Thus, especially, it is unnecessary to change the shape of the condensing optical element 2 or the like among the plurality of headlight modules. Namely, the condensing optical element 2 can be used as a common component. Accordingly, the number of types of components can be reduced, the assembling efficiency can be improved, and the production cost can be reduced.

If is sufficient if such functions of desirably adjusting the width and the height of the light distribution pattern and desirably adjusting the lighting distribution are delivered by the whole of the headlight module 110. Optical components of the headlight module 110 include the condensing optical element 2 and the light guide projection optical element 3. Thus, it is also possible to distribute these functions into one or more optical surfaces of the condensing optical element 2 and the light guide projection optical element 3 forming the headlight module 110.

For example, it is possible to form the reflecting surface 32 of the light guide projection optical element 3 in a curved surface shape to make the reflecting surface 32 have power and form the light distribution.

However, in regard to the reflecting surface 32, not all of the light is required to reach the reflecting surface 32. Accordingly, the amount of light that can contribute to the formation of the light distribution pattern is limited in the case where a shape is given to the reflecting surface 32. Thus, the amount of light that can give the effect of the shape of the reflecting surface 32 to the light distribution pattern by being reflected by the reflecting surface 32 is limited. Namely, the influence of the shape of the reflecting surface 32 on the light distribution pattern due to the reflection of light by the reflecting surface 32 is limited. Therefore, in order to change the light distribution pattern with ease by giving an optical effect to all of the light, it is desirable to form the light distribution by making the light distribution control surface 31 have power.

Incidentally, functions equivalent to those of the light guide projection optical element 3 can be implemented by using the light distribution control element 4, the reflecting element and the projection lens 8 described in the first embodiment. The reflecting element corresponds to the reflecting surface 32.

<Second Modification>

FIG. 21 is a configuration diagram showing a configuration of a headlight module 111 according to a second modification.

The headlight module 111 includes the light sources 1 and 6, a condensing optical element 7 and the projection lens 8. The headlight module 111 does not include the condensing optical element 2. The condensing optical element 2 is a light-condensing element for the light source 1. In the second modification, instead of the light guide projection optical element 3, an optical element whose exit surface 330 is a plane surface is shown, for example. This optical element, not having the projecting function, will be described as a light guide optical element 30.

First, the light source 6 for the high beam will be explained below.

To facilitate the explanation of the light source 6 and the condensing optical element 7, $X_2Y_2Z_2$ coordinates will be used as a new coordinate system. The $X_2Y_2Z_2$ coordinates are coordinates obtained by rotating the XYZ coordinates around the X-axis as the rotation axis counterclockwise by an angle "e" as viewed from the −X-axis direction side.

The light source 6 has a light-emitting surface 61. The light source 6 emits light for illuminating a region in front of the vehicle from the light-emitting surface 61.

The light source 6 is situated on the −$Z_2$-axis side of the condensing optical element 7. The light source 6 is situated on the −Z-axis side of (to the rear of) the light guide optical element 30. The light source 6 is situated on the −Y-axis side (lower side) of the light guide optical element 30.

In FIG. 21, the light source 6 emits light in the +$Z_2$-axis direction. While the type of the light source 6 is not particularly limited, the following explanation will be given assuming that the light source 6 is an LED in the same way as the foregoing explanation.

The condensing optical element 7 is situated on the +$Z_2$-axis side of the light source 6. The condensing optical element 7 is situated on the −$Z_2$-axis side of the light guide optical element 30. The condensing optical element 7 is situated on the −Z-axis side of (to the rear of) the light guide optical element 30. The condensing optical element 7 is situated on the −Y-axis side (lower side) of the light guide optical element 30.

The light emitted from the light source 6 is incident on the condensing optical element 7. The condensing optical element 7 condenses the light into a position in front (in the +$Z_2$-axis direction). In FIG. 21, the condensing optical element 7 is indicated as a condensing optical element 7 having positive power.

The condensing optical element 7 shown in the second modification is filled with a refractive material, for example.

While the condensing optical element 7 in FIG. 21 is formed of one condensing optical element 7, it is also possible to use a plurality of optical components. However, the use of a plurality of optical elements deteriorates productivity since it is necessary to secure positioning accuracy of each optical element, for example.

In the second modification, the optical axis $C_3$ of the condensing optical element 7 is parallel to the $Z_2$-axis. The optical axis $C_3$ of the condensing optical element 7 coincides with the optical axis $Cs_2$ of the light source 6.

Detailed configuration and function of the condensing optical element 7 are equivalent to those of the condensing optical element 2. Thus, the explanation of the condensing optical element 2 is substituted for the explanation of the condensing optical element 7. However, optical performance of the condensing optical element 7 such as the focal length can take on a value different from that of the condensing optical element 2.

The light source 6 and the condensing optical element 7 are arranged on the lower side (−Y-axis direction side) of the light guide optical element 30. The light source 6 and the condensing optical element 7 are arranged to the rear of (on the −Z-axis direction side of) the light guide optical element 30. Thus, in the headlight module 111 according to the second modification, the light source 6 is arranged on the lower side (−Y-axis direction side) of the light source 1 as shown in FIG. 21.

Next, the behavior of the ray will be explained.

As shown in FIG. 21, the light condensed by the condensing optical element 7 is incident on an incidence surface 34 of the light guide optical element 30. The incidence surface 34 is a refracting surface. In FIG. 21, the incidence surface 34 is illustrated in a planar shape. The light incident on the incidence surface 34 is refracted by the incidence surface 34. The light incident on the incidence surface 34 emanates from the exit surface 330.

Incidentally, the light guide optical element 30 shown in the second modification is filled with a refractive material, for example.

The incidence surface 34 is in the conjugate relationship with the illumination surface 9. Namely, the incidence surface 34 is situated at a position optically conjugate with the illumination surface 9. Therefore, the image of the light distribution pattern formed on the incidence surface 34 by the condensing optical element 7 is magnified and projected by the projection lens 8 onto the illumination surface 9 in front of the vehicle.

The incidence surface 34 is arranged on the lower side (−Y-axis direction side) of the ridge line part 321. Therefore, the image of the light distribution pattern formed on the incidence surface 34 is projected onto the illumination surface 9's region on the upper side (+Y-axis direction side) of the cutoff line 91. Accordingly, the light source 6 and the condensing optical element 7 are capable of illuminating the region to be illuminated by the high beam.

Further, the light distribution of the high beam can be changed by adjusting the condensing position of the light emanating from the condensing optical element 7 as shown in FIG. 21. The light distribution of the high beam can be changed also by adjusting geometrical relationship between the condensing optical element 7 and the light guide optical element 30.

To "adjust geometrical relationship" means to adjust positional relationship between the condensing optical element 7 and the light guide optical element 30 in the optical axis $C_1$ direction (Z-axis direction), for example. When there is a change in the positional relationship between the condensing optical element 7 and the light guide optical element 30 in the optical axis $C_1$ direction, the size of the condensed light spot on the incidence surface 34 formed by the condensing optical element 7 changes. Namely, the light flux diameter of the light condensed on the incidence surface 34 by the condensing optical element 7 changes. Then, the light distribution on the illumination surface 9 changes accordingly.

In the above example, the incidence surface 34 is arranged on the conjugate plane PC. However, the incidence surface 34 may be arranged on the −Z-axis direction side of the conjugate plane PC. In this case, the conjugate plane PC exists on the +Z-axis side of the incidence surface 34. The conjugate plane PC exists inside the light guide optical element 30.

In cases of employing such a configuration, the image of the light distribution pattern formed on the conjugate plane PC's region on the lower side (−Y-axis direction side) of the ridge line part 321 can be controlled by the shape of the incidence surface 34.

For example, the incidence surface 34 is in a curved surface shape having positive power. The light emanating from the condensing optical element 7 condenses at the ridge line part 321. In this case, the light distribution pattern is formed in such a manner that a region on the upper side (+Y-axis side) of the cutoff line 91 is illuminated the brightest.

As above, the light distribution pattern of the high beam can be controlled with ease by changing the surface shape of the incidence surface 34.

As described above, the headlight module 111 according to the second embodiment is capable of forming both the light distribution pattern of the low beam and the light distribution pattern of the high beam with ease with the same headlight module.

In other words, it is unnecessary to separately prepare a headlight module for the high beam and a headlight module for the low beam. Accordingly, a small-sized headlight device compared to conventional headlight devices can be realized.

Next, the employment of the projection lens 8 will be explained below.

The light guide optical element 30 has the exit surface 330. The exit surface 330 is a plane surface, for example. The exit surface 330 is a plane surface perpendicular to the optical axis Cp of the projection lens 8, for example.

Therefore, the light guide optical element 30 does not have the function of projecting the light distribution pattern onto the illumination surface 9. The headlight module 111 is equipped with the projection lens 8. The projection lens 8 projects the light distribution pattern onto the illumination surface 9.

Specifically, the light guide optical element 30 has a configuration including the light distribution control element 4. The light guide projection optical element 3 has a configuration in which the light guide optical element 30 includes the projection lens 8.

The focal point of the projection lens 8 is at the position of the light distribution pattern in the optical axis Cp direction, for example. Namely, the light distribution pattern is formed on the conjugate plane PC. Accordingly, the projection lens 8 is capable of projecting the light distribution pattern onto the illumination surface 9.

Incidentally, it is possible to make the exit surface 330 have power. In such cases, the exit surface 330 and the projection lens 8 project the light distribution pattern onto the illumination surface 9.

Finally, the diffusive light distribution formation parts 312a and 312b as toroidal lens surfaces will be explained below.

The light distribution control surface 31 of the light guide optical element 30 is formed with toroidal lens surfaces. In FIG. 21, the light distribution control surface 31 is in a curved surface shape as viewed on the Y-Z plane. Thus, the spot light distribution formation part 311 or each diffusive light distribution formation part 312 has the light-condensing function on the Y-Z plane, for example.

Therefore, the headlight module 111 does not include the condensing optical element 2 for condensing the light emitted from the light source 1.

In the headlight module 111 shown in FIG. 21, the light condensed by the spot light distribution formation part 311 or the diffusive light distribution formation part 312 condenses on the conjugate plane PC. In the headlight module 111 shown in FIG. 21, the light condensed by the spot light distribution formation part 311 or the diffusive light distribution formation part 312 condenses at the ridge line part 321. In the headlight module 111 shown in FIG. 21, the light condensed by the spot light distribution formation part 311 or the diffusive light distribution formation part 312 condenses on the optical axis Cp of the projection lens 8.

Third Embodiment

Figure 17:
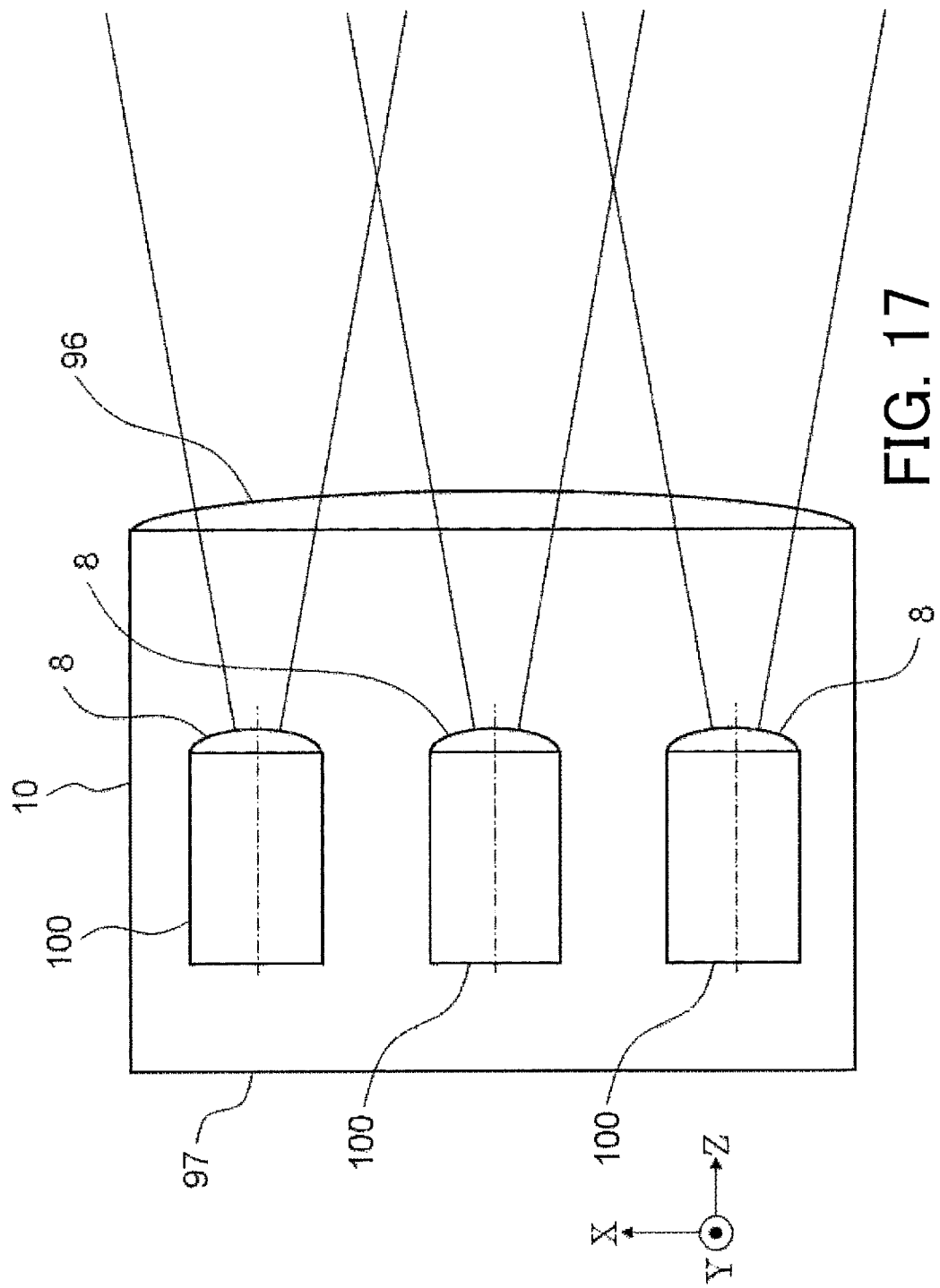
FIG. 17 is a configuration diagram showing the configuration of a headlight device 10 according to a third embodiment.

FIG. 17 is a configuration diagram showing the configuration of a headlight device 10 equipped with the headlight modules 100, 102, 110 or 111. In the above embodiments, embodiments of the headlight modules 100, 102, 110 and 111 have been described. FIG. 17 shows an example in which the headlight device 10 is equipped with the headlight modules 100, for instance.

All or part of the three headlight modules 100 shown in FIG. 17 may be replaced with the headlight module(s) 102, 110 or 111, for example.

The headlight device 10 has a housing 97. The headlight device 10 may have a cover 96.

The housing 97 holds the headlight modules 100.

The housing 97 is arranged inside the vehicle body, for example.

The headlight modules 100 are stored in the housing 97. In FIG. 17, three headlight modules 100 are stored in the housing 97, for example. The number of the headlight modules 100 is not limited to three. The number of the headlight modules 100 can also be one, two, or four or more.

The headlight modules 100 are arranged in the housing 97 to be in a line in the X-axis direction, for example. The way of arranging the headlight modules 100 is not limited to the aligning in the X-axis direction. The headlight modules 100 may be arranged while shifting them from each other in the Y-axis direction or the Z-axis direction in consideration of design, function, etc.

In FIG. 17, the headlight modules 100 are stored in the housing 97. However, the housing 97 does not have to be in a box shape. It is possible to employ a configuration in which the housing 97 is formed of a frame or the like to which the headlight modules 100 are fixed. This is because the housing 97 is arranged inside the vehicle body in cases of four-wheel automobiles and the like. The frame or the like can be a component of the vehicle body. In such cases, the housing 97 is a part of the vehicle body. Namely, the housing 97 is provided as a housing part.

In the case a motorcycle, the housing 97 is arranged in the vicinity of the handle bar. In the case a four-wheel automobile, the housing 97 is arranged inside the vehicle body.

The cover 96 allows through the light emitted from the headlight modules 100. The light passing through the cover 96 is emitted forward from the vehicle. The cover 96 is made of a transparent material.

The cover 96 is arranged at a superficial part of the vehicle body to be exposed to the outside of the vehicle body.

The cover 96 is arranged on the +Z-axis direction side of the housing 97.

The light emitted from the headlight modules 100 passes through the cover 96 and is emitted forward (in the +Z-axis direction) from the vehicle. In FIG. 17, each ray emitted from the cover 96 is superimposed on a ray emitted from each adjoining headlight module 100 to form one light distribution pattern.

The cover 96 is provided in order to protect the headlight modules 100 from wind, rain, dust and the like. However, it is unnecessary to particularly provide the cover 96 in cases where each headlight module 100 has a configuration in which the projection lens 8 protects the components in the headlight module 100 from wind, rain, dust and the like.

In cases where the headlight device 10 includes a plurality of headlight modules 100 as above, the headlight device 10 is an aggregate of the headlight modules 100. In cases where the headlight device 10 includes one headlight module 100, the headlight device 10 equals the headlight module 100. Namely, the headlight module 100 is the headlight device 10. Alternatively, the headlight device 10 is configured by attaching the cover 96, the housing 97 or the like to one headlight module 100.

Incidentally, terms indicating positional relationship between components or the shape of a component, such as "parallel" and "perpendicular", may have been used in the above embodiments. These terms are intended to include a range allowing for tolerances in the manufacture, variations in the assembly, or the like. Therefore, when a description indicating positional relationship between components or the shape of a component is included in the claims, such a description includes a range allowing for tolerances in the manufacture, variations in the assembly, or the like.

While embodiments of the present invention have been described as above, the present invention is not limited to these embodiments.

APPENDIXES

The following features will be described as appendixes:

Appendix 1

A headlight module comprising:
a light source that emits light;
a condensing optical element that converts the light emitted from the light source into condensed light;

a light distribution control element that changes a focal position of the condensed light; and a projection optical element that projects the light emanating from the light distribution control element, wherein the light distribution control element forms a lighting distribution, for a light distribution pattern projected by the projection optical element, on a plane perpendicular to an optical axis of the projection optical element and situated at a front side focal position of the projection optical element and includes a first light distribution formation part that forms a high luminosity region in the light distribution pattern and a second light distribution formation part that forms a low luminosity region in the light distribution pattern. The low luminosity region is lower in luminosity than the high luminosity region.

Appendix 2

The headlight module according to appendix 1, wherein the first light distribution formation part is arranged on an optical axis of the condensing optical element.

Appendix 3

The headlight module according to appendix 1 or 2, wherein the first light distribution formation part has greater power than the second light distribution formation part.

Appendix 4

The headlight module according to any one of appendixes 1 to 3, comprising a reflecting surface that reflects the light emanating from the light distribution control element, wherein an end of the reflecting surface on the projection optical element's side is situated on the plane in regard to an optical axis direction of the projection optical element.

Appendix 5

A headlight device comprising the headlight module according to any one of appendixes 1 to 4.

DESCRIPTION OF REFERENCE CHARACTERS

10: headlight device, 100, 101, 102, 110, 111: headlight module, 1, 6: light source, 11, 61: light-emitting surface, 2, 7: condensing optical element, 211, 212: incidence surface, 22: reflecting surface, 231, 232: exit surface, 3: light guide projection optical element, 30: light guide optical element, 31: light distribution control surface 311: spot light distribution formation part 312, 312a, 312b: diffusive light distribution formation part, 32: reflecting surface, 321: ridge line part, 33, 330: exit surface, 4, 40: light distribution control element, 41: spot light distribution formation part 41, 42, 42a, 42b: diffusive light distribution formation part, 43: exit surface, 44: step, 5: light blocking plate, 51, 51a, 51b: side, 8: projection lens, 9: illumination surface, 91: cutoff line, 92: region on the lower side of the cutoff line, 93: high illuminance region, 96: cover, 97: housing, a, b, f: angle, C, Cp, Cs, $C_1$, $C_2$: optical axis, $L_1$, $L_2$: light flux, $m_1$, $m_2$, $m_3$, $m_4$: perpendicular line, PH, PW: condensing position, PC: conjugate plane, $R_1$: ray, $S_1$, $S_3$, $S_4$, $S_6$: incidence angle, $S_2$, $S_5$: reflection angle, $S_{out}$, $S_{out1}$, $S_{out2}$: emission angle.

What is claimed is:

1. A headlight module comprising:
   a light source configured to emit light;
   a light distribution control element configured to form a light distribution pattern by changing a divergence angle of the light incident therein;
   a projection optical element configured to project the light distribution pattern; and
   a condensing lens configured to convert the light emitted from the light source into condensed light,
   wherein the light distribution control element includes a first light distribution formation part configured to form a high luminosity region in the light distribution pattern and a second light distribution formation part configured to form a low luminosity region in the light distribution pattern, the low luminosity region being lower in luminosity than the high luminosity region,
   the first light distribution formation part is a refracting surface having a convex shape as viewed from the light source's side,
   the second light distribution formation part is a refracting surface having a concave shape as viewed from the light source's side,
   the light distribution control element is situated in a first direction from the condensing lens, the first direction being a direction in which the headlight module emitting light, and
   the first light distribution formation part is arranged on an optical axis of the condensing lens.

2. The headlight module according to claim 1, wherein the first light distribution formation part is arranged on an optical axis of the light source.

3. The headlight module according to claim 1, wherein the second light distribution formation part is arranged outside the first light distribution formation part with respect to the optical axis of the condensing lens.

4. The headlight module according to claim 1, wherein the first light distribution formation part transmits a central ray emitted from the light source.

5. The headlight module according to claim 1, wherein the headlight module is mounted on a transport machine,
   the first light distribution formation part has greater refractive power in a lateral direction with respect to a direction of intended movement of the transport machine than the second light distribution formation part.

6. The headlight module according to claim 1, wherein the light distribution pattern is formed on a plane situated at a focal position of the projection optical element.

7. The headlight module according to claim 1, wherein the light distribution control element is composed of a refractive material,
   a direction in which the headlight module emits light is defined as a first direction,
   a direction opposite to the first direction is defined as a second direction, and
   the first light distribution formation part and the second light distribution formation part are formed on a surface on the second direction's side of the refractive material.

8. The headlight module according to claim 1, wherein light entering the second light distribution formation part diverges after passing through the second light distribution formation part, and
   light entering the first light distribution formation part is further condensed after passing through the first light distribution formation part.

9. The headlight module according to claim 2, wherein the second light distribution formation part is arranged outside the first light distribution formation part with respect to the optical axis of the light source.

10. The headlight module according to claim 4, wherein the second light distribution formation part is arranged outside the first light distribution formation part with respect to the central ray.

11. The headlight module according to claim 6, wherein the plane is perpendicular to an optical axis of the projection optical element.

12. The headlight module according to claim 6, wherein light emanating from the first light distribution formation part condenses on the plane.

13. The headlight module according to claim 6, further comprising a reflecting surface configured to reflect light emanating from the light distribution control element,
wherein an end of the reflecting surface on the projection optical element's side in an optical axis direction of the projection optical element is situated on the plane.

14. The headlight module according to claim 8, wherein a diffusive light distribution formed by the diverged light emitted from the second light distribution formation part is superimposed on a spot light distribution and projected so as to contain the spot light distribution, the spot light distribution being formed by the condensed light emitted from the first light distribution formation part.

15. The headlight module according to claim 13, further comprising an optical element including the light distribution control element and the reflecting surface.

16. The headlight module according to claim 13, wherein a central ray of light emitted from the light source has an intersection point on the reflecting surface.

17. A headlight module comprising:
a light source configured to emit light;
a light distribution control element configured to form a light distribution pattern by changing a divergence angle of the light incident therein;
a projection optical element configured to project the light distribution pattern; and
a condensing lens configured to convert the light emitted from the light source into condensed light,
wherein the light distribution control element includes a first light distribution formation part configured to form a high luminosity region in the light distribution pattern and a second light distribution formation part configured to form a low luminosity region in the light distribution pattern, the low luminosity region being lower in luminosity than the high luminosity region,
the first light distribution formation part is a refracting surface having positive power,
the second light distribution formation part is a refracting surface having negative power,
the light distribution control element is situated in a first direction from the condensing lens, the first direction being a direction in which the headlight module emitting light, and
the first light distribution formation part is arranged on an optical axis of the condensing lens.

18. A headlight module comprising:
a light source configured to emit light;
a light distribution control element configured to form a light distribution pattern by changing a divergence angle of the light incident therein;
a projection optical element configured to project the light distribution pattern; and
a condensing lens configured to convert the light emitted from the light source into condensed light,
wherein the light distribution control element includes a first light distribution formation part configured to form a high luminosity region in the light distribution pattern and a second light distribution formation part configured to form a low luminosity region in the light distribution pattern, the low luminosity region being lower in luminosity than the high luminosity region,
the light distribution control element is situated in a first direction from the condensing lens, the first direction being a direction in which the headlight module emitting light, and
the first light distribution formation part is arranged on an optical axis of the condensing lens.

19. The headlight module according to claim 17, wherein light entering the second light distribution formation part diverges after passing through the second light distribution formation part, and
light entering the first light distribution formation part is further condensed after passing through the first light distribution formation part.

20. The headlight module according to claim 19, wherein a diffusive light distribution formed by the diverged light emitted from the second light distribution formation part is superimposed on a spot light distribution and projected so as to contain the spot light distribution, the spot light distribution being formed by the condensed light emitted from the first light distribution formation part.

* * * * *